United States Patent [19]

Chana

[11] 4,122,732
[45] Oct. 31, 1978

[54] HYDROMECHANICAL MECHANICAL CONTINUOUSLY VARIABLE TRANSMISSION

[75] Inventor: Howard E. Chana, Troy, Mich.
[73] Assignee: General Motors Corporation, Detroit, Mich.
[21] Appl. No.: 759,826
[22] Filed: Jan. 17, 1977
[51] Int. Cl.$^2$ ............................................. B60K 41/04
[52] U.S. Cl. ...................................... 74/863; 74/561; 74/565
[58] Field of Search .................. 74/861, 863, 864, 865

[56] References Cited

U.S. PATENT DOCUMENTS

| 2,804,748 | 9/1957 | Hutchinson | 74/786 |
| 3,302,487 | 2/1967 | Kempson | 74/861 |
| 3,545,302 | 12/1970 | Schofield | 74/865 |

Primary Examiner—Benjamin W. Wyche
Assistant Examiner—Wesley S. Ratliff, Jr.
Attorney, Agent, or Firm—A. M. Heiter

[57] ABSTRACT

An automatic continuously variable transmission having a power train with a dual path hydromechanical unit and a multistep ratio mechanical gear unit connected in series for overall continuously variable ratio change. The hydromechanical unit has planetary gearing and a variable displacement hydrostatic transmission connecting the reaction and output members to provide progressive and step ratio change. The controls have an automatic gear unit control responsive to output speed and torque demand for step shifting the gear unit to higher gear ratios at higher speeds, and a hydrostatic control responsive to input speed, output speed, and throttle position having hydrostatic power transfer pressure and displacement control of hydromechanical unit speed ratio in first gear from zero at stall through the mechanical speed ratio at zero reaction member speed to the stepup speed ratio and a cycle on each gear shift to step change to a step-down ratio to provide the same overall ratio and to progressively increase the speed ratio from the step-down speed ratio through the mechanical speed ratio to the next step-up speedratio in intermediate gear ratios and, in the highest gear ratio, only up to the mechanical speed ratio. The overall speed ratio is continuusly varied from zero with all power transmitted hydraulically at stall for starting drive to maximum speed ratio with all power transmitted mechanically to meet an engine speed and vehicle speed program varying with throttle for optimum engine and vehicle performance.

19 Claims, 13 Drawing Figures

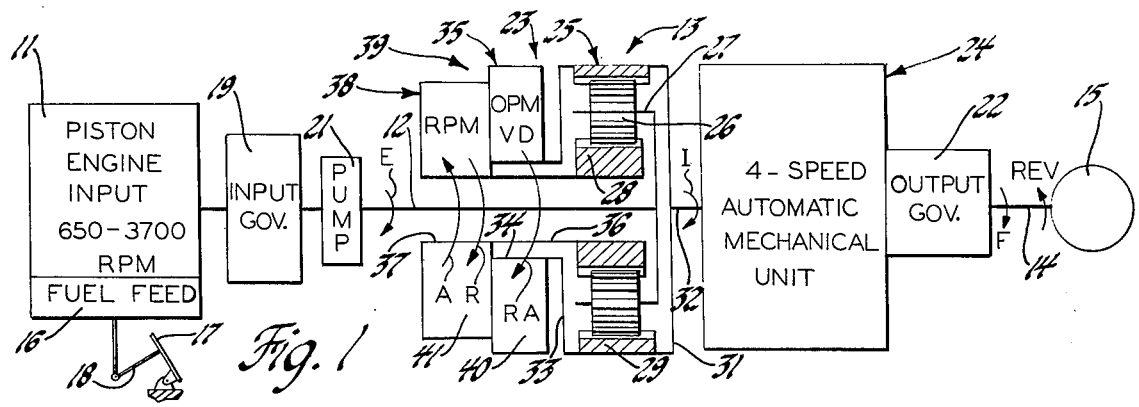
Fig. 1
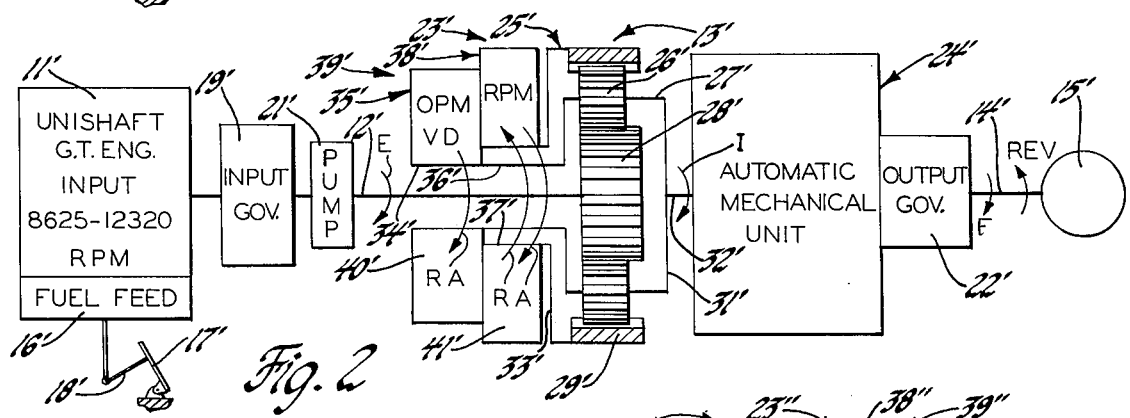
Fig. 2
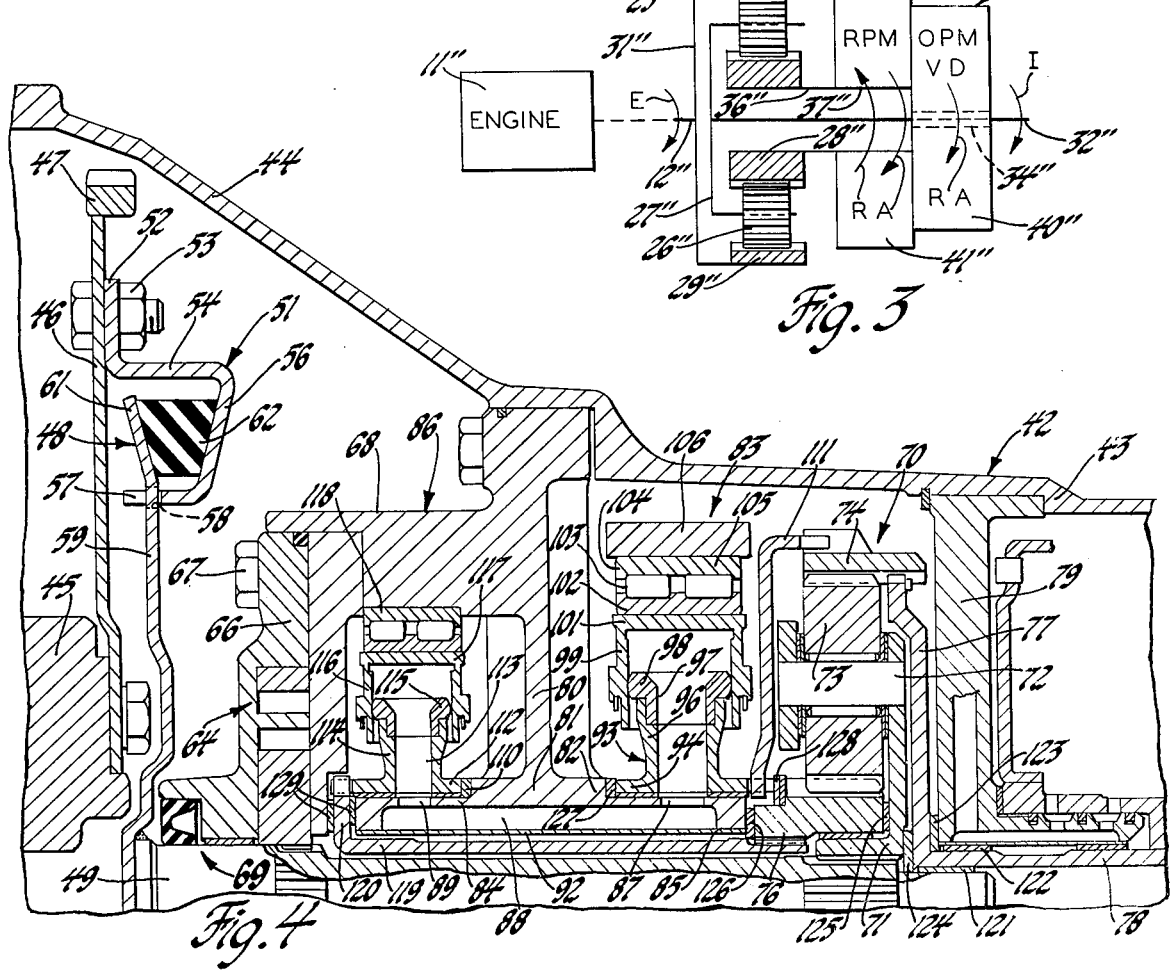
Fig. 3
Fig. 4 transmits torque in both directions in a continuously variable ratio in the hydraulic torque path between the reaction member and the output member. The mechanical torque path transmits a major portion, and the hydrostatic torque path the minor portion of input torque.

The multistep ratio gear or mechanical unit preferably has powershift gearing having a plurality of gear ratios with steps between the ratios transmitting all torque through a multistep ratio mechanical torque path between the hydromechanical unit output member and the transmission output or load member. The hydromechanical unit provides continuously variable speed ratio change increasing from zero speed ratio in a reaction phase speed ratio range to the speed ratio at zero reaction member speed, the stationary reaction speed ratio, and then in an action phase speed ratio range to higher speed ratios. The hydrostatic portion, in the reaction phase, transmits torque from the reaction member to the output member and loads or brakes the reaction member to decrease reaction member reaction direction speed from a high speed providing zero speed ratio in the hydromechanical unit to zero reaction member speed, or to hold the reaction member stationary relative to ground to provide the stationary reaction speed ratio in the hydromechanical unit to cause the power transmitted in the hydraulic torque path to decrease from 100% to 0%, and in the mechanical torque path to increase from 0% to 100%. Then in the action phase, the hydrostatic transmission transmits torque from the output member to the reaction member to drive the reaction member in the action direction, opposite to the reaction direction, to increase speed ratio from the stationary reaction speed ratio to a maximum speed ratio with power transmitted in the hydraulic torque path increasing from zero to a higher value.

The hydrostatic portion has a reaction hydrostatic converter drive connected to the reaction member of the gearing portion, an output hydrostatic converter drive connected to the output member of the gearing portion and hydromechanical unit and interconnecting power passages. The hydrostatic converters are rotary displacement-type pump-motor units. The reaction and output hydrostatic converters respectively function in the reaction phase as a pump and a motor, and in the action phase as a motor and pump. The hydrostatic converters have variable displacement means to vary the displacement ratio, the ratio of the displacement volume of the output to the reaction hydrostatic converter, from a positive maximum to zero in the reaction phase and from zero to a negative maximum in the action phase, a negative slope variation, preferably in a straight line, relative to increasing output speed. The displacement of the output hydrostatic converter similarly varies from the reaction phase positive maximum to zero for the stationary reaction speed ratio, and then to the action phase negative maximum, with increasing output speed providing increasing hydromechanical unit speed ratio. The reaction hydrostatic converter preferably has a constant positive displacement less than positive maximum displacement of the output hydrostatic converter.

The hydromechanical control portion controls the hydrostatic portion to control the ratios of the hydromechanical unit. The hydromechanical control portion has a power pressure control portion controlling the higher pressure in the power pressure passages to limit torque and control speed and torque ratios in a starting phase, and a displacement control portion to control speed and torque ratios in the accelerating phase in all speed ratios and during each gear ratio shift.

The starting portion of the 1st gear cycle begins at stall—zero speed ratio—where all or 100% power is transmitted through the hydraulic torque path of the hydrostatic portion of the hydromechanical unit, and in series through the multistep ratio gear unit in 1st gear ratio. As the transmission output speed increases and the vehicle begins to move from stall during the 1st gear cycle, the gear unit control portion maintains the gear unit in 1st gear ratio, and the hydromechanical control portion controls the hydrostatic portion to control the hydromechanical transition unit in response to increasing engine speed, output speed and torque demand to progressively increase the speed ratio in a reaction phase from zero speed ratio through a transition speed ratio to the stationary reaction speed ratio, the 100% mechanical torque path power speed ratio, and then to further increase the speed ratio in the action phase to the first step-up speed ratio at the 1st-2nd gear shift speed.

The vehicle starting drive, a low hydromechanical speed ratio range from zero to a transition speed ratio, is controlled by the power passage pressure control portion acting in a power pressure control phase to increase power passage pressure and to exhaust excess fluid as a function of increasing input speed, output speed, and torque demand, with the displacement control portion fixed in the maximum positive displacement ratio and the output hydrostatic converter in maximum positive displacement for motor operation of the output hydrostatic converter to cause pump operation of the reaction hydrostatic converter. Then the hydromechanical speed ratio is progressively increased from the transition speed ratio to the first step-up speed ratio by the displacement control portion in a displacement control phase in which the displacement ratio and the displacement of the output hydrostatic converter are decreased from the positive maximum through zero to the negative maximum, and the power pressure control portion does not regulate or exhaust power passage pressure. The hydromechanical speed ratio is increased from zero to the stationary reaction speed ratio in a reaction phase by reducing reaction direction speed of the reaction member from a maximum to zero in a reaction control phase. The reaction phase includes the power pressure control phase from zero to the transition speed ratio and a displacement control phase portion from the transition to the stationary reaction speed ratio. In the displacement control phase of the reaction phase, the displacement ratio and displacement of the output hydrostatic converter are decreased from a positive maximum to zero to cause the output hydrostatic converter to function as a motor and the reaction hydrostatic converter to function as a pump to brake the reaction member to increase hydromechanical speed ratio from the transition speed ratio to the stationary reaction speed ratio. Then the displacement control phase continues in an action phase in which the displacement control portion further decreases the displacement ratio and the output hydrostatic converter displacement from zero to a negative maximum ratio and displacement for pump operation of the output hydrostatic converter to cause the reaction hydrostatic converter to function as a motor to drive the reaction member in an action direction at speeds increasing from zero to maximum action direction speed to provide hydromechanical speed ratio increasing to the maximum, the first gear step-up speed

HYDROMECHANICAL MECHANICAL CONTINUOUSLY VARIABLE TRANSMISSION

BACKGROUND OF THE INVENTION

This invention relates to continuously variable transmissions and particularly to hydromechanical mechanical transmissions and controls.

This invention relates to applicant's copending application Ser. No. 759,800, concurrently filed Jan. 17, 1977.

This invention provides a continuously variable ratio transmission of wide ratio coverage having a continuously variable transmission unit and a multistep ratio gear transmission or mechanical unit connected in series for extending the mechanical unit ratio range capability in a continuously variable overall ratio range. The continuously variable ratio unit has a planetary gearing portion dividing input torque and transmitting torque to its output member in a constant torque ratio mechanical path, and a continuously variable portion connecting the reaction and output members of the planetary gearing portion and transmitting torque in a continuously variable ratio torque path. In the continuously variable unit, the continuously variable portion controls the reaction member speed of the gearing portion to, in a reaction phase, decrease the reaction direction speed from a high value to zero to increase the continuously variable unit speed ratio from zero to the stationary reaction speed ratio, and in an action phase increase action direction speed, which is opposite to reaction direction speed, to further increase the continuously variable unit speed ratio to a maximum value. The percent power transmitted in the continuously variable hydraulic path varies from 100% through 0% and then to a low percent and in the mechanical path inversely varies from 0% through 100% and then to a high percent as continuously variable unit speed ratio varies from zero speed ratio through the stationary reaction speed ratio to maximum speed ratio. When the mechanical unit is in first gear ratio, the continuously variable unit is controlled for progressive continuously variable speed ratio changes from zero speed ratio at vehicle stall, through the stationary reaction speed ratio to the maximum in 1st gear, which is the first step-up speed ratio, and a similar progressively continuously changing overall transmission speed ratio. Then, on each successive mechanical unit gear ratio step shift between gear ratios, the continuously variable unit step ratio shifts through a ratio step equal and opposite to the gear ratio step from each corresponding step-up speed ratio for the lower gear ratio through the stationary reaction speed ratio to the step-down speed ratio for the higher gear ratio to provide the same overall speed ratio before and after the shift. In each intermediate mechanical unit gear ratio, the continuously variable unit progressively continuously changes or shifts through the stationary reaction speed ratio to the step-up speed ratio, the maximum speed ratio, for each mechanical unit gear ratio to provide progressive continuously variable overall ratio change. The stationary reaction speed ratio is substantially the means between the corresponding pairs of step-up and step-down speed ratios. In the highest mechanical unit gear ratio, the continuously variable unit speed ratio changes from the step-down to the stationary reaction speed ratio, the maximum speed ratio in the highest gear ratio in an application, such as a highway vehicle, where the highest gear ratio is used a maximum percent of the driving time. In other applications where the highest ratio is used in a low percent of time and higher ratio coverage is needed, the action phase may be used. The percent power transmitted in the mechanical path, in the starting phase of 1st gear drive increases from zero to a high value, in the accelerating phase of 1st gear and the ratio change portion of higher gears varies between high values and 100% and in the highest speed ratio in the highest gear ratio is always 100%, to provide during normal highway driving operation a very high average percent power transmitted in the mechanical path. The step-up shifts in the mechanical unit and step-down shifts in the continuously variable unit are simultaneously made at shift points having the same hydromechanical efficiency in the lower and the higher ratio for synchronous power or energy transfer shifting providing the same power and speed ratio before and after an upshift.

The transmission control system, having a gear unit portion and a continuously variable unit portion, functions in response to transmission input speed and output speed signals and an engine torque demand signal, such as throttle pedal position, to provide step ratio shifts in the step ratio gear unit and both continuously variable and step ratio changes in the continuously variable unit coordinated for overall continuously variable speed ratio change from zero speed ratio at stall progressively to a maximum speed ratio having all mechanical drive. The gear unit control portion upshifts the gear unit at sequentially higher shift points to higher gear or speed ratios with increasing output speed. The upshift points are at higher output speed with increasing torque demand. The continuously variable portion functions in response to input and output speed and torque demand to vary the continuously variable unit coordinately with gear unit shifting for overall speed ratio change in accordance with an operation program for constant engine speed for optimum economy and performance at proper increasing engine speed values with increasing torque demand with increasing output or vehicle speed.

The continuously variable control portion functions in response to engine or input speed and torque demand, in response to a step-ratio shift at each shift point in the mechanical unit by the gear control portion which tends to change input or engine speed, to cause an equal and opposite step shift in the continuously variable unit speed ratio to provide the same overall speed ratio before and after the simultaneous step shift in both units and, in response to drive in each ratio in the mechanical unit, to cause progressive continuously variable unit speed ratio change at a rate increasing with increasing torque demand and decreasing with increasing gear speed ratio, to provide continuous uniform rate progressively increasing overall speed ratio, with the rate of increase increasing with torque demand. The continuously variable portion torque capacity is limited at and near zero continuously variable unit speed ratio to limit continuously variable unit and overall torque capacity and ratio.

The continuously variable ratio unit is a hydromechanical unit having a planetary gearing portion and a hydrostatic portion. The planetary gearing portion has an input member driven by the transmission input, a reaction member, and an output member driving the multistep ratio gear unit and divides the torque into the mechanical torque path and the hydraulic torque path and transmits torque in the mechanical torque path. The continuously variable bidirectional hydrostatic portion ratio, at the first second shift point of the mechanical unit.

The combination or product of the first step-up speed ratio and the 1st gear speed ratio provides the overall speed ratio at the first second shift speed. This 1st gear cycle provides continuously progressively variable overall speed ratio change from zero speed ratio to the overall speed ratio at the first second gear shift speed.

The second gear cycle begins with a shift portion at the first second shift speed. The controls step-up shift the gear unit from 1st to 2nd ratio and, in the same time period in response to engine speed, function to maintain constant engine speed and to prevent the normal reduction in engine speed caused by an upshift in a gear unit, by step-down shifting the hydromechanical unit from the first step-up speed ratio to a lower second step-down speed ratio so the overall speed ratio is the same before and after the shift. The second step-down speed ratio, in combination with 2nd gear speed ratio in the gear unit, provides the same, or substantially the same, overall speed ratio at the first second gear shift speed as the first step-up and 1st gear speed ratios. Then, with further increasing engine and output speed in the drive portion of the 2nd gear cycle, the controls retain the multistep ratio gear unit in 2nd gear ratio and provide displacement control operation in the reaction phase and action phase of the hydromechanical unit to progressively continuously increase the hydromechanical unit speed ratio from the second step-down speed ratio to a second step-up speed ratio at the second third gear shift speed to complete the 2nd gear cycle. The product of the second step-up speed ratio and the 2nd gear speed ratio and the third step-down and 3rd gear speed ratios provides the same overall speed ratio at the second third shift speed. There is a similar gear cycle during 3rd gear ratio or all intermediate gear ratio operation of the mechanical unit. In the highest, or 4th gear cycle in this example, the shift portion is the same as in the above-discussed 2nd gear cycle to make the third fourth shift without overall speed ratio change, and in the drive portion the controls maintain the gear unit in 4th speed ratio and control the hydromechanical unit to progressively increase the speed ratio from the 4th step-down ratio up to the stationary reaction speed ratio to provide the maximum overall speed ratio with all power transmitted mechanically.

In the 1st gear cycle, as speed ratio increases from zero through the transition and stationary reaction speed ratios to the step-up speed ratio, the power transmitted by the hydraulic torque path decreases from 100% at stall for high limited torque multiplication, and decreases to a lower value at the transition speed ratio, to zero at the stationary reaction speed ratio, and then increases from zero to a lower value at the step-up speed ratio. In the shift portion of each intermediate and the last, or 4th, gear cycle, and the drive portion of each intermediate gear cycle, the power transmitted by the hydraulic torque path decreases from a lower value to zero and then increases to a similar value, to provide an average power transmitted by the hydraulic torque path of about one-half the lower value. In the drive portion of the highest gear cycle, as the hydromechanical speed ratio progressively increases from the highest gear ratio step-down speed ratio to the zero power stationary reaction speed ratio and remains in this condition, the power transmitted by the hydraulic torque path decreases from the lower value to zero, so that all power is transmitted mechanically in the major portion of highway operation of a vehicle at normal road-load speeds for maximum mechanical efficiency.

The hydromechanical unit displacement-controlled progressive speed ratio ranges employed for acceleration in the intermediate gear shift cycles have a substantially equal portion of reaction phase speed ratio range below or less than the stationary reaction speed ratio and the action phase speed ratio range above or greater than the stationary reaction speed ratio, so the stationary reaction speed ratio is near the mean between the step-down and the step-up speed ratios in each gear ratio, and minimum power is transmitted hydraulically in the intermediate gear cycles for maximum use of the higher efficiency mechanical torque path. When the mechanical unit has conventional speed ratio steps employed in automatic transmissions with a hydrokinetic torque converter, the percent power transmitted in the hydraulic torque path has a maximum value of less than 30% and an average value less than 15%. The mechanical unit may have larger ratio steps to increase the speed ratio range with a lower average percent power in the hydraulic torque path. Thus, in normal vehicle highway driving operation, a very high average percent of mechanical path power is used for a high efficiency drive.

The controls provide coordinated control of the speed ratios of the mechanical and hydromechanical units to provide an overall continuously variable ratio change to control the relationship of engine or transmission input speed and transmission output or vehicle speed in relation to torque demand to provide in accordance with a program for maximum torque multiplication at maximum torque engine speeds to meet high-torque drive requirements and high-torque multiplication at maximum power engine speed for maximum power drive and for programmed decreasing torque ratio for decreasing torque requirements and increasing speed ratio for drive speed requirements providing the engine speed having optimum efficiency generally also the lowest engine speed meeting the drive torque and speed requirements determined by torque demand.

The hydromechanical speed ratio is controlled in the displacement control phase by input speed, which is influenced by mechanical unit speed ratio in relation to output or vehicle speed, and torque demand to provide in each higher mechanical unit speed ratio a hydromechanical unit speed ratio increasing at a lower rate relative to vehicle speed, so the overall speed ratio increases progressively at substantially the same rate. The hydromechanical unit speed ratio decreases with increasing torque demand and the mechanical unit upshifts at higher speeds with increasing torque demand, so the overall speed ratio decreases with increasing torque demand.

These and other features and advantages of the invention are further described in the following detailed description of the preferred embodiments shown in the drawings, wherein:

FIG. 1 is a schematic view of the power train having a piston engine and a transmission with a hydromechanical unit and an automatic gear shifting unit;

FIG. 2 is a schematic view of a first modified power train with a unishaft gas turbine engine and modified gearing in the hydromechanical unit;

FIG. 3 is a schematic view of a hydromechanical unit with another modified gearing;

FIG. 4 is a horizontal sectional structural schematic view of a modified hydromechanical unit with radial converters;

Figure 5:
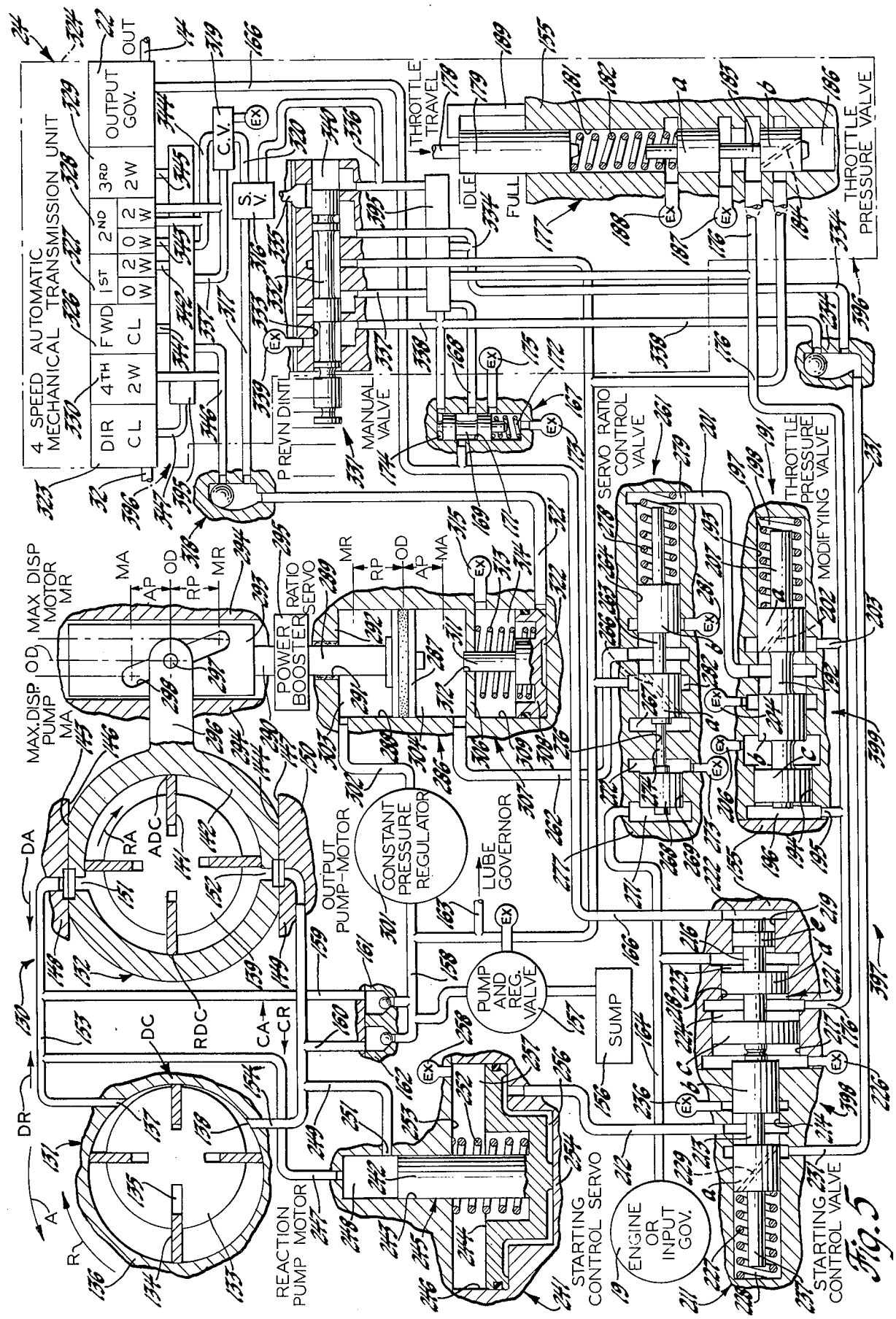
FIG. 5 is a schematic view of the control system.

The structure of the power train, a prime mover such as engine 11 and tranmission 13, is first described with regard to drive operation in which the engine drives the transmission input and the transmission output drives the load or vehicle. Then the overrun operation is described. The ratios, overall for transmission 13, mechanical or gear for mechanical unit 24, hydromechanical for hydromechanical unit 23, and gearing for its gearing portion 25, are output values divided by or over input values where the drive is from input-to-output throughout drive operation. Thus speed ratio is output speed over input speed; torque ratio is output torque over input torque, which is also called gear ratio, and numbered 1st, 2nd, etc., in ascending order of increasing speed ratios, decreasing torque ratios, and in the sequence used when accelerating a vehicle. The speed, torque, and displacement ratios of hydrostatic unit 39, in which in a reaction phase the torque transfer is from reaction driven hydrostatic converter 38 to output hydrostatic converter 35, and in an action phase the torque transfer is reversed, are stated as output values over reaction values, positive in the reaction phase and negative in the action phase.

The power train shown in FIG. 1 has an engine 11 driving input shaft 12 of transmission 13 which drives output shaft 14. The output shaft 14 drives a conventional vehicle drive 15 having a drive shaft, differential, and road wheels having an N/V ratio (output shaft speed in rpm, divided by vehicle speed in mph), e.g., 44.9, as used in the operating curves.

The engine 11 is a piston-type internal combustion engine providing, i.e., a speed range of 650 to 3700 rpm, and has fuel feed 16, i.e., a carburetor or injection fuel feed, controlled by throttle pedal 17 connected by suitable linkage, such as throttle rod 18, to control fuel feed 16 between 0% and 100% throttle. The engine output or transmission input shaft 12 drives input governor 19 and fluid pump 21 for the control hereinafter described. The output shaft 14 drives output governor 22. The transmission 13 has hydromechanical unit 23, and mechanical unit 24 of the four-speed automatic step ratio gear transmission type having conventional gearing and automatic shift controls, such as shown in U.S. Pat. No. 3,724,292 Borman, granted Apr. 3, 1973, but may be a three-speed transmission, such as shown in U.S. Pat. No. 3,321,056 Winchell et al, granted May 23, 1967. Both of these patents are incorporated herein by reference.

The hydromechanical transmission unit 23 has planetary gearing portion 25 having planetry pinions 26 rotatably mounted on input carrier 27 drive connected to input shaft 12. Each pinion 26 meshes with internal central gear or reaction sun gear 28 and external central or output ring gear 29 which is drive connected by drum and hub member 31 to intermediate shaft 32 which drives mechanical unit 24. The output ring gear 29 is also drive connected by drum and hub member 33 to rotor 34 of output-connected hydrostatic converter or pump motor 35 (OPM). The reaction sun gear 28 is drive connected by sleeve shaft 36 to rotor 37 of reaction-connected hydrostatic converter or pump motor 38 (RPM).

The reaction and output-connected hydrostatic converters 38, 35, are connected by fluid power pressure passages and have controls as shown in FIG. 5 and described below, forming hydrostatic transmission portion 39 of hydromechanical unit 23. The reaction and output hydrostatic converters 38, 35, function in a reaction phase respectively as a pump and motor, and in an action phase respectively as a motor and pump, in response to displacement control portion 399 to provide continuously variable and stepped speed and torque ratio change. The output and reaction hydrostatic converters 35, 38, respectively, have stators 40 and 41 nonrotatably mounted on a conventional stationary housing (not shown). The stator 40 for the variable displacement output hydrostatic converter 35 is slidably (FIG. 5) or swingably (FIG. 4) mounted on a housing to vary displacement, as hereinafter described. The hydrostatic porton 39, having hydrostatic converters 35 and 38, is a hydrostatic transmission and may be constructed as shown in U.S. Pat. No. 3,274,946 Simmons, granted Sept. 27, 1966, and/or U.S. Pat. No. 3,752,010 Tipping, granted Aug. 14, 1973, and preferably is constructed and arranged as shown in FIG. 4 and described below.

While both hydrostatic converters 35, 38, of hydrostatic transmission portion 39 may have variable displacement controls, in the preferred embodiment, only the output-connected hydrostatic converter 35 has variable displacement to simplify constant displacement reaction-connected hydrostatic converter 38 and the controls. The transmission operation is described for an engine 11 providing clockwise drive, as viewed from the front (arrow E) of input shaft 12 and carrier 27. The hydromechanical unit 23 provides the same direction output drive to intermediate shaft 32 (arrow I). The rotor 34 of output-connected hydrostatic converter or pump-motor 35 (OPM) rotates in the same direction (arrow RA) as intermediate shaft 32. Since the planetary gearing 25 has carrier 27 input, and ring gear 29 output, a hydromechanical overdrive stationary reaction speed ratio, e.g., 1.36, is provided when reaction sun gear 28 is stationary or at zero speed. The control system described below has a hydromechanical part 397 with a power pressure control portion 398, at times controlling power pressure, and a displacement control portion 399 (FIG. 5) controlling displacement of the variable displacement output hydrostatic converter 35 to control the speed and direction of rotation of rotor 37 of fixed displacement reaction hydrostatic converter 38 to control the speed of reaction sun gear 28 to control the speed ratio of the hydromechanical unit 23.

Figure 8:
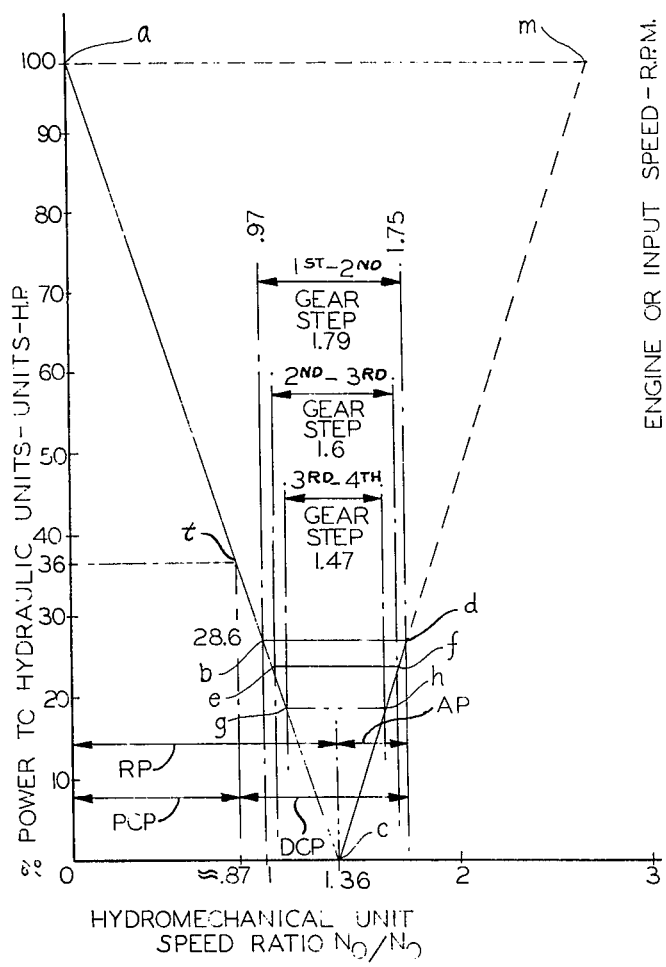
FIG. 8 shows a plot of the percent of total horsepower transmitted by the hydrostatic portion of the hydromechanical unit relative to the speed ratio of the hydromechanical unit.

In a reaction phase, the reaction-connected hydrostatic converter 38 functions as a pump, braking or retarding reaction rotation in the reaction direction (arrow R) of rotor 37 and reaction sun gear 28 to drive output-connected converter 35 in the reaction and action drive direction (arrow RA), functioning as a motor, and to control the planetary gearing 25 so as to provide a reaction phase speed ratio range (arrow RP, FIG. 8) of the hydromechanical unit 23 from stall, zero speed ratio up to the stationary reaction speed ratio with reaction sun gear 28 stationary, e.g., 1.36, (curve ac, FIG. 8). Then, in an action phase, the output converter 35 functions as a pump, rotating in drive direction (arrow RA), to drive the fixed displacement reaction hydrostatic converter 38 as a motor driving rotor 37 and reaction sun gear 28 in an action direction (arrow A) for further overdrive operation of the planetary gearing 25 to provide a higher overdrive action speed ratio range (arrow AP, FIG. 8) of hydromechanical unit 23 from the speed ratio with sun gear 28 stationary or zero hydraulic power speed ratio, e.g., 1.36, to the first step-up speed ratio, e.g., 1.75, (curve cd, FIG. 8).

In the reaction phase of the 1st gear cycle, hydromechanical speed and torque rartio is initially controlled by controlling power pressure by power pressure control portion 398 at constant relative displacement in a pressure control phase (arrow PCP, FIG. 8), from zero speed ratio to a transmission speed ratio (points a to i t, FIG. 8). Then the power pressure control portion 398 ceases to regulate power pressure, and displacement control portion 399 functions to increase hydromechanical speed ratio in a displacement control phase (arrow DCP, FIG. 8) first in the reaction phase to the stationary reaction speed ratio, points t to c, and then in the action phase to maximum or 1st step-up speed ratio, points c to d. These gear cycle points a, t, c, and d (FIG. 8), correspond respectively to points 355, 356, 366, and 357 of FIGS. 10 and 11.

Then in a 2nd gear cycle beginning with a shift portion at the 1-2 upshift speed, mechanical unit 24 upshifts from 1st to 2nd gear to step up the gear speed ratio by the 1-2 gear step, and hydromechanical unit 23 step downshifts from a 1st step-up speed ratio through the zero hydraulic power stationary reaction speed ratio to a 2nd step-down speed ratio at the 1-2 shift speed (points d, c, b, FIG. 8; 357, 371, 358, FIGS. 10, 11, respectively), by a step equal to the 1-2 gear step and having near-equal portions in the reaction and action phases for maximum hydraulic power transfer. As the 2nd gear cycle continues in a drive portion, mechanical unit 24 remains in 2nd gear ratio, and hydromechanical unit 23 progressively increases speed ratio through zero hydrualic power speed ratio to 2nd step-up speed ratio (points b, c, f, FIG. 8; 358, 367, 359, FIGS. 10, 11, respectively), having near-equal portions in the reaction and action phases for minimum hydraulic power transfer. Similar gear cycles occur in each gear ratio except the highest, e.g., 4th, of mechanical unit 24 where the speed ratio of hydromechanical unit 23, in the drive portion of the highest gear cycle, is increased from the highest step-down speed ratio only to the stationary reaction member, zero hydraulic torque path power, speed ratio (respectively, g, c, FIG. 8, and 363, 364, FIG. 11) for 100% mechanical power during the major portion of road-load operation.

The maximum speed ratio employed (point d, FIG. 8) is less than the available maximum speed (M), e.g., 2.78, so a low percent of power is transmitted in the hydraulic torque power path by hydrostatic power 39, as compared to the power transmitted in the mechanical power path by gearing portion 25 of hydromechanical unit 23. The torque ratio, e.g., 0.735, of gearing portion 25, or mechanical torque and power path of hydromechanical unit 23 is the same in all phases of operation. The speed and torque ratio of the hydrostatic portion 39 and hydromechanical unit 23 are varied by the power pressure and displacement control portions of the hydromechanical control part 397 described below and, within torque ratio limits, have an inverse functional relation.

The control system described below, with increasing vehicle speed, provides in hydromechanical unit 23 a progressively variable increasing speed ratio in each gear ratio of mechanical unit 24 and a step downshift of hydromechanical unit 23 coordinated with the gear ratio step upshift of mechanical unit 24, to provide the same, or substantially the same, speed ratio before and after a gear ratio shift combined to provide overall progressively continuously variable speed ratio change with vehicle speed at a substantially uniform rate of change at each engine throttle position and with the rate of change increasing with increasing throttle position. The shifts in hydromechanical unit 23 and mechanical unit 24 are made at a shift point at the same efficiency of hydromechanical unit 23 in the two adjacent gear ratio drives of mechanical unit 24 between which the shift is made (% efficiency curves E, FIGS. 12 and 13) to provide the same power and speed ratio before and after the shift for optimum shift quality, with maximum utilization of the mechanical torque path power and minimum utilization of the hydraulic torque power path in hydromechanical unit 23 (% power transmitted hydraulically curves ☐ FIGS. 10 and 11). The overall speed ratio range is large, e.g., 0 to 2, with overdrive 4th gear drive, e.g., 1.47, and stationary reaction overdrive speed ratio, e.g., 1.36, in the forward direction (arrow F, FIG. 1).

The transmission 13, since it includes hydromechanical unit 23 and mechanical unit 24, each being a transmission capable of independent use, is described with regard to its drive train as a hydromechanical mechanical transmission. With regard to ratio changes, transmission 13 is an overall progressively continuously variable ratio transmission. The hydromechanical unit 23 has a dual power path, the mechanical power path of planetary gearing portion 25 and the hydraulic power path of hydrostatic portion 39, and provides in this transmission stepped continuously variable ratio change having a series of continuously variable ratio change phases with ratio change steps between these phases. The mechanical unit 24 is a stepped ratio gear transmission having automatic output speed and torque demand responsive powershift controls described below.

The modified power train shown in FIG. 2 is similar to the power train shown in FIG. 1, and like reference numerals, primed, have been used to indicate the similar components. With reference to the above FIG. 1 description for the similar features and parts, the modified features and arrangement are now described.

The engine 11' is a conventional unishaft gas turbine engine having an input speed range, e.g., 8,625 to 12,320 rpm, and a gas turbine-type fuel feed mechanism 16' controlled by a throttle pedal 17'. The transmission 13' has a hydromechanical unit 23' and a mechanical unit 24' which may be a 3- or 4-speed type like mechanical unit 24.

The hydromechanical unit 23', in view of the higher engine input speed range, has reduction planetary gearing portion 25'. The input shaft 12' is connected to drive input sun gear 28' and planetary pinions 26' are rotatably mounted on output carrier 27' which is connected by drum and hub member 31' to intermediate shaft 32'. The reaction ring gear 29' is drive connected by drum and hub member 33' to rotor 37' of reaction connected hydrostatic converter 38' (RPM). The output carrier 27' is connected by sleeve shaft 36' to rotor 34' of output connected hydrostatic converter 35' (OPM).

The FIG. 2 transmission 13' functions like the FIG. 1 transmission 13, but reduction planetary gearing portion 25', having an underdrive torque or gear ratio, e.g., 3.08, provides a reduction or underdrive stationary reaction speed ratio, e.g., 0.325. The control system similarly controls the power pressure and displacement of the variable displacement output connected hydrostatic converter 35' which always rotates in the drive direction (arrow RA). The stationary displacement reaction connected hydrostatic converter 38' operates as a pump brake, rotating in the reaction direction (arrow R), to provide the reaction speed ratio range, from zero speed ratio to the stationary reaction reduction speed ratio, e.g., 0.325, and operates as a motor rotating in the action direction (arrow A) in the action speed ratio range, from this speed ratio to higher reduction speed ratios. The maximum or first step-up speed ratio in the action phase is only a moderately higher underdrive ratio, e.g., 0.416, a half-step more than the stationary reaction speed ratio. The second step-down speed ratio, e.g., 0.232, is a half-step less than the stationary reaction speed ratio.

The controls jointly control mechanical unit 24' and hydromechanical unit 23' in the same manner to provide the same type hydromechanical ratio control in a low underdrive speed ratio range, and thus a low underdrive overall speed ratio range, e.g., 0 to 0.477.

FIG. 3 is a partial view illustrating a portion of another modification of the FIG. 1 power train. Thus the FIG. 1 reference numerals, double-primed, have been employed, and the modifications are described below with reference to the above description of FIG. 1.

In FIG. 3, the transmission input shaft 12" is driven by engine 11", as in FIG. 1, and is connected by drum and hub member 31" to input ring gear 29". The planetary pinions 26" are rotatably mounted on output carrier 27" which is drive connected to intermediate shaft 32". The reaction sun gear 28" is drive connected by sleeve shaft 36" to rotor 37" of the fixed displacement reaction connected hydrostatic converter 38" (RPM). The variable displacement output connected hydrostatic converter 35" (OPM) has its rotor 34" drive connected to intermediate shaft 32". The planetary gearing portion 25", having an underdrive gear and torque ratio, e.g., 1.3, with the input to ring gear 29", carrier 27" providing the output and the reaction sun gear 28" speed controlled by the fixed displacement reaction connected hydrostatic converter 38" to provide a speed ratio in an underdrive range increasing from zero or stall through the stationary reaction speed ratio, e.g., 0.769, to the step-up speed ratio, e.g., 0.987, and then cycles on a shift to the step-down speed ratio, e.g., 0.551. The same controls are used to control this arrangement in the same manner as described for FIG. 1 to provide an intermediate overall speed ratio range, e.g., 0 to 1.1.

In FIG. 1 and similarly in FIGS. 2 and 3, when the engine 11 drives input shaft 12 in the normal direction, clockwise as viewed from the front (arrow E), the hydromechanical unit 23 drives intermediate shaft 32 in the same direction (arrow I), and mechanical unit 24 provides forward drive of output shaft 14 in the same direction (arrow F) and opposite reverse drive (arrow REV); also, output connected hydrostatic converter or pump-motor 35 (OPM) rotates in the same clockwise direction (arrow RA) when operating as an action phase pump or a reaction phase motor. In FIG. 1 the reaction hydrostatic converter or pump-motor 38 (RPM) has reaction phase pump operation rotation in the same clockwise direction (arrow R), and action phase motor operation rotation in the opposite direction (arrow A). In FIGS. 2 and 3 these directions of reaction and action phase rotation are reversed (arrows R and A). In FIGS. 2 and 3, as in FIG. 1, as speed ratio increases from zero to the stationary reaction speed ratio, hydraulic torque path power decreases from 100% to 0%, and mechanical torque path power increases from 0% to 100%. The same type controls control the FIGS. 1, 2, and 3, calibrated to provide the same type coordinated shifting in hydromechanical and mechanical units 23 and 24.

HYDROMECHANICAL TRANSMISSION UNIT STRUCTURE

FIG. 4 shows a structural arrangement of hydromechanical unit 23 of transmission 13 shown in FIG. 1. The transmission has housing 42 having barrel portion 43 enclosing mechanical unit 24 and bell portion 44 conventionally bolted to engine 11 and enclosing hydromechanical unit 23. The engine shaft 45 is drive connected to drive flexplate 46 having starter ring gear 47 at its outer perimeter. The flexplate 46 is drive connected by torsional damper 48 to transmission input shaft 49. The damper 48 has input member 51 having radial flange 52 suitably secured by bolts 53 to flexplate 46. The input member 51 also has axial portion 54 and sloped annular portion 56 having at its inner end axial tangs 57 projecting through limited peripheral slots 58 in input disc 59 which is drive connected by a weld to input shaft 49. The input disc 59 has at its outer perimeter a sloped annular portion 61, similar, but oppositely sloped with respect to sloped annular portion 56 of input member 51. An annular ring 62, of rubber-like material having a trapezoidal cross-section with the outer long side parallel to the inner short side and inwardly converging ends bonded to the annular sloped portions 56 and 61 to provide a vibration damping drive connection normally providing drive through ring 62. The tangs 57 engage the ends of slots 58 to prevent overstressing ring 62.

Input shaft 49 drives the internal gear of internal-external gear pump 64 which is enclosed in a two-part housing 66 secured by screws 67 to support wall 68 secured in bell portion 44 and supporting hydrostatic converters 83, 86. Bearing and seal 69 in the forward end of gear pump housing 66 supports the forward end of input shaft 49. Input shaft 49 extends through bore 85 in dual-pintle 81 of hydrostatic converters 83, 86 to drive planetary gearing portion 70 and is spline-drive connected to the hub portion of planetary gear carrier 71. The carrier 71 has a plurality of pinion shafts 72 rotatably supporting the planetary pinions 73 which mesh with ring gear 74 and sun gear 76. The ring gear 74 is spline-drive connected to output disc 77 integrally formed with or welded to the end of intermediate shaft 78 which provides the input to mechanical unit 24 and is supported by dividing wall 79 between barrel portion 43 and bell portion 44 of housing 42.

The support wall 68 has radial wall 80 which centrally supports axially extending dual-pintle 81 which has one pintle portion 82 for ring gear-connected output hydrostatic converter 83 and another pintle portion 84 for sun gear-connected reaction hydrostatic converter 86. Dual-pintle 81 is a sleeve having an internal bore 85. The pintle portions 82 and 84 each have a pair of ports, one on each side, extending circumferentially less than 180 degrees, and each pair of ports is interconnected by a power passage. On the one side of dual-pintle 81 that is shown, pintle portion 82 has a first port 87 for output hydrostatic converter 83 connected by a first axial power passage 88 to the first port 89 in pintle portion 84 for reaction hydrostatic converter 86. On the other side (not shown) there is a similar second port in each pintle portion 82, 84 for each hydrostatic converter 83, 86, and a second connecting power passage. These connecting power passages are formed, as shown by passage 88, as a recess in internal bore 85 of dual-pintle 81 and are individually sealed by internal sealing sleeve 92 which is secured and sealed in internal bore 85 of dual-pintle 81. Output hydrostatic converter 83 has rotor 93 having cylindrical portion 94 with an internal bearing to rotatably mount and seal rotor 93 on pintle portion 82, and a plurality of radially extending arms 96, each having a radial passage 97 connecting consecutively with first port 87 and the second port in pintle portion 82 during rotation of rotor 93. Each arm 96 has a circular piston member 98 having a spherical surface engaging the internal cyclindrical wall of cylinder 99 which has a bearing base 101 engaging inner race 102 of roller bearing 105 having rollers 103 and outer race 104 which is mounted in displacement-varying stator support ring 106. The support ring 106 is conventionally nonrotatably supported in housing portion 43 for vertical sliding movement and moved by a servo motor. Conventional guides, as shown in FIG. 5, or as taught by the above Simmons patent, may be used. The support ring 106 may also be pivoted to housing portion 43 at one side and pivotally connected at the opposite side on the horizontal axis to a displacement control rod operated by the displacement controls of FIG. 5 to swing so as to vary displacement. The drive disc 111 is splined to rotor 93 and ring gear 74 to provide a drive connection between ring gear 74 and rotor 93.

The hydrostatic reaction converter 86 has a similar rotor 112 rotatably mounted and sealed on pintle portion 84 having passage 113 in each of a plurality of arms 114 having an annular piston 115 with a spherical surface cooperating with the cylindrical surface of cylinder 116. Cylinders 116 have slipper bearing base 117 in bearing engagement with the inner surface of the inner race of roller bearing 118 which has its outer race fixed in a bore in support wall 68 which provides the stator. Since hydrostatic converter 86 is a constant or fixed or stationary displacement converter, roller bearing 118 is not mounted in a displacement varying support ring. A sleeve shaft 119, located in bore 85 of dual-pintle 81 and surrounding input shaft 49, is spline-connected to sun gear 76 and has a hub portion 120 spline-connected to rotor 112 to provide a drive connection between sun gear 76 and rotor 112 of hydrostatic converter 86. Input shaft 49 extends through sleeve shaft 119 to drive carrier 71 and is piloted by bearing 121 in intermediate shaft 78 which is supported by bearing 122 in dividing support wall 79. Thrust bearing 123 between wall 79 and output disc 77 and thrust bearing 124 between disc 77 and carrier 71 axially locate intermediate shaft 78 and ring gear 74 relative to input shaft 49 which is axially positioned by bearing 69. Sun gear 76 has thrust bearings 125 and 126, one at each side, to locate sun gear 76 between fixed dual-pintle 81 and carrier 71 to function with thrust bearings 123, 124, to axially locate planetary gearing portion 70 relative to support walls 79 and 68. The rotor 93 is axially located between a shoulder and thrust bearing 127 on pintle portion 82 and thrust bearing 128 engaging sun gear 76. Thrust bearings 129, one on each side of hub portion 120 of sleeve shaft 119, engage pump housing 66 and pintle portion 84 to axially locate sleeve shaft 119. Rotor 112 is axially located between the shoulder and bearing 110 on pintle portion 84 and hub portion 120 of sleeve shaft 119.

CONTROL SYSTEM PARTS

Figure 9:
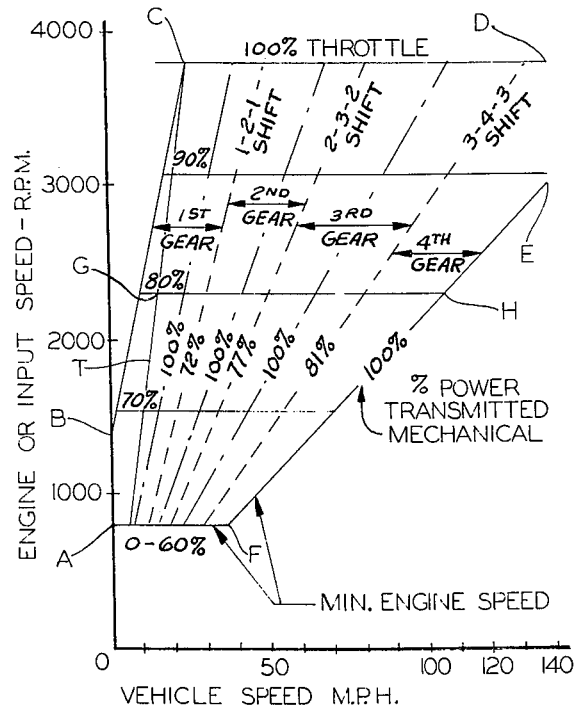
FIG. 9 shows a plot of the operation program of the relation of engine and vehicle speed for upshift and downshift operation provided by the transmission drive train and controls at illustrative throttle settings, the shift points, and percent torque transmitted mechanically in the hydromechanical unit.

The control system of FIG. 5 has mechanical unit control part 396 and hydromechanical unit control part 397 which has power pressure control portion 398 and displacement control portion 399, and is described with reference to transmission 13, FIG. 1. The control system employs input speed governor 19, input driven control pressure fluid pump 21, output speed governor 22, which are drive connected to transmission 13 and throttle pedal linkage 18, as shown in FIG. 1 and described above, to provide the same control pressure and signals to coordinate ratio control of hydrostatic transmission portion 39 (FIG. 1) or 130 (FIG. 5), for hydrostatic control of the ratio of hydromechanical unit 23 and ratio control of mechanical unit 24 which are drive connected to provide the continuously variable overall ratio control of transmission 13, FIG. 1. Pump 21 provides a common source of control pressure fluid for the control system. The mechanical unit control part 396, as shown in the above Borman patent, functions in response to an output governor 22 signal and a torque demand signal provided by throttle valve 177 controlled by throttle linkage 18 to step shift mechanical unit 24 to higher ratios at higher output speeds which are increased with higher torque demand. The hydromechanical control part 397 includes displacement control portion 399, which functions in response to intput speed governor 19 signal and the same torque demand signal to control displacement of hydrostatic portion 130, and power pressure control portion 398 which functions in response to input speed governor 19 signal, output governor 22 signal, and the same torque demand signal to control hydrostatic power pressure of hydrostatic portion 130 to jointly control hydrostatic porton 130 to control hydromechanical unit 23 ratio. The mechanical and hydromechanical control parts 396, 397 function in response to control signals that are common or interrelated by the drive train of transmission 13 to provide coordinated mechanical unit 24 and hydromechanical unit 23 ratio control to meet the overall continuously variable ratio control program (FIG. 9). The control system valves and other control components have bores in a control body 155 having portions located with regard to their mechanical and hydraulic functions, and a portion or portions having valve groups which may include valves in both the mechanical and hydromechanical control parts 396, 397.

HYDROSTATIC UNITS AND POWER SYSTEMS

The hydrostatic portion 130 (FIG. 5) is shown with vane-type hydrostatic converters 131, 132, as viewed from the input end of transmission 13, to clearly illustrate the displacement control arrangement and hydraulic operation which is the same as the above-described hydrostatic portion 39. The rotors and stators of converters 131, 132 of hydrostatic portion 130 (FIG. 5) are drive connected to the gearing portion 25, like the rotors and stators of converters 38, 35 of hydrostatic portion 39 of FIG. 1 described above. While the radial hydrostatic converters 83, 86 (FIG. 4) are structurally preferred, other hydrostatic converters and hydrostatic transmissions may be used.

The fixed displacement reaction-connected vane-type hydrostatic converter 131 has a circular rotor 133 drive connected to reaction sun gear 28 (FIG. 1) and has a plurality of vanes 134 mounted for reciprocating movement in guide slots 135 in rotor 133 and biased by conventional biasing means (not shown) into sealing engagement with the circular internal surface of fixed stator 136 which is eccentric to rotor 133. First and second ports 137 and 138 are located on opposite sides of the point of closest proximity between the rotor and stator, minimum volume dead center (point DC). One port is a supply port, and the other port is a return port, depending on the direction of fluid flow and power transfer, which is reversed in different operating phases described below.

The variable displacement output-connected vane-type hydrostatic converter 132 has a circular rotor 139 drive connected to intermediate shaft 32 (FIG. 1). The vanes 141 are similarly mounted and biased into sealing engagement with the circular internal surface of stator 142. The stator 142 has parallel flat guide bearing surfaces 143 and 144 on opposite sides thereof, respectively engaging guide bearing surfaces 146 and 147 on guides 148, 149, which are fixed on or formed integrally with housing 150 to guide stator 142 during displacement varying movement from the zero displacement position (OD) shown, holding reaction sun gear 28 stationary and providing the stationary reaction hydromechanical speed ratio, e.g., 1.36 overdrive, and in the action phase (AP) direction providing increasing overdrive speed ratios to the maximum displacement action phase position (MA, FIG. 5), and in the opposite reaction phase (RP) direction providing decreasing speed ratios to the maximum displacement reaction phase position (MR).

The stator 142 has first and second ports 151, 152 which may function as supply or return flow ports, depending on the direction of flow, and are located on opposite sides of the dead centers, reaction dead center (point RDC), having minimum volume during motor operation in the reaction phase (RP), and action dead center (point ADC), having minimum volume during pump operation in the action phase (AP). The ports 151, 152, at the interface of guide bearing surfaces 143, 144 and 146, 147, have sufficient length so that the ports and the power passages 153, 154 are not restricted during displacement varying movement.

First power transfer passage 153 connects first port 137 of reaction-connected hydrostatic converter 131 and first port 151 of output-connected hydrostatic converter 132. Second power transfer passage 154 connects second ports 138 and 152 respectively of converters 131 and 132. The direction of fluid flow of these power transfer passages 153, 154 depends on the direction of power transfer between hydrostatic converters 131, 132. During drive operation, first power transfer passage 153 is under high supply pressure, and flow is from reaction-connected converter 131 to output-connected converter 132 (arrow DR) in the reaction phase, and reversed (arrow DA) in the action phase. The return low-pressure flow in second power transfer passage 154 is in the opposite direction in each phase.

When hydromechanical control part 397 is in the reaction range providing reaction range control of hydrostatic portion 39 of hydromechanical unit 23, the hydromechanical speed ratio varies from stall or zero speed ratio to the stationary reaction speed ratio (curve ac, FIG. 8). Sun gear 28 drives rotor 133 in the reaction direction (arrow R), so fixed displacement reaction-connected hydrostatic converter 131 acts as a pump-brake, providing a reaction force to sun gear 28 and pumping high-pressure fluid power through first power passage 153 in direction (arrow DR) to drive variable displacement output-connected hydrostatic converter 132 as a motor to drive intermediate shaft 32 in the forward direction (arrows RA,I). The second power transfer passage 154 returns low-pressure fluid to reaction-connected hydrostatic converter 131. When variable displacement output-connected hydrostatic converter 132 is in the maximum displacement reaction phase (MR) or motor-operating position, hydromechanical unit 23 provides the starting speed ratio range between zero speed ratio and the transition speed ratio in which speed ratio is controlled in a pressure control phase (curve a–t, FIG. 8) by the pressure control portion 398. The speed ratio increases from the transition speed ratio to the stationary reaction speed ratio (e.g., 1.36) as the displacement of hydrostatic converter 132 is decreased in the reaction phase to zero to hold rotor 133 and sun gear 28 stationary. When the displacement of variable displacement hydrostatic converter 132, by continuous movement in the same direction, is increased in the action or pump-operating phase, variable displacement output hydrostatic converter 132 acts as a pump, supplying high-pressure fluid to first power passage 153 in the opposite direction (arrow DA) to drive fixed displacement reaction hydrostatic converter 131, now acting as a motor and providing a supplemental input to sun gear 28 in the action phase motor-operating direction (arrow A) to further increase the speed ratio in an overdrive range, from stationary reaction speed ratio to maximum or step-up speed ratio (curve c–d, FIG. 8). Second power passage 154 returns low-pressure fluid power from reaction hydrostatic converter 131 to output hydrostatic converter 132. This speed ratio change in hydromechanical unit 23 and the speed ratio change in mechanical unit 24 are coordinated by the control system described below.

FLUID SUPPLY

The control system has a sump 156, preferably common for both hydromechanical unit 23 and automatic or mechanical unit 24, which receives lubrication overage, exhaust and leakage fluid from the drive and control system of both units. The conventional pump and regulator valve 157 or source of regulated pressure, which includes input pump 21 (FIG. 1), delivers regulated mainline pressure (e.g., 100 to 200 psi) from sump 156 to mainline 158 for the control system, both hydromechanical control part 397 and mechanical control part 396, and exhausts excess fluid. First and second charging lines 159, 160, having respectively first and second check valves 161, 162, connect mainline 158 to first and second power transfer passages 153, 154 to supply charging fluid to the lower pressure passage when it is normal, less than mainline pressure, and to block exhaust from the higher pressure power passage to charge the hydrostatic unit power system and maintain a supercharge or minimum pressure equal to mainline pressure in the one of power passages 153, 154 acting as the low-pressure return passage.

SPEED GOVERNORS

Figure 6:
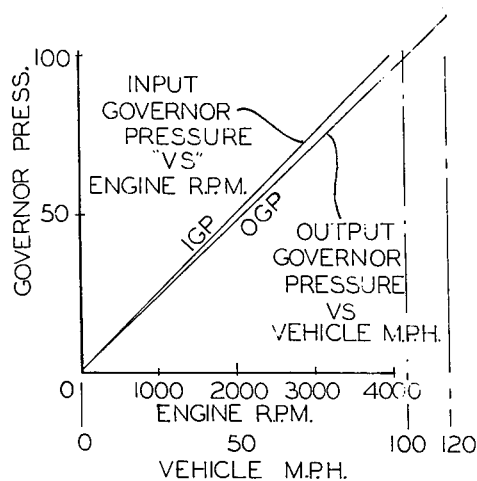
FIG. 6 shows input and output governor pressure curves, respectively, relative to engine and vehicle speed.

The mainline 158 has branch lubrication and governor supply line 163 connected to conventionally lubricate transmission 13 and to supply fluid during both forward and reverse drive operation to input speed governor 19, which provides an engine or input governor pressure signal (curve IGP, FIG. 6) in input governor line 164 proportional to the speed of engine 11 and input shaft 12, and to output governor 22, which provides an output governor pressure signal (curve OGP, FIG. 6) in output governor line 166 proportional to the speed of output shaft 14 in both the forward and reverse directions. The governors 19 and 22 are conventional, e.g., like flyweight governor 171 of the above-mentioned Borman patent. The output governor 22 must be of this or another type that functions during both forward and reverse drive. The input governor pressure in line 164 is used only in hydromechanical control part 397 for hydromechanical unit 23 in both forward and reverse drive. The output governor pressure in line 166 is used in hydromechanical control part 397 in both forward and reverse, and in mechanical control part 396 only in forward. In some automatic transmissions, such as the above-mentioned Borman patent, Borman's output governor 171 is supplied only in forward drive by his manual valve controlled forward drive line 161, so output governor pressure is available only in forward drive. In this transmission 13, output governor line 166 is connected through a normally open cut-off valve 167 to mechanical unit control part 396 forward drive output governor pressure line 168, which is like Borman's output governor line 176. Cut-off valve 167 has a valve element 169 located in bore 171 in valve body 155, normally biased by a spring 172 seated in the end of bore 171, vented by exhaust 173, to the open position shown, connecting output governor pressure line 166 to forward output governor line 168 of mechanical control part 396. In mechanical unit 24 when manual valve 331 is in reverse position, supplying mainline pressure from mainline 158 to reverse-range line 338 and chamber 174 at the closed end of bore 171, the cut-off valve 167 is closed, blocking output governor line 166 and connecting forward output governor line 168 to exhaust 175, so output governor pressure is not supplied in line 168 in reverse drive to mechanical control part 396. The input-output governors 19 and 22 are preferably multiple-weight governors providing a stepped, and thus straighter, governor pressure curve. The governor pressure curves are shown in FIG. 6 as straight lines which rise at about the same rate, from 0 to 100 psi governor pressure with speed; the input governor pressure is 100 psi at 4000 engine rpm, and the output governor pressure is 100 psi at 100 mph of the vehicle.

THROTTLE PRESSURE VALVE

The control system, both the hydromechanical control part 397 and the mechanical control part 396, use a torque demand signal or throttle position modulated throttle pressure in throttle pressure line 176. While the conventional vacuum-modulated valve 130 of the above Borman patent may be used, a conventional throttle pedal-actuated throttle pressure valve 177 is preferred to provide a throttle pressure curve (curve TP, FIG. 7) varying in a straighter-line relation to torque demand for operation of hydrostatic portion 130, especially during initial acceleration of the vehicle. The throttle pressure valve 177 has rod 178, which is part of throttle linkage 18 and moves with movement of throttle pedal 17 from idle to full throttle positions, and similarly moves member 179 in the open end of bore 181 in body 155 to increase the force applied by spring 182 to regulating valve element 183 having equal diameter lands $a$ and $b$ slidable in bore 181 for limited regulating movement. The throttle pressure line 176 is always connected to bore 181 between lands 183$a$ and 183$b$ and through passage 184 in land 183$b$ to chamber 186 in the closed end of bore 181 to act on land 183$b$ to oppose the force of spring 182. Throttle pressure in line 176 is regulated, when low, by being connected to mainline 158 and, when high, by being connected to exhaust 187. Exhaust 188 vents the bore 181 between regulator valve element 183 and member 179. Adjustable stop 189, fixed to valve body 155, limits movement of member 179 by spring 182 beyond idle position.

MODIFIED THROTTLE PRESSURE VALVE

The modified throttle pressure valve 191 operates in response to throttle pressure or torque demand pressure signal (curve TP, FIG. 7) which increases in a straight line relation with percent throttle opening to provide a modified throttle pressure or modified torque demand pressure signal (curve MTP) which remains at zero pressure from 0%, idle, throttle position up to a high mean throttle position, e.g., 60%, and then increases in a straight line relation to the same pressure as throttle pressure (curve TP) at 100%, full, throttle position. The modified throttle pressure valve 191 has a valve element 192 having equal small diameter lands $a$ and $b$ in small diameter bore portion 193 and a large diameter land 192$c$ in large diameter bore portion 194. Throttle pressure line 176 is connected by control branch 195 to throttle pressure chamber 196 at the closed end of large diameter bore portion 194 to act on the end of large diameter land 192$c$ to bias valve element 192 in a modified throttle pressure increasing direction against the opposing bias force of spring 197 and modified throttle pressure both in closed chamber 198 at the opposite end of small diameter bore portion 193, and acting on the end area of land 192$a$. The valve element 192, in all regulating positions, connects the space between lands 192$a$ and 192$b$ to modified throttle pressure line 201, and by passage 202 through land 192$a$ to supply modified throttle pressure to closed chamber 198. The valve element 192 is at throttle pressure values up to a normal idle or higher starting value, e.g., 60% throttle, biased by spring 197 against throttle pressure bias in chamber 196 to exhaust position, blocking supply branch 203 of throttle pressure line 176 and connecting modified throttle pressure line 201 to exhaust 204 for zero modified throttle pressure, and then regulates, in response to higher throttle pressures, e.g., above 60%, in chamber 196, to increase the bias and the opposing bias of modified throttle pressure in chamber 198, by connecting modified throttle pressure line 201 to throttle pressure supply branch 203, to increase modified throttle pressure, or to exhaust 204 to decrease modified throttle pressure, providing regulated modified throttle pressure (curve MTP, FIG. 7). Exhaust 206, at the step between the small and large diameter bore portions 193, 194, provides an exhaust for leakage fluid. Stem 207 on valve element 192 limits valve movement to avoid overstressing spring 197.

POWER PRESSURE OR STARTING CONTROL

The power pressure control portion 398 of hydromechanical control part 397 provides power pressure control means to control the high power system pressure that is in power passage 153 in all phases of drive operation and normally only is used in the vehicle starting phase, e.g., 0 to 24 mph, or power pressure control phase, from zero to a low transmission speed ratio (e.g., points a-t, FIG. 8), to limit drive train torque and increase speed ratio at constant maximum reaction phase displacement of output hydrostatic converter 132 of hydrostatic portion 130, but would also function in other phases of drive operation if abnormal high torque occurred. The power pressure control portion 398 includes power pressure control signal regulating means, or starting control valve 211, and power pressure servo control means, or starting control servo valve 241.

STARTING CONTROL VALVE

The starting control valve 211 regulates the starting control pressure in line 212 in relation to output governor pressure (curve OGP, FIG. 6) in line 166, input governor pressure (curve IGP, FIG. 6) in line 164, and throttle pressure (curve TP, FIG. 7) in line 176. The starting control pressure or signal controls starting control servo valve 241 to limit torque and control ratio of hydromechanical unit 23, especially during vehicle starting and stall operation.

The starting control valve 211 has regulator valve element 213 having equal diameter lands $a$ and $b$ in regulating bore 214, and biasing element 216 having lands $c$, $d$, and $e$, of consecutively smaller diameters respectively in large bore portion 217, intermediate bore portion 218, and small bore portion 219, of stepped bore 221. Output governor pressure line 166 connects output governor pressure to chamber 222 at the closed end of small bore portion 219 to act on the end area of smallest diameter land 216e to provide an output speed bias. Input governor pressure line 164 connects input governor pressure to chamber 223 at the step between intermediate and small bore portions 218, 219, to act on the differential area of intermediate diameter land 216d, the area of intermediate diameter land 216d, minus the area of smallest diameter land 216e, to provide the input speed bias. Throttle pressure line 176 connects throttle pressure to chamber 224 at the step between large and intermediate bore portions 217 and 218 to act on the differential area of largest diameter land 216c to provide throttle pressure or torque demand bias. Exhaust 226, at the step between regulating bore 214 and large bore portion 217, vents the space in these bores between land 213b of regulating valve element 213 and land 216c of biasing element 216, so the biasing element 216 applies a total pressure increasing bias force, which is the sum of the output speed, input speed, and torque demand bias forces. The total pressure increasing bias force is opposed by a total pressure reducing bias force provided by spring 227 and start control pressure, both in closed chamber 228. In all regulating positions of regulating valve element 213, starting control pressure line 212 is connected betweens lands 213a and 213b and by passage 229 through land 213a to chamber 228. The forward and reverse or all-drive range line 231 is supplied from mainline 158 by manual valve 331 of mechanical unit control part 396 in all forward and reverse drive ranges. While some automatic transmission controls have such a supply line, many conventional automatic transmission controls, such as the above Borman patent, have a manual valve providing forward drive range pressure and reverse drive range pressure. As shown in FIG. 5 hereof, my manual valve 331, like Borman's manual valve, and as described below, supplies mainline pressure in reverse drive range position to reverse range line 338 and, in all forward drive range positions, to drive range line 334. Thus in all drives one of reverse range line 338 and drive range line 334 has mainline pressure, and the other is exhausted, and in neutral both are exhausted. The forward and reverse range lines 334, 338 are connected to shuttle valve 234 which blocks the exhausted line and connects mainline pressure in the other one of these range lines to all-drive range line 231, so the forward and reverse range line is exhausted in Neutral and Park and supplies mainline pressure to starting control valve 211 in all forward and reverse drives for operation of power pressure control portion 398. The above total pressure increasing and reducing bias forces act oppositely on starting control valve element 213 to move this valve element respectively to connect all-drive range line 231 to line 212 for increasing start control pressure in line 212 and to connect line 212 to exhaust 236, for decreasing start control pressure to regulate start control pressure proportional to the net regulating bias which is the total pressure increasing bias, the sum of the input speed, output speed, and torque demand biases, minus the spring bias. Valve element 213 has a stem 237 to limit movement in one direction. Valve element 213 always contacts biasing element 216, and movement of both elements in the opposite direction is limited by biasing element 216 engaging the closed end of small bore portion 219.

STARTING CONTROL SERVO VALVE

The starting control valve 241 has a valve element 242 in a small bore 243 and a large piston 244 reciprocally mounted in large cylinder 246. The valve element 242 and piston 244 are attached to or formed integrally to provide valve piston member 245. The first power passage 153 is connected by branch 247 to bias chamber 248 in the closed end of small bore 243 to act on the end area of valve element 242 at all times. The second power passage 154 is connected by branch 249 to bore 243 at port 251 which is controlled by valve element 242. A spring 252, seated on the step 253 between large cylinder 246 and small bore 243, engages piston 244 to bias valve piston member 245 to the valve-open position shown in which piston 244 engages end wall 254. The actuator chamber 256 is between end wall 254 and piston 244. The spring chamber 257 between piston 244 and step 253, the other end wall of cylinder 246, is vented by exhaust 258. The starting control pressure line 212 is connected to actuator chamber 256, so the regulated starting control pressure acts on piston 244 against the opposing bias of spring 252 and first power passage 153 pressure in bias chamber 248 acting on the opposite end of valve element 242 of valve piston member 245 and functions to connect the high pressure in first power passage 153 to second power passage 154 having low pressure to prevent the development of torque-transmitting capacity above a predetermined variable torque limit in hydromechanical unit 23. Regulated starting control pressure in line 212 varies with the sum of increasing input speed bias, output speed bias, and torque demand bias minus the spring bias, to bias valve element 242 to regulate proportionally higher pressure values in first power passage 153 to transmit limited torque and control ratio in hydromechanical unit 23.

Since high torque which would require torque limiting control by power pressure control portion 398 normally only occurs at lower speed ratios and higher torque ratios provided in the reaction phase of drive operation where the higher power pressure is in first power passage 153, power pressure control portion 398, since its starting control servo valve 241 is only responsive to first power passage 153 pressure, normally functions in the power pressure control portion of the reaction phase. High torque, requiring torque limiting, does not normally occur, but may occur under abnormal conditions, at higher speed ratios and lower torque ratios in the displacement control phase in the reaction and action phases.

When starting the vehicle at stall, zero speed ratio, the input speed and throttle bias provide regulated starting control pressure and first power passage pressure, and thus hydromechanical unit torque capacity proportional to engine torque, up to a predetermined torque limit value. As the vehicle begins to move at low starting speeds and speed ratio increases, the input speed, output speed, and throttle pressure bias provide substantially the same regulated start control pressure, first power passage pressure, and thus hydromechanical unit drive torque and power capacity proportional to engine torque and power up to substantially the same torque limit value. Limiting the torque limit value limits the ratio (overall torque ratio curve O, FIGS. 12 and 13, between points 376 and 377). As vehicle speed continues to increase in the starting phase, the torque ratio is reduced below the limit value, and speed ratio is increased in this pressure control phase up to the transition speed ratio (point t, FIG. 8; T, FIGS. 9 to 13).

DISPLACEMENT CONTROL

The hydromechanical control part 397 has, in addition to power pressure control portion 398, a displacement control portion 399 which includes modified throttle pressure valve 191 described above, ratio control valve 261, and ratio control servo actuator 286.

RATIO CONTROL VALVE

The ratio control valve 261, a pressure regulating valve, regulates the ratio control pressure in ratio control pressure line 262 in response to input governor pressure in line 164 and modified throttle pressure in line 201. The ratio control pressure controls the ratio control servo actuator 286.

The ratio control valve 261 has valve element 263 having equal diameter lands a and b movably mounted in bore 264. The ratio control pressure line 262 is always connected to bore 264 between lands 263a, 263b, and by passage 266 through land 263a to chamber 267 at one closed end of bore 264 to bias valve element 263 in a pressure-decreasing direction. A biasing piston 268 is located in biasing bore 269 coaxial with bore 264 at the end adjacent ratio control pressure chamber 267. The biasing bore 269 has, at the closed end remote from regulating valve element 263, a biasing chamber 271 connected to input governor pressure line 164 and at the other end, adjacent regulating valve element 263, exhausted chamber 272 connected to exhaust 273. The biasing piston 268 always engages small diameter force-transmitting rod 274 movably mounted and sealed in bore 276 in wall 277 of valve body 155 between chambers 272 and 267, respectively, in bores 269 and 264. The rod 274 always engages the end of land 263a of valve element 263. Input governor pressure in chamber 271 acts on biasing piston 268 to provide an input speed ratio pressure reducing bias force on piston 268 which is transmitted by rod 274 to act on valve element 263 in the same direction as ratio control pressure in chamber 267 acts on land 263a. The opposing ratio pressure increasing bias force is provided by spring 278 mounted in chamber 279 and by modified throttle pressure supplied by line 201 to chamber 279. The pressure regulating valve element 263 is moved by the bias forces to connect ratio control pressure line 262 to exhaust 281 for reducing ratio pressure, and to port 282 connected to mainline 158 for increasing ratio control pressure.

The ratio control valve 262, in response to the bias force provided by spring 278 and modified throttle modulated pressure in chamber 279 opposed by the bias force of engine or input governor pressure in chamber 271, regulates ratio control pressure at a normal valve, e.g., 40 psi, when engine is at the desired value in relation to throttle position, as indicated by the operating program (FIG. 9), for optimum engine and vehicle performance. When engine speed is lower or higher than the desired or programmed value for the throttle position, the normal ratio control pressure is respectively increased or decreased to continuously variably control hydrostatic portion 39 power pressure or displacement and hydromechanical unit 23 speed ratio to reestablish the programmed relation of engine speed and throttle position, basically constant engine speed at each throttle position with engine speed increasing with increasing throttle position from 60% to full.

RATIO CONTROL SERVO

The ratio control servo or actuator 286 controls the displacement of variable displacement output hydrostatic converter 132 of hydrostatic portion 130 of hydromechanical unit 23. The ratio control servo 286 has servo piston 287 movably mounted, thus providing a movable wall in cylinder 288. The servo piston 287 is connected by rod 289 extending through slidable seal 291 in end wall 292 by power booster 295 and rod 290 to a cam crosshead 293 mounted for axial reciprocating movement between guides 294 which prevent lateral movement. The stator 142, which is mounted for transverse reciprocating displacement-varying movement on guides 148,149, has attached arm 296 having pin 297 fitting in sloped contoured cam slot 298 in crosshead 293. The displacement control linkage, having servo piston 287, cam crosshead 293, stator 142, and arm 296, is shown in the central zero displacement position (OD), or stationary reaction speed ratio drive position, for variable displacement hydrostatic converter 132, and moves together in a displacement-increasing direction, for increasing reaction phase displacement (RP), to maximum reaction phase displacement (MR), and in the opposite displacement-increasing direction for increasing action phase displacement (AP), to maximum action phase displacement position (MA). A constant biasing pressure regulating valve 301 is supplied by mainline 158 and supplies a constant biasing pressure line 302 to closed expansible chamber 303 in cylinder 288 between servo piston 287 and cylinder end wall 292 to bias servo piston 287 toward maximum action phase displacement position (MA) for increasing hydromechanical speed ratio. The ratio control pressure line 262 is connected to closed expansible chamber 304 in cylinder 288 between servo piston 287 and end wall 306 to bias servo piston 287 to maximum reaction phase displacement position (MR) for decreasing hydromechanical speed ratio.

The constant bias pressure, e.g., 80 psi, in constant biasing chamber 303 acts on the area on the rod side of servo piston 287 which is smaller, e.g., one-half the full area of piston 287 on which ratio control pressure in control chamber 304 acts, so a smaller value normal balancing ratio control pressure, e.g., 40 psi, will balance the constant bias pressure to provide a constant displacement and ratio in hydrostatic portion 39 and hydromechanical unit 23. When engine 11 speed is lower than desired in relation to any throttle position, as indicated by the ratio change program (FIG. 9), at constant throttle position, the ratio control pressure will increase from the balancing value (e.g., 40 psi), to a slightly higher value to move servo piston 287 toward the maximum displacement reaction phase position (MR) to continuously reduce hydromechanical and overall speed ratio sufficiently to increase engine speed to the desired value and decrease ratio control pressure to the normal value to reestablish constant ratio drive. Conversely, when engine speed is higher than desired, the ratio control pressure is reduced below the balancing value to move servo piston 287 toward maximum displacement action phase to increase hydromechanical and overall speed ratio to reduce engine speed to the desired value and ratio control pressure to the normal value. At constant speed, a reduction of throttle position and throttle modulator pressure will reduce ratio control pressure, increase speed ratio, and decrease engine speed in accordance with the operating program. The converse occurs on an increase of throttle position. Thus the hydromechanical unit speed ratio and overall speed ratio are controlled by engine speed and throttle position to provide the optimum programmed relation for optimum engine and vehicle performance.

The conventional power booster 295 multiplies the low-control force provided by balancing-type ratio control servo 286 in rod 289 to provide in rod 290 a sufficiently high force to actuate the displacement change control, to prevent displacement change control reaction forces acting on rod 289 and piston 287, and to move rod-portions 289 and 290 together or proportionately; and may be constructed as shown on Page 3–36, FIG. 3.31, of "Control Engineers' Handbook," John G. Truxal (McGraw-Hill Book Co., Inc., 1958), and operated by mainline pressure or hydrostatic power pressure from the one of the power passages functioning as the supply passage.

INHIBITOR

An overdrive inhibitor device 307 inhibits action phase operation, preventing hydromechanical unit speed ratio increasing above the stationary reaction speed ratio, in the highest gear ratio of mechanical unit 24 provided in drive range, 4th, in intermediate range, 2nd, and in low range, 1st. The inhibitor device 307 has inhibitor piston 308 movable in bore 309. Piston 308 has stop member 311 extending in movable sealing relation through bore 312 in end wall 306 into chamber 304. The inhibitor biasing spring 313 in chamber 314, vented by exhaust 315, is seated on end wall 306 and inhibitor piston 308 to bias inhibitor piston 308 to normal noninhibiting position shown in which stop member 311 permits movement of servo piston 287 to maximum action phase displacement position (MA). In 4th ratio drive range operation, 2nd ratio intermediate range operation, and low (1st) range operation of mechanical unit 24 and control part 396, mainline pressure is supplied to inhibitor line 321 and inhibitor chamber 322 to move inhibitor piston 308 against the bias force of spring 313 to the inhibiting position in which inhibitor piston 308 engages end wall 306 to position piston stop member 311 engaging servo piston 287 to stop or inhibit movement beyond, or move servo piston 287 to, the central zero displacement position (OD) for the stationary reaction speed ratio, or to limit ratio control by ratio control servo 286 to reaction phase, or lower speed ratios in hydromechanical unit 23.

The mechanical unit control part 396, which includes manual valve 331 and automatic shift controls 395, provides conventional range selection between Drive, Intermediate, and Low forward ranges, and Reverse range and automatic shifting in the forward ranges, as described below. Inhibiting pressure is supplied by inhibitor line 321 to inhibitor chamber 322 to position inhibitor device 307 in inhibiting position in the highest gear ratio, 4th ratio in drive range operation; in the highest gear ratio, 2nd in intermediate range operation; and in the highest normal operating ratio, 1st ratio in low range operation. The inhibitor pressure supply system has first and second shuttle valves 316 and 318, constructed like the above shuttle valve 234, and cut-off valve 319 constructed like the above cut-off valve 167. Low range line 336 is supplied with mainline pressure only when manual valve 331 is in low range position providing low range operation, drive in 1st ratio with an upshift to 2nd ratio to prevent engine overspeed. Two-way 2nd ratio feed line 320 is normally only supplied during two-way 2nd ratio drive in intermediate range, but will also be supplied in low range after an overspeed upshift to two-way 2nd ratio. With manual valve 331 in intermediate and low positions, reverse neutral drive signal line 337 is exhausted and, in 2nd ratio speed, automatic shift controls 395 supply two-way 2nd ratio apply line 344. When reverse neutral drive signal line 337 is exhausted in intermediate and low ranges, cut-off valve 319 is biased to connect two-way 2nd ratio apply line 344 to feed line 320. When reverse neutral signal line 337 is supplied in neutral and reverse and drive ranges, cut-off valve 319 is biased to cut-off position, blocking two-way 2nd ratio apply line 344 and exhausting feed line 320. The 4th ratio apply line 346 is only supplied when manual valve 331 is in drive range position and automatic shift control 395 is in 4th ratio position. In low range, 1st ratio, manual valve 331 supplies low range line 336 which is connected to first shuttle valve 316. First shuttle valve 316 connects low range line 336 to first feed line 317 and blocks exhausted second feed line 320. Second shuttle valve 318 connects first feed line 317 to inhibitor line 321 and blocks exhausted 4th ratio apply line 346 for low range 1st ratio inhibiting. In intermediate range, two-way 2nd ratio drive second feed line 320 is supplied as pointed out above. First shuttle valve 316 connects the supplied second feed line 320 to first feed line 317 and blocks exhausted low range line 336. Second shuttle valve 318 connects the supplied first feed line 317 to inhibitor line 321 to place inhibitor device 307 in inhibiting position. In intermediate range, 1st ratio, second feed line 320 is exhausted via cut-off valve 319 and two-way 2nd ratio apply line 344, so there is no inhibiting in intermediate range 1st ratio, and thus a normal 1-2 shift. In drive range, only in 4th ratio, automatic shift controls 395 supply 4th ratio apply line 346, which is connected by second shuttle valve 318 to inhibitor line 321 for inhibiting. Second shuttle valve 318 blocks exhausted first feed line 317.

AUTOMATIC TRANSMISSION AND CONTROLS

The four forward speed and reverse automatic transmission or mechanical unit 24 has step ratio gearing 324 providing four forward gear ratios with conventional forward ratio steps and a reverse ratio and has mechanical unit control part 396, as shown in FIG. 5, and is essentially the same as shown in the above Borman patent.

The engine driven input shaft 12 is drive connected by hydromechanical unit 23 to intermediate shaft 32 which is drive connected by mechanical unit 24 to load or output shaft 14. Hydromechanical unit 23 and mechanical unit 24 are drive connected in series between engine driven input shaft 12 and output shaft 14. The mechanical unit 24 has conventional four speed step ratio gearing 324 as shown, for example, in the above Borman patent. The ratio steps may be conventionally small for maximum average percent power mechanical path drive in hydromechanical unit 23, or larger ratio steps may be used for extended ratio range at lower average percent power mechanical path drive.

The four speed mechanical unit 24 has, as shown in the above Borman patent, a three speed and reverse gearset and a direct and overdrive gearset providing the four speed and reverse gearing 324 having a plurality of drive establishing devices for establishing four forward speed drives and reverse drive. These devices, in the three speed gearset, are: forward clutch 326 (FWD-CL) of the two-way drive fluid operated type, a first ratio establishing means 327 (1ST BRK) having a mechanical one-way device (1-OW), and a fluid operated two-way drive friction device (1-2W), a second ratio establishing means 328 (2ND BRK) having a fluid operated friction and mechanical one-way drive device (2-OW), and a fluid operated two-way device (2-2W), and a third ratio device 329 (3RD-CL) of the fluid operated two-way clutch type (3-2W). The overdrive gearset has a fourth overdrive ratio device 330 (4TH BRK) of the fluid operated two-way friction type (4-2W), and a direct clutch 323 (DIR-CL) of the fluid operated two-way friction type. The 1st, 2nd, and 3rd ratio drives—direct in the overdrive gearset, and first, second, and third in the three-speed gearset—are provided by engaging the direct clutch 323 in the overdrive gearset and forward clutch 326 and selectively respectively engaging the 1st, 2nd, and 3rd ratio devices in the three speed gearset. The 4th ratio drive, overdrive in the overdrive gearset and third in the three speed gearset, is obtained by engaging the 4th ratio device 330, the forward clutch 326, and 3rd ratio device 329. In 1st and 2nd, either a one-way or two-way drive is provided in accordance with manual valve position, as described below. Reverse drive is established by engaging the 1st and 3rd ratio devices 327,329, for reverse in the three speed gearset, and direct clutch 323 for direct in the overdrive gearset.

The mechanical unit control part 396 has automatic shift controls 395, as in the above Borman patent, providing range selection and speed and torque demand responsive automatic shifting. The manual valve 331 (FIG. 5) is like the manual valve of the above Borman patent and is used to control both hydromechanical control part 397 and mechanical unit control part 396.

Referring to the MANUAL VALVE TABLE below, the manual valve 331 has a valve element 332 with equal-diameter lands movable in bore 333 between Park [P], Reverse [REV], Neutral [N], Drive range [D], Intermediate range [INT], and Low range [L] positions, for selectively connecting the supplied lines, drive range line 334, intermediate range line 335, and low range line 336, neutral signal line 337, and reverse range line 338, to mainline 158 for fluid supply ([S] in the TABLE), or to the adjacent one of exhausts 339 and 340 for exhaust ([E] in the TABLE), to control mechanical unit control part 396. Manual valve 331, in Park [P] position, blocks ([B] in the TABLE) mainline 158 and connects all supplied lines to exhaust [E], and in the other positions, connects [C] mainline 158 to selectively supply [S] selected supplied lines and to exhaust [E] other supplied lines.

| | MANUAL VALVE TABLE | | | | | |
|---|---|---|---|---|---|---|
| VALVE POSITION | Main-line 158 | Rev. Range Line 338 | Neutral Signal Line 337 | Drive Range Line 334 | Interm. Range Line 335 | Low Range Line 336 |
| Park - [P] | B | E | E | E | E | E |
| Reverse - [REV] | C | S | S | E | E | E |
| Neutral - [N] | C | E | S | E | E | E |
| FORWARD RANGES | | | | | | |
| Drive - [D] | C | E | S | S | E | E |
| Intermediate - [INT] | C | E | E | S | S | E |
| Low - [L] | C | E | E | S | S | S |

The mainline 158, reverse 338, drive 334, intermediate 335, and low 336 range lines, and neutral signal line 337 are connected to conventional automatic shift controls 395.

Whenever engine 11 is running, source 157 supplies mainline 158 and its branch 163 which supplies the lubrication system and governors 19 and 22. Then output governor 22 supplies output governor pressure proportional to output or vehicle speed to governor pressure line 166 to supply power pressure control portion 398 of hydromechanical unit control part 397 in neutral and all drive positions, forward and reverse, of manual valve 331. Since in the above Borman patent the governor only is supplied and thus provides governor pressure to the automatic controls only in the forward drive ranges, output governor pressure line 166 is connected by cut-off valve 167 to forward drive output governor pressure line 168 only in forward drive and neutral positions of manual valve 331 for connection to automatic shift controls 395 for forward drive automatic shifting, and cut-off valve 167 is responsive to reverse range line 338 pressure to cut off output governor pressure supply to forward drive output governor pressure line 168 for automatic shift controls 395. It is preferred to use a throttle pressure directly and uniformly proportional to fuel feed or throttle, so throttle pressure valve 177 is used to supply throttle pressure to line 176 to supply both hydromechanical unit control part 397 and automatic controls 395 of mechanical unit control part 396. The automatic shift controls 395 have conventional shift valves, biased to upshift by output governor pressure and to downshift by throttle pressure to provide each upshift at a predetermined vehicle speed which is increased with increasing throttle pressure, as more fully explained in the following description of the operation, with reference to the operating curves.

As shown in the SHIFT TABLE below, the automatic shift controls 395 are controlled by manual valve 331 in three forward range positions—Drive [DR], Intermediate [INT], and Low [L], to respectively provide normal automatic drive range shifting between the four forward gear ratios, Intermediate [INT] range shifting only between 1st and 2nd gear ratios at higher speeds than in Drive [DR] range, and Low [L] range drive in 1st gear ratio with a higher or overspeed upshift, and in Reverse [REV] range to provide reverse drive. Intermediate range is used to hold mechanical unit 24 in 2nd gear ratio at higher speeds for engine braking during downhill coasting and for high performance acceleration. Low range is used to hold mechanical unit 24 in 1st gear ratio for engine braking and drive with an upshift at maximum engine speed to prevent overspeed.

4th ratio apply line 346 and disengage (O) 4th brake 330 to provide direct drive in the overdrive gearset. In 4th ratio, 4th ratio apply line 346 is supplied (S), and 4th brake engaged (X), and direct clutch apply line 347 is exhausted (E) to disengage (O) direct clutch 323 for a shift to 4th ratio overdrive in the overdrive gearset. The automatic shift controls 395, in all ratios in all forward drive ranges, supply (S) forward clutch apply line 341 to engage (X) two-way forward clutch 326. With manual valve 331 in drive ratio position [DR], the automatic shift controls 395, at speeds up to the 3–4 shift speed, engage (X) direct clutch 323 in the overdrive gearset and forward clutch 326 in the three speed gearset, and at speeds up to the 1–2 shift speed, the one-way mechanical device [1-OW] of 1st brake 327 engages (X) to drive (DR) in 1st gear ratio, at speeds between the 1–2 and 2–3 shift speeds 2nd brake 323 one-way apply line 343 supplies (S) and engages (X) one-way device [2-OW] of 2nd brake 328 for 2nd gear drive (DR); and at speeds between the 2–3 and 3–4 shift speeds, 3rd apply line 345 also supplies (S) and engages (X) the 3rd clutch 329 for 3rd ratio drive (DR). Then the automatic shift controls 395 hold the three speed unit, as in 3rd ratio drive, and shift the overdrive gearset by exhausting (E), disengaging (O), direct clutch 323 and supplying (S) and engaging (X) 4th brake 330 to provide 4th ratio drive. The 1st one-way device [1-OW] of the 1st brake 327 in 2nd-to-4th ratios, overruns (OR). The 2nd one-way device [2-OW] of the 2nd brake 328 in 3rd and 4th ratios, though supplied and frictionally engaged (SX), overruns (OR). The neutral drive reverse signal line 337, supplied (S) in neutral and drive and reverse ranges by manual valve 331, acts on two-way drive device [2-2W] of 2nd brake 328, though 2nd two-way brake apply line 344 supplies (S) pressure in 2nd-to-4th ratios, to prevent engagement, so there is no two-way 2nd drive (ND). In intermediate and low ranges the direct clutch 323 and forward clutch 326 are always supplied (S) and engaged

SHIFT TABLE

| GEARSET | OVERDRIVE GEARSET | | 3-SPEED GEARSET | | | | | | |
|---|---|---|---|---|---|---|---|---|---|
| DRIVE | DIR-CL | 4TH BRK | FWD-CL | 1ST BRK | | 2ND BRK | | | 3RD-CL |
| Ref. No. | 323 | 330 | 326 | 327 | | 328 | | | 329 |
| Device | 2-W | 2-W | 2-W | 0-W | 2-W | 0-W | 2-W | | 2-W |
| Line | 347 | 346 | 341 | | 342 | 343 | 337 | 344 | 345 |
| PARK - [P] | EO | EO | EO | O | EO | E | EO | | EO |
| NEUTRAL- [N] | E | EO | EO | O | EO | EO | S | EO | EO |
| DRIVE - [DR] | | | | | | | | | |
| 1-OW | SX | EO | SX | DR | EO | EO | S | EO | EO |
| 2-OW | SX | EO | SX | OR | EO | SX/DR | S | S/ND | O |
| 3-2W | SX | EO | SX | OR | EO | SX/OR | S | S/ND | SX |
| 4-2W | EO | SX | SX | OR | EO | SX/OR | S | S/ND | SX |
| INTERMED. [INT] | | | | | | | | | |
| 1-OW | SX | EO | SX | DR | EO | EO | E | O | O |
| 2-2W | SX | EO | SX | OR | EO | SX/DR | E | SX/DR | O |
| LOW - [L] | | | | | | | | | |
| 1-2W | SX | EO | SX | DR | SX | EO | E | EO | O |
| 2-2W | SX | EO | SX | OR | SO | SX/DR | E | SX/DR | O |
| REVERSE - [REV] | SX | EO | EO | OR | SX | O | S | O | SX |

The automatic shift controls 395 function in each position of the manual valve 331 as follows. In Neutral [N] position, manual valve 331 only supplies (S) the neutral signal line 337 and exhausts (E) all range lines, so all clutches and brakes are disengaged (O) for positive neutral. Park [P] position is similar, except that manual valve 331 blocks mainline 158 and also exhausts (E) neutral signal line 337. The automatic shift controls 395, in all forward ranges and gear ratios except 4th ratio, supply (S) direct clutch apply line 347 for engagement (X) of two way direct clutch 323 and exhaust (E) (X). In intermediate range, 1st ratio drive is the same as in drive range and at a higher 1–2 shift speed than in drive range, the automatic shift control 395 supplies (S) 2nd one-way and two-way apply lines 343,344, which, since neutral drive and reverse signal line 337 is exhausted (E), engages (X) the one-way [2-OW] and two-way [2-2W] devices of 2nd brake 328 to provide two-way 2nd ratio drive (DR). In low range [L], the manual valve 331 supplies low range line 336 which supplies (S)

first two-way apply line 342 to engage (X) two-way device [1-2W] of first brake 327 for two-way 1st ratio drive. On overspeed, there is an upshift to supply (S) the 2nd one-way and two-way apply lines 343,344 to engage (X) 2nd ratio drive, as in intermediate range, which causes 1st one-way device [1-OW] to overrun (OR). The 2nd two-way apply line 344 is always supplied in 2nd and higher ratios and disengages (0) the two-way device [1-2W] of 1st brake for two-way 2nd ratio drive. In reverse range of manual valve 331, the automatic shift controls 395 supply (S) direct clutch apply line 347 to engage (X) direct clutch 323, supply (S) 3rd apply line 345 to engage (X) 3rd clutch 329 and supply (S) first two-way apply line 342 to engage (X) two-way drive device [1-2W] of first brake 327 for two-way reverse drive.

The inhibitor device 307 is actuated, as described above, by the supply of pressure to inhibitor system and line 321 by mechanical control part 396 only in the highest ratio, 4th ratio, in drive range; the highest ratio, 2nd ratio, in intermediate range, and the highest normally used drive ratio, 1st ratio, and the higher ratio used to prevent engine overspeed, 2nd ratio, in low range. Inhibitor pressure in inhibitor line 321 moves inhibitor device 307 to inhibiting position, preventing hydromechanical unit speed ratios above the stationary reaction speed ratio providing 100% mechanical path power. The inhibiting supply system inhibits in drive range and intermediate range only in the highest ratio, so all shifts have opposite equal steps in hydromechanical unit 23 and mechanical unit 24, for overall continuously variable ratio change in intermediate range. Since 1-2 shift in low range is an overspeed shift, the half-step ratio 1-2 shift is acceptable.

If intermediate range line 335 is connected to first feed line 317 and second shuttle valve 318 with cut-off valve 319 and first shuttle valve 316 removed, the 1-2 shift in both low and intermediate ranges will be half-step ratio shifts. Drive range line 334 and reverse range line 338 are connected by shuttle valve 234 to all-drive feed line 231 supplying the start control pressure regulator valve 211 in all drives.

OPERATION

Park and Neutral

When the vehicle is stationary and engine 11 is started, engine output and/or transmission input shaft 12 drives pump 21 of regulated fluid pressure source 157 which supplies mainline 158 at a control and charging pressure, e.g., 100 psi, for both mechanical unit 24 and hydromechanical unit 23 control parts 396 and 397. Mainline 158 is connected through one-way check valves 161,162, and charging lines 159,160, respectively, to power transfer passages 153,154, to initially charge hydrostatic portion 39. During operation of hydrostatic portion 39, the supply pressure in the one of power passages 153,154, functioning as a supply line at high pressure for transferring torque from the hydrostatic converter acting as a pump to the hydrostatic converter acting as a motor, is higher than mainline pressure and closes one of the check valves 161 or 162, and its charging line 159 or 160, connected to the one power passage. The return pressure in the other of power passages 153 or 154, functioning as a return line and returning low-pressure fluid from the hydrostatic converter acting as a motor to the hydrostatic converter acting as a pump, normally is lower than mainline pressure, so mainline fluid flows through the other of check valves 161 or 162, and its charging line 159 or 160, to provide make-up fluid to replace leakage losses and maintain return pressure at a minimum charging pressure value. During engine drive operation, which is first described, first power passage 153 is the supply passage and second power passage 154 is the return passage. During vehicle overrun operation, the supply and return function is reversed. When engine 11 is running, mainline 158, by branch 163, supplies the lubrication system for the complete transmission 13, the input governor 19 which is driven by input shaft 12 and output governor 22 which is driven by final output shaft 14. The input governor 19 provides an input governor line 164 input governor pressure (curve IGP, FIG. 6) directly proportional to engine or input speed. The output governor 22 provides in output governor line 166 output governor pressure (curve OGP, FIG. 6) directly proportional to output shaft 14 speed. As the vehicle is standing, the output governor pressure is zero. The output governor line 166 is directly connected to hydromechanical unit control part 397 and, by cut-off valve 167, to output governor line 168 of the automatic shift controls 395 of mechanical unit control part 396 for all forward drive operation, but is cut off in reverse drive. Mainline 158 is connected in hydromechanical unit control part 397 to supply ratio control valve 261 and to supply constant biasing pressure regulator valve 301 which supplies biasing pressure line 302 to provide a constant bias pressure, e.g., 80 psi, in biasing chamber 303 to act on servo piston 287 to provide the constant bias force for the ratio control servo actuator 286. Mainline 158 is connected to manual valve 331, throttle pressure valve 177, and automatic shift controls 395 of mechanical unit control part 396. Mechanical unit control part 396 (FIG. 5) is basically conventional and, like the above Borman patent, and has the hereindescribed modifications and interconnections for the joint operation of mechanical unit control part 396 and hydromechanical unit control part 397. Mainline pressure source 157 is shown diagrammatically, but may be like Borman's mainline pressure source which increases mainline pressure with torque demand and in reverse range. Output governor 22 is supplied from mainline 158, rather than by a forward drive range line as in the above Borman patent, so output governor line 166 supplies output governor pressure to hydromechanical unit control part 397 in both forward and reverse operation. Output governor line 166 is connected by cut-off valve 167 to supply output governor pressure in forward output governor line 168 to automatic shift controls 395 only in forward drives. The reverse pressure in reverse range line 338 closes cut-off valve 167 to block supply from output governor line 166 to forward output governor line 168, and forward output governor line 168 is connected to exhaust 175, so there is no output governor pressure connected to automatic shift controls 395 during reverse operation, as in the above Borman patent. Mainline 158 is connected to throttle linkage actuated throttle pressure valve 177 which provides throttle pressure in throttle pressure line 176 for both hydromechanical and mechanical unit control parts 397,396, which is directly proportional to throttle or fuel feed position (curve TP, FIG. 7). This throttle linkage-or cam-actuated throttle pressure valve 177 is used to provide throttle pressure varying more precisely with engine torque rather than engine vacuum, as provided by the modulator of the above Borman patent.

In part [P] position used for parking, manual valve 331 blocks mainline 158 and connects all the manual valve-supplied lines, the range lines—drive 334, intermediate 335, low 336, reverse 338—and neutral signal line 337, to exhaust. In Neutral [N] position, manual valve 331 continues to exhaust the range lines and connects mainline 158 to neutral signal line 337, which only conditions automatic shift controls 395 for engaging a drive when manual valve 331 is moved to any range position to connect mainline 158 to one or more range lines. Thus, in both Park [P] and Neutral [N] positions of manual valve 331, hydromechanical shift controls 395 place hydromechanical unit 23 in positive neutral, as the start control system 211,241, is not supplied with mainline 158 pressure, and automatic shift controls 395 do not supply any drive device, as all range lines are exhausted, and so place mechanical unit 24 in positive neutral, so transmission 13 is in positive neutral, although governor and throttle pressures are present for automatic control.

In park [P] and Neutral [N] positions of manual valve 331, both drive range line 334 and reverse range line 338 are exhausted at manual valve 331, so forward and reverse or all-drive range line 231 is exhausted. Since all-drive range line 231 is exhausted, start and stall control valve 211, regardless of input and output governor pressures and throttle pressure values, will exhaust start and stall control pressure line 212, so spring 252 positions start control servo valve 241 in the neutral position shown. Start control servo valve 241 in this positive neutral position freely interconnects first power passage 153 by its branch 247 through chamber 248 to second branch 249 and second power passage 154. This open by-pass between power transfer passages 153,154, has sufficient flow capacity to prevent a pressure differential between power passages 153,154, and flow in the power passages between hydrostatic converters 131,132 of hydrostatic portion 39 to provide neutral in hydromechanical unit 23. Also, with manual valve 331 in Park [P] or Neutral [N] position, 4th ratio apply line 346 is exhausted at automatic shift controls 395; second feed line 320 is exhausted in Park [P] via two-way second apply line 344; and low range line 336 is exhausted at manual valve 331, so inhibitor line 321 is exhausted to deactivate overdrive inhibitor device 307, so ratio control servo 286 is conditioned for full displacement control phase operation.

Since mainline pressure in line 158, throttle pressure in line 176, and input governor pressure in line 164 are supplied to displacement control portion 399 having throttle pressure modifying valve 191, ratio control valve 261, and ratio control servo 286, it is functional and in proper position for hydromechanical unit 23 drive on a manual valve 331 shift to any drive position, e.g., Drive [D] position.

Throttle modulator line 176 supplies throttle pressure (curve TP, FIG. 7) to modified throttle pressure control valve 191, which regulates modified throttle control pressure (curve MTP, FIG. 7) supplied by modified throttle control pressure line 201 to chamber 279 of ratio control pressure valve 261. At the normal idle position, (0%) to full position (100%), of throttle pedal 17, throttle valve 177 supplies throttle pressure in line 176 from a minimum value, e.g., 0 psi, to a maximum value (curve TP, FIG. 7), to modified throttle pressure valve 191 which, due to the force of spring 278 relative to the modified throttle pressure bias force, supplies modified throttle pressure in line 201 at minimum value, e.g., 0 psi, from idle throttle to a minimum speed operation throttle value, e.g., 60% throttle (curve MTP, FIG. 7), to ratio control pressure valve 261. Ratio control pressure valve 261, in response to modified throttle pressure supplied by line 201 and input governor pressure supplied by line 164, regulates mainline pressure from mainline 158 to supply ratio control pressure in line 262 to control chamber 304 to act on servo piston 287 in opposition to the constant bias pressure in biasing chamber 303, controls the position of servo piston 287 and displacement of output hydrostatic converter 132. In normal neutral operation, at zero throttle and engine idle speed, e.g., 800 rpm, the servo piston 287 moves to the maximum displacement reaction phase position (MR) in which servo piston 287 engages end wall 292 to provide a positive stop or limit. With servo piston 287 in maximum displacement reaction phase position (MR), the crosshead 293 and cam slot 298 are also in the maximum displacement reaction phase position (MR) and, through pin 297 move stator 142 to the maximum displacement reaction phase or motor operating position, "Max. Disp. Motor" (MR).

If ratio control servo 286 does not have sufficient power to hold and position stator 142 of output hydrostatic converter 132, the above-described power booster 295 is used.

With the output hydrostatic converter 132 positioned in maximum displacement reaction phase position (MR) by the displacement control portion 399, and the power passages 153, 154, freely interconnected by the power pressure control portion 398, both passages 153, 154, have charging pressure providing a zero pressure differential and a positive neutral in the hydromechanical unit 23. When manual valve 331 is in Park [P] and Neutral [N] positions, both the hydromechanical unit 23 and mechanical unit 24 are in Neutral, so transmission 13 is in Neutral.

DRIVE RANGE

Figure 10:
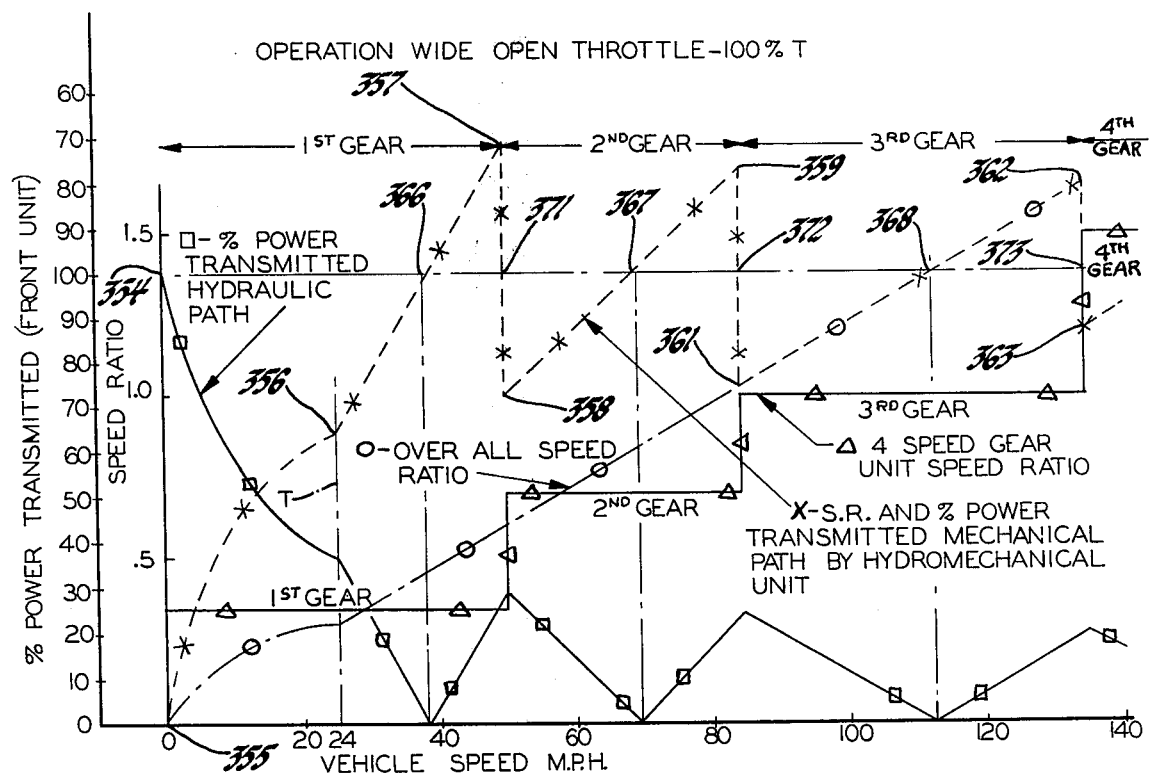
FIG. 10 shows plots of speed ratio and percent power transmitted relative to vehicle speed for wide-open throttle upshift operation.
Figure 11:
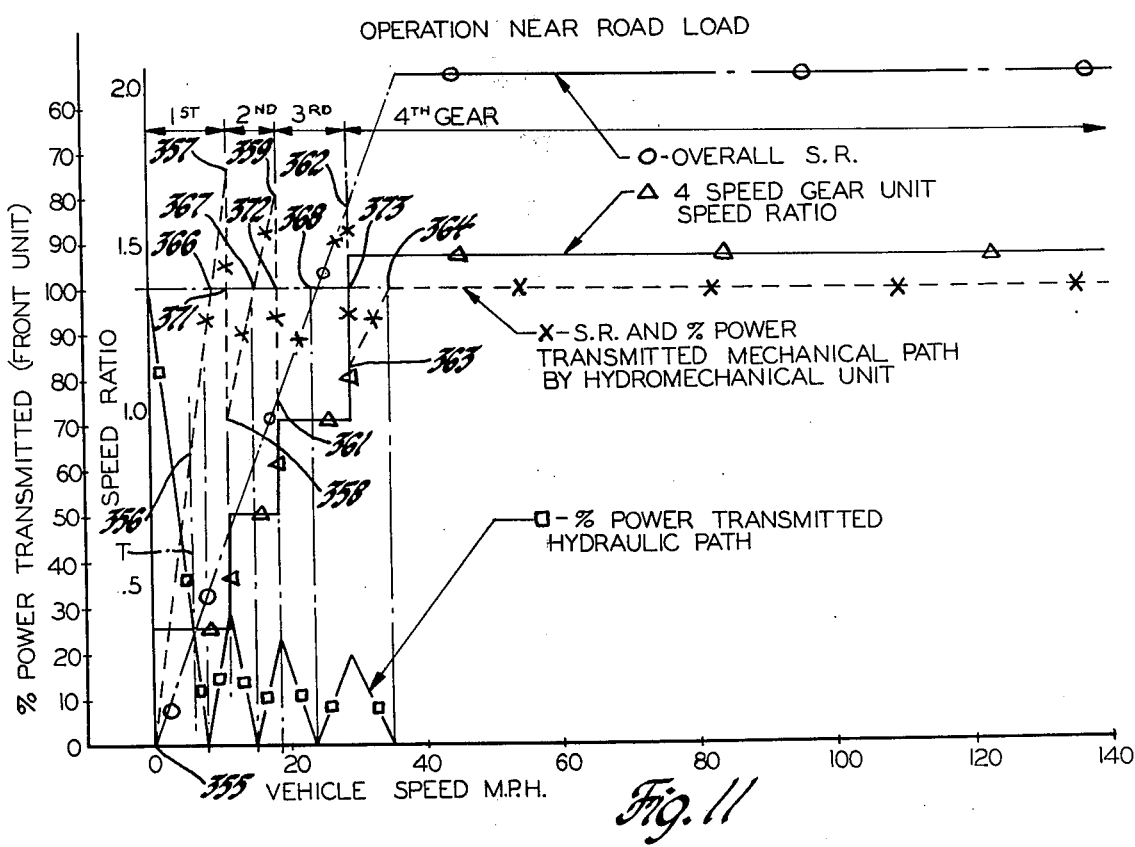
FIG. 11 shows plots of speed ratio and percent power transmitted relative to vehicle speed ratio for road-load upshift operation.
Figure 12:
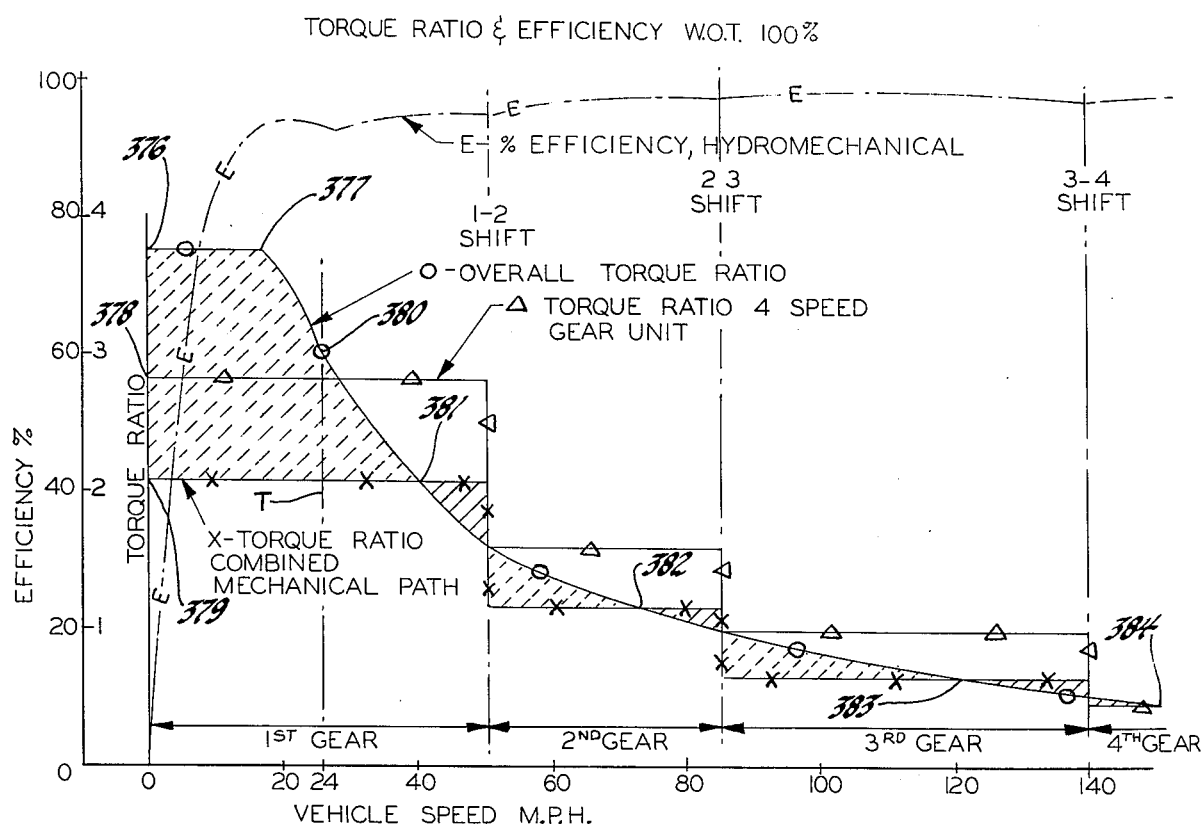
FIG. 12 shows plots of torque ratio and efficiency relative to vehicle speed for wide-open throttle upshift operation.

The manual valve 331 is positioned in Drive range position [D], as shown, normally with the throttle in idle position, to establish continuously variable automatic drive in the complete transmission 13, and then providing with varying throttle, engine speed and vehicle speed the continuously variable ratio drive meeting load acceleration or deceleration or steady-state load requirements, as shown in the operation curves, FIG. 9. With the vehicle standing and the engine running, the pump 21 and regulating valve 157 supply regulated mainline pressure in mainline 158, as in Neutral [N], to the controls. Mechanical unit control part 396, on positioning manual valve 331 to Drive [D] position, as described above and in the above Borman patent, establishes one-way 1st ratio drive and automatic shift controls 395 function, with increasing vehicle speed under the control of conventional automatic shift valves (not shown) to upshift to one-way 2nd drive, two-way 3rd drive, and two-way 4th drive. The shift valves (not shown) of automatic shift controls 395 are responsive to output governor pressure supplied by output governor line 166, normally open cut-off valve 167, and forward output governor line 168, and throttle pressure supplied by throttle modulator valve 177, to upshift with increasing output shaft 14 and vehicle speed. Each shift point, 1-2, 2-3, 3-4, between the ratios of the 4-speed gearing 324 of mechanical unit 24 is at a higher speed with higher torque demand (e.g., fuel feed or throttle), as shown by comparing the 4-speed gear unit 324 speed ratio curves Δ in FIG. 11 at lower throttle positions for level road-load operation and in FIG. 10 at 100% or wide-open throttle. Similar 4-speed gear unit 324 torque ratio curves Δ are shown in FIG. 12 for 100% throttle and in FIG. 13 for lower level road-load throttle operation. With manual valve 331 in Drive [D] position, mainline pressure from mainline 158 continues to be supplied to neutral drive reverse signal line 337 and is supplied to drive range line 334 to supply forward clutch apply line 341 and to direct clutch apply line 347 to cause the 1st ratio one-way device 327 to establish 1st ratio drive and to supply the automatic shift valves of automatic shift controls 395 for automatic speed and torque demand power shifting between 1st, 2nd, 3rd, and 4th ratio drives, as shown in the above SHIFT TABLE. The reverse 338, intermediate 335, and low 336 range lines remain exhausted by manual valve 331.

The neutral drive reverse signal pressure in line 337 closes cut-off valve 319 and exhausts feed line 320. Since feed line 320 is exhausted and low range line 336 remains exhausted at manual valve 331, inhibitor device 307 remains inactive, as in Neutral [N], until an automatic shift by automatic shift controls 395 to 4th ratio supplies 4th apply line 346. Then 4th apply ine 346 is connected by shuttle valve 318 and inhibitor line 321 to activate inhibitor device 307.

The power pressure control portion 398 provides continuous ratio control from stall or zero speed ratio (point a, FIG. 8) to the transition speed ratio (point t, FIG. 8), while displacement control portion 399 maintains hydrostatic converter 132 in maximum reaction displacement phase (MR), as in Neutral [N], and mechanical unit control part 396 maintains mechanical unit 24 in 1st gear. This power pressure ratio control provides a change in the operation program FIG. 9 from point A to the transition line T at a point which varies with throttle. Such a change is shown from stall point 355 to transition line T for 100% throttle (FIG. 10) and road-load throttle (FIG. 11).

Drive range line 334 is connected by shuttle valve 234 to all-drive range line 231 to supply starting control valve 211 of power pressure control portion 398. The starting control valve 211 functions in response to a start bias to provide a regulated starting control pressure in line 212 which acts in actuator chamber 256 to bias valve element 242 of start control servo valve 241 to provide a controlled and limited high power pressure in first power transfer passage 153 of a sufficiently high value to regulate hydromechanical speed ratio between zero and the transition speed ratio (points a to t, FIG. 8) and to provide the proper required hydromechanical unit torque for the particular vehicle engine application during starting operation. The start bias force, and thus the high power transfer pressure in power passage 153, varies in relation to the sum of forces on biasing element 216 provided by input governor pressure from line 164, output governor pressure from line 166, and throttle pressure from line 176. In the specific example of the invention, the differential area of input governor pressure land 216d is about twice the area of land 213a. The differential areas of throttle pressure land 216c and output governor pressure land 216e are about the same as the area of land 213a.

At idle throttle 0% idle engine speed, e.g., 800 rpm, and vehicle stall, the start bias force provided by engine speed or input governor pressure and throttle pressure, provide a total start bias force about equal to, or slightly greater than the force of spring 227 to provide a low start control pressure in line 212 and to control servo valve 241 to limit pressure in power passage 153 to a low pressure about equal to or slightly higher than charging pressure to provide insufficient pressure differential in power passages 153, 154, to provide insufficient reaction load on reaction hydrostatic converter 131, and reaction torque on sun gear 28 to provide insignificant "creep" torque in hydromechanical unit 23, so engine speed is regulated at idle speed and the vehicle remains standing at stall or zero speed ratio (points a, FIG. 8; A, FIG. 9; and 355, FIGS. 10, 11).

In drive power pressure control portion 398, starting control valve 211 with increasing throttle regulates an increasing starting pressure in line 212, operative in the pressure control phase (PCP), which is in the initial portion of the reaction phase (RP, FIG. 8), to actuate starting servo valve 241 to control and limit the pressure in first power transfer passage 153 to control and limit the torque transmitted by hydrostatic portion 39 to control the speed ratio of and to limit torque transmitted by hydromechanical unit 23. On a standing start from vehicle stall, increasing throttle increases engine torque at idle speed and then further increases engine torque and engine speed and the starting pressure increases proportionally to the sum of the throttle bias force, increasing at about the same rate as increasing throttle pressure, and the input speed bias force increasing at about twice the rate of increasing input governor pressure and speed to increase high power system pressure for increasing hydromechanical torque capacity matching increasing engine torque up to a predetermined stall torque limit to increase transmission output torque which, on meeting vehicle load, moves the vehicle to increase speed ratio.

Figure 13:
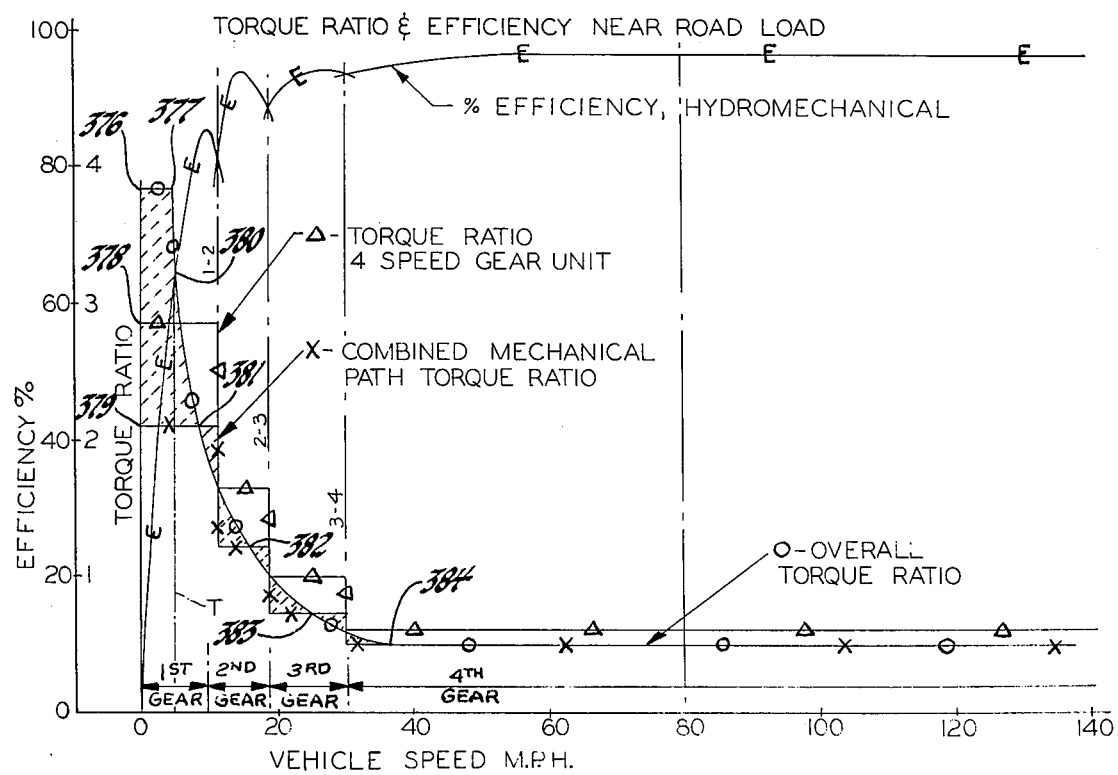
FIG. 13 shows plots of torque ratio and efficiency relative to vehicle speed for road-load upshift operation.

The power pressure control portion 398 controls high power pressure in hydrostatic portion 39 or 130 to increase hydromechanical speed ratio from stall to the transition speed ratio (points a to t, FIG. 8; point A to line T, FIG. 9; points 355 to 356 on T line, FIGS. 10 and 11), and to limit high power pressure to limit hydromechanical torque and torque ratio to limit overall torque ratio, curve O, FIGS. 12 and 13 between points 376 at stall and point 377, an initial portion of power pressure control phase of torque ratio between points 376 and transition torque ratio 380. During both drive and coast operating conditions, the output governor biasing force, which increases at about the same rate as output governor pressure, is added to the sum of the above bias forces to maintain the above torque limit constant, to provide the above ratio control and, at other times, the displacement control phase to provide a torque limit above normal requirements during drive and coast operation.

The engine 11 delivers power by input shaft 12 to carrier 27 and planetary pinions 26 of gearing portion 25 of hydromechanical unit 23 where an input power-and-torque split occurs between a mechanical power path through ring gear 29 and drum drive member 31 to drive intermediate shaft 32 and to a hydraulic power path through sun gear 28, sleeve shaft 36, fixed displacement reaction hydrostatic converter 38 or 131, the power transfer passages 153, 154, the variable displacement output hydrostatic converter 35 or 132, and drum drive member 31 to the intermediate shaft 32. The torque-split is constant and determined by the arrangement and ratio of gearing portion 25 to transmit a major portion of the torque through the more efficient mechanical torque path. In the FIG. 1 overdrive planetary gearing portion 25, the ratio of the radius or number of teeth of the ring gear to the sun gear, e.g., 2.9, determines the torque split, e.g., 74% mechanical and 26% hydraulic, and the torque ratio (torque ring gear output divided by torque carrier input), e.g., 0.74, which do not change with change of reaction sun gear speed by the hydrostatic portion 39. The speed ratio of gearing portion 25 is controlled by hydrostatic portion 39 to provide a continuously variable hydromechanical speed ratio (output speed divided by input speed) varying with sun gear speed (e.g., No/Ni = 1.36–0.36Ns/Ni), and varying power-split.

In the reaction phase (RP), sun gear 28 reaction direction (arrow R) speed is reduced from a maximum to zero; the speed ratio is increased from zero to the stationary reaction speed ratio, e.g., 1.36, and hydraulic path power is reduced from 100% to 0% (points $a$ to $c$, FIG. 8). In the action phase (AP), sun gear 28 action direction (arrow A) rotation is increased from zero to a maximum; speed ratio is increased to maximum speed ratio, e.g., 1.75, and hydraulic path power is increased from 0% to a low value, e.g., 28.6% (points $c$ to $d$, FIG. 8). The initial portion of the reaction phase is a pressure control phase (PCP) in which the displacement of output hydrostatic converter 132 is maintained in maximum reaction phase displacement position (MR), and high-power transfer passage pressure is controlled to reduce reaction direction sun gear speed from a maximum to a transition speed, to increase speed ratio from zero to the transition speed ratio and hydraulic path power is decreased from 100% to a low value, e.g., 36% (points $a$ to $t$, FIG. 8).

In the displacement control phase (DCP) which extends over the remaining portion of the reaction phase (RP) and the entire action phase (AP), sun gear reaction direction (arrow R) speed is reduced from the transition speed to zero and then increased to maximum action direction (arrow A) speed, speed ratio is increased from the transition speed ratio through the zero reaction speed ratio to maximum speed ratio, and hydraulic path power is reduced from a low value, e.g., 36%, to 0% and then increased to a low value, e.g., 28.6% (points $t$ to $c$ to $d$, FIG. 8). The intermediate shaft 32 is connected by 4-speed gearing 324 of mechanical unit 24 to final output shaft 14 which drives vehicle drive 14, having an N/V ratio, e.g., 44.8, to drive the vehicle, as shown in the operating curves (FIGS. 9 to 13).

With the vehicle standing, or vehicle stall, the automatic controls 395 of mechanical control part 396, in response to zero output speed, hold mechanical unit 24 in 1st ratio providing the 1st gear speed ratio of the 4-speed gearing 324, and hydromechanical control part 397, by action of the displacement control portion 399 in response to engine speed and modified throttle pressure, provides maximum reaction phase displacement (MR) of hydrostatic converter 132 at vehicle stall (on vehicle stall line AB, FIG. 9), and when the vehicle moves on maximum acceleration (line BC) and between these lines and transition line (T). The power pressure control portion 398 increases power transfer pressure in passage 153, as throttle is increased from idle, 0%, to high or maximum torque idle speed throttle, e.g., 60%, holding the engine at idle speed, e.g., 800 rpm, to provide increasing hydromechanical unit torque ratio and torque, which if less than vehicle starting torque requirements and thus does not drive the vehicle, occurs at zero speed ratio in hydromechanical unit 23 (point $a$, FIG. 8; point 355, curve X, FIGS. 10 and 11), which provides transmission 13 overall ratio speed ratio (point A, FIG. 9; point 355, curve O, FIGS. 10 and 11). The maximum reaction phase displacement (MR) is determined by the combined force of input governor pressure in line 164, which is low at engine idle speed, and the opposing force of spring 278 and modified throttle pressure in line 201, which is zero at idle throttle, 0%, to maximum torque idle speed throttle (e.g., 60%), acting on ratio control valve 261 to regulate ratio control pressure in line 262 to control ratio control servo 286 to position variable displacement hydrostatic converter 35 or 132 in maximum reaction phase displacement position (MR) for motor operation providing hydromechanical unit operation at point $a$ (FIG. 8) and transmission operation at point A (FIG. 9). As the throttle is increased from maximum idle speed torque throttle (e.g., 60%) to maximum torque throttle (e.g., 68%), engine speed increases to the maximum torque engine speed. At vehicle stall, displacement control portion 399 maintains maximum reaction phase displacement (MR) of hydrostatic converter 132, and power pressure control portion 398 increases torque ratio and torque at zero speed ratio if the vehicle does not move, providing hydromechanical unit operation (point $a$, FIG. 8), and transmission operation (line AB, FIG. 9) to, at point B (FIG. 9), provide maximum drive torque for starting the vehicle under maximum load. The variable displacement hydrostatic converter 132, in this maximum displacement reaction phase motor operation position with the vehicle standing, is stalled and will block flow between the power transfer passages 153, 154, of hydrostatic transmission portion 39. When engine 11 drives input shaft 12 and carrier 27 forwardly (arrow E), and the standing vehicle drive 15 acts, through final output shaft 14, the 4-speed gearing 324 in 1st gear, intermediate shaft 32, and drive drum member 31, to hold ring gear 29 stationary, the input drives sun gear 28, sleeve shaft 36 and rotor 37 or 133 of the fixed displacement hydrostatic converter 38 or 131 in the reaction (arrow R), the same direction as the forward drive (arrows E, F). The fixed displacement hydrostatic converter 38 or 131 acts as a pump to supply high pressure fluid to first power passage 153, which is controlled by power pressure control portion 398, for reaction phase pressure control phase operation of hydromechanical unit 23 at zero speed ratio (point $a$, FIG. 8), in which 100% power is transmitted hydraulically by hydrostatic portion 39. With the throttle pedal 17 at idle (0%), and the engine idling at idle speed (e.g., 800 rpm), starting control valve 211 is controlled by input governor pressure in line 164 and modulated pressure in line 176 to provide the minimum start stall control pressure in line 212 to control start control servo valve 241 to limit high-power pressure in passage 153 to a minimum value for minimum torque transfer by hydromechanical unit 23 to prevent creep (point A, FIG. 9). Preferably the high-power pressure in first power pressure passage 153 and its branch 274—which in neutral freely or more freely flows through starting servo valve 241 to low pressure power transfer branch 249 and low power pressure passage 154, is restricted in response to minimum start control pressure supplied by line 212 to limit high-power pressure in power passage 153 to the minimum value (e.g., 200 psi), slightly above charging pressure (e.g., 100 psi), in low pressure passage 154 to provide a minimum differential power pressure (e.g., $\Delta$100 psi) for the hydrostatic power passage system of hydrostatic portion 39. The reaction hydrostatic converter 38 has a small displacement (e.g., 2.2 in³/revolution), and at idle speed (e.g., 800 rpm), and minimum differential power pressure provides minimum or idle reaction torque (e.g., 2.9 ft.lb.) on sun gear 28. Since planetary gearset or gearing portion 25 has a constant gear unit torque ratio (torque output on ring gear 29 to torque input to carrier 27, e.g., To/Ti = .74), and divides 100% input torque of carrier 27 into 74% mechanical path torque on output ring gear 29 and 26% hydraulic path torque on reaction sun gear 28, gearing portion 25 has a torque multiplication ratio (e.g., torque ring gear 29 output 74% to torque sun gear 28 reaction 26%, or, To/Tr = 2.8), to provide low torque to ring gear 29 (e.g., 8.1 ft.lb.), relative to sun gear reaction torque (e.g., 2.9 ft.lb.) and requiring carrier 27 input torque equal to their sum (e.g., 11 ft.lb.). Since the mechanical path is stationary and all rotation is in the hydraulic path, at stall hydraulic path power is 100%.

The variable displacement hydrostatic converter 35 or 132 has a larger maximum reaction phase displacement at idle (e.g., 5 in³/revolution), so hydrostatic portion 39 has a hydrostatic stall torque multiplication ratio determined by the ratio of output unit displacement to input unit displacement (e.g., Do/Di = 5/2.2 = 2.3), and although stalled at minimum differential pressure (e.g., Δ100 psi), multiplies reaction torque by the hydrostatic torque ratio to provide higher output torque, e.g., 2.9 ft.lb. × 2.3 = 6.6 ft.lb. Thus at idle, only the sum of this low ring gear torque and low hydrostatic torque (e.g., 8.1 ft.lb.+ 6.6 ft.lb. = 14.7 ft.lb.) is delivered to intermediate shaft 32 for a low hydromechanical torque ratio, e.g., 1.3. The mechanical gear unit 324, in 1st ratio, multiplies intermediate shaft 32 torque by the 1st drive ratio torque ratio to provide low output torque (e.g., 14.7 ft.lb. × 2.87 = 42 ft.lb.) and thus an overall torque ratio, e.g., 3.8 at idle stall, a low torque so creep is not a problem during idle operation of this vehicle at point A, FIG. 9. It will be appreciated that a lower idle speed and/or lower minimum differential hydrostatic power transfer pressure may be selected for a lighter-weight vehicle where a lower torque at vehicle stall at idle is desired to avoid creep.

FIG. 9 shows the desired programmed relation of engine or input speed rpm to vehicle speed mph, with the throttle position varying from 0% to 100% for a selected vehicle having a selected drive shaft speed rpm to vehicle speed mph ratio (e.g., N/V = 44.88), and weight for transmission 13 that is automatically provided by the complete transmission control system.

The control system controls the transmission 13 for operation between all points on and within the perimeter of operation limits (points A, B, C, D, E, F, FIG. 9). Several illustrative operation sequences are described below.

During throttle increase from idle position (0%) through high or maximum idle speed engine torque throttle position, e.g., 60% to maximum engine torque throttle position, e.g., 68%, with the vehicle standing or stalled, engine torque increases; automatic shift controls 395 hold mechanical unit 24 in 1st ratio; displacement control portion 398 holds hydrostatic converter 132 in maximum reaction phase displacement (MR); and power pressure controls 399 increase differential power pressure in hydrostatic portion 130 to control hydromechanical unit 23 at zero speed ratio to increase torque transfer and transmission output torque. Engine idle operation at idle throttle pedal 17 position, e.g., 0%, provides, as described above, idle engine or input shaft 12 speed, e.g., 800 rpm, and low engine idle torque and low transmission output idle torque, e.g., 42 ft.lb., at zero speed ratio for transmission operation at zero overall speed ratio (point A, FIG. 9; point 355, overall speed ratio curve O, FIGS. 10 and 11). As the throttle is advanced from idle to higher maximum torque idle speed throttle position, e.g., 60% engine speed is regulated at the minimum and idle speed, e.g., 800 rpm, engine torque increases to the high or maximum idle speed engine torque, the power pressure controls 398 increase differential power pressure to proportionally increase transmission torque at zero transmission speed ratio also at operation point A (FIG. 9) and point 355 (FIGS. 10 and 11). Further throttle advance from maximum engine torque idle speed throttle position to maximum engine torque at maximum engine torque speed (e.g., 60% to 68%) engine speed increases to proportionately higher values (e.g., 1400 rpm at 68%) to progressively increase engine power and torque to maximum engine torque. At maximum vehicle starting load, the vehicle remains stationary and stall operation of hydromechanical unit 23 continues from point A (FIG. 9) at zero speed ratio and increasing torque ratio toward point B until maximum output torque overcomes the maximum vehicle starting load and moves the vehicle at point B (FIG. 9). At point B (FIG. 9), the transmission 13 provides maximum starting torque at stall to start the vehicle under maximum starting load with minimal input horsepower. At less than maximum vehicle starting load, when transmission output torque (at operating point A, or a point between points A and B, FIG. 9) meets a lower starting load, the vehicle will move and the operation point will move horizontally, as described below.

During stall operation, engine speed increasing from idle speed to a higher torque speed, provides increasing input governor pressure in line 164, and the increasing throttle provides increasing throttle pressure in line 176 to starting control valve 211 to increase the starting control pressure in line 212 to control starting control servo valve 241 to permit the increase of the high pressure in first power passage 153 to a limited maximum value above the pressure in return passage 154 to provide a high differential power pressure (e.g., Δ 3095 psi). This results in, or loads engine 11 to require, high input torque from engine 11 to input shaft 12. This high input torque (e.g., 341 ft.lb.) is divided in the same manner as described above for idle, to ring gear 29 and mechanical path, the major portion (e.g., 74% or 250 ft.lb.), and to sun gear 28 for the hydrostatic path, a minor portion (e.g., 26% or 91 ft. lb.) which is multiplied by hydrostatic transmission portion 39 stall torque ratio (e.g., 2.3) to provide high torque in the hydrostatic torque path (e.g., 206 ft.lb.). These mechanical and hydrostatic torque paths add or combine the mechanical and hydrostatic torque in intermediate shaft 32 (e.g., 250 ft.lb. + 206 ft.lb. = 456 ft.lb.), and the combined or total torque is multiplied by 1st gear torque ratio (e.g., 456 ft.lb. × 2.87 = 1,320 ft.lb.) to provide maximum limited stall torque ratio (point 376 on overall torque ratio curve O, FIGS. 12 and 13), and maximum limited torque to start the vehicle moving under maximum load. Thus as the throttle is advanced from idle to a near-maximum torque value (e.g., 0% to 68%), there will be a proportionate increase of torque from idle throttle to high torque idle speed throttle position at a constant minimum idle speed (0% to 60%), and of engine speed and torque from high torque idle speed throttle to high or maximum torque throttle (60% to 68%) which, at stall or zero speed ratio and high starting torque ratios, provides a proportionate increase of transmission torque which, at intermediate starting torque values will meet intermediate torque starting loads and start the vehicle respectively at engine idle speed, point A, or higher speeds, between points A and B, and at maximum starting torque (e.g., point B, FIG. 9), will start the vehicle under maximum load.

When the throttle is advanced to higher values, e.g., 68% to 100%, engine speed will increase (e.g., from point A to B) to start the vehicle in the same manner. If the vehicle starts under maximum torque and load at point B, engine speed and vehicle speed will both increase from point B to the maximum power engine speed, point C, at full throttle (100%) for maximum torque acceleration. As the vehicle moves under maximum acceleration, load and 100% throttle (curve BC), speed ratio increases from 0% to 87% under power pressure control, and the percent hydraulic power decreases from 100% to 36% (point $a$ to point $t$, FIG. 8). The slope of curve BC (FIG. 9) is determined by the proportion of engine speed, vehicle speed, and throttle position effect on the bias force on starting pressure control valve 211. The operating point at C is also on transition line (T), indicating the end of the power pressure control phase, and the transition to the displacement control phase. At maximum load and high partial-throttle values, e.g., 68% to 100%, the vehicle will also start at maximum load starting operating point B (FIG. 9), and the operating point will move to the intersection of the percent throttle line and the transition line (T), e.g., for 80% throttle point G.

At intermediate loads, the vehicle will start at point A, or a point intermediate points A and B, and accelerate on a line similar to line B–C, up to a point at the intersection of the percent throttle line in accordance with throttle position at that time and the transition line (T). During maximum and lower torque acceleration at full to idle throttle, as the operating point moves to transition line (T), speed ratio will increase to the transition speed ratio (point $t$, FIG. 8), ending the power pressure control phase at an engine and vehicle speed in relation to throttle position (e.g., at point G at 80% throttle, and at point C at 100% throttle).

The maximum limited overall torque ratio at stall and low-speed ratio operation (overall torque ratio curve O, points 376 and 377) during wide-open throttle operation (FIG. 12) and near-road-load throttle operation (FIG. 13), are the same for all positions and has the same component ratios. The 1st gear torque ratio (curve Δ) of the 4-speed gear unit 324 (point 378), e.g., 2.87, is the same in FIGS. 12 and 13. This 1st gear torque ratio, combined with mechanical torque ratio of gearing portion 25 of hydromechanical unit 23, or the combined mechanical path torque ratio (point 379 on curve X), e.g., 2.87 × .736 = 2.1. The combination of this mechanical path torque ratio and hydrostatic portion 39 ratio, as limited by starting torque control servo valve 241 or overall torque ratio (points 376,377, on curve O), e.g., 2.1 × 1.825 = 3.87; or 2.87 × .736 × 1.825 = 3.87.

At stall 1st gear speed ratio of the 4-speed gear unit 24, e.g. 0.35, 1st gear ratio of 4-speed gear unit (curve Δ, FIGS. 10 and 11) is combined with zero speed ratio (point 355 on curve X) of hydromechanical unit 23 for zero overall speed ratio (point 355 on curve O, FIG. 10 for 100% throttle, and FIG. 11 for road-load throttle).

During operation at stall (curve AB, FIG. 9), the increasing input governor pressure in line 164 and the increasing throttle pressure on line 201 control ratio control valve 261 to regulate and supply ratio control pressure in line 262 to chamber 304 to act on the full area of servo piston 287 of ratio control servo 286 at values varying relative to constant balancing control pressure value, e.g., 40 psi, to balance the bias pressure, e.g., 80 psi, in chamber 303 acting on half the full area of servo piston 287, to hold ratio servo 286 and variable displacement hydrostatic converter 35 in the maximum displacement reaction phase motor operation position (MR, FIG. 5), and the power pressure or starting control portion 398 controls hydromechanical unit 23 for operation (at point $a$, FIG. 8), providing increasing torque ratio at zero speed ratio with 100% power transmitted in the hydraulic path (point 354 on curve □) and 0% power transmitted mechanically at stall or zero vehicle speed, as indicated by point 355 on curve X (FIGS. 10 and 11), for all throttle positions.

When the transmission 13 is operating at stall (line AB, FIG. 9), increasing throttle increases engine or input torque until it meets torque load to increase output and vehicle speed. This occurs at any stall operating point from engine idle to maximum torque speed or any point on line AB, FIG. 9. The power pressure control system portion 398 and its starting control valve 211 are responsive to input speed, output speed, and throttle pressure to continuously vary speed and torque ratio to move the operating point from any starting point on line AB to a transition point on line (T) at its intersection with the percent throttle line.

When output torque exceeds torque load to start moving the vehicle, increasing vehicle speed, the speed ratio increases from zero to the transition speed ratio for hydromechanical unit 23 (points $a$ to $t$, FIG. 8; points 355 to 356 at line T, curve X, FIGS. 10, 11), and overall for this transmission (curve O to lines T, FIGS. 10, 11), and the overall torque ratio is initially the maximum limited value (points 376–377, curve O, FIGS. 12, 13), and then decreases (point 380) under the control of power pressure or starting control portion 398, terminating at the transition point (line T).

Torque control in the pressure control phase (PCP) is completed at the transition speed ratio (point $t$, FIG. 8; line T, FIGS. 9–13), and then continues in the displacement control phase (DCP). The power pressure control portion 398 does not normally function during the displacement control phase (DCP) having normally lower high power pressure, but will function to relieve and limit abnormal high power pressure.

In the displacement control phase (DCP), ratio control pressure, e.g., 40 psi, is provided by engine or input governor pressure in line 164 and modified throttle pressure in line 201 control of ratio control valve 261 to control ratio control pressure in line 262 to control ratio control servo 286 to vary the displacement of hydrostatic converter 132 to control hydromechanical unit 23, and automatic controls 395 control mechanical unit 24 to meet the speed ratio requirements for the desired program shown in the FIG. 9 plot of transmission operating lines, the shift lines and percent torque transmitted mechanically, lines plotted on coordinates of engine speed rpm, and output speed as vehicle speed mph. The percent throttle lines show the percent throttle position for an upshift speed ratio increasing operation. The speed ratio of components of and the overall transmission, and the percent power transmitted hydraulically and mechanically relative to vehicle speed, are shown for an upshift 100%-throttle operation sequence (FIG. 10), and for an upshift road-load-throttle operation sequence (FIG. 11). The torque ratio of components of and the overall transmission and the efficiency curve for hydromechanical unit 23 relative to vehicle speed are shown for 100%-throttle operation sequence in FIG. 12, and for road-load-throttle operation sequence in FIG. 13.

When the transmission 13 is operating at any speed ratio above zero, there is a corresponding relation between input and output speed. Since on a charge of speed ratio, vehicle inertia maintains constant output speed, at least as long as the shift cycle and ratio control cycle time periods, a reduction of speed ratio will tend to increase engine speed, and an increase of speed ratio will tend to decrease engine speed to provide a control signal for constant engine speed control. A load increase or decrease at constant throttle and engine speed and torque ratio will respectively decrease or increase output or vehicle speed and engine speed.

If engine speed increases faster and is higher in relation to throttle position than called for by the FIG. 9 program, the balancing ratio control pressure valve is reduced to cause ratio servo 286 to, in the reaction phase (RP) reduce displacement and, in the action phase (AP) to increase displacement of variable displacement hydrostatic converter 35 or 132, which will increase the speed ratio of hydrostatic transmission portion 39 and hydromechanical transmission unit 23 to reduce engine speed and engine governor pressure, so ratio control valve 261 provides the balancing ratio control pressure to maintain the new lower value of displacement and speed ratio in each gear ratio, as required by this program.

The automatic shift controls 395 function, in relation to transmission output speed and in relation to throttle position, to shift the operating program, e.g., to upshift mechanical unit 24 to a higher gear ratio, e.g., 2nd to 3rd, or a lower ratio, e.g., 3rd to 2nd, in relation to throttle position as called for by the FIG. 9 operating program. Both hydromechanical control part 397 and automatic controls 395 reduce speed ratio to increase engine speed to the program value. The hydromechanical control part 397 and automatic controls 395 are coordinated for continuously variable automatic ratio change to provide the operating program.

As shown in FIG. 9, as vehicle speed increase is permited by the load at any constant percent throttle, the controls control speed and torque ratio to provide a constant engine speed at a speed value proportional to percent throttle from the minimum idle speed at idle throttle, e.g., 800 rpm (60% throttle line AF), to the maximum engine speed at full throttle, e.g., 3,700 rpm (100%-throttle line CD), by coordinately varying the speed ratios of hydromechanical unit 23 and mechanical unit 24 for continuously variable overall ratio change in a predetermined operating program for optimum performance and efficiency of the engine and transmission. The upshift portion of this operating program, which is effected under power with optimum performance and efficiency, is now described.

The hydromechanical control part 397 provides in hydromechanical unit 23 continuously variable ratio change, while mechanical unit 24 is in each gear ratio and step-ratio change when mechanical unit 24 makes a step-gear ratio change.

When mechanical unit 24 is placed in 1st gear ratio by mechanical unit control part 396 by positioning its manual valve 331 in drive [D] position at vehicle stall, hydromechanical unit 23 functions in the 1st gear cycle having only a continuously variable drive portion initiated in the power pressure control phase under the control of power pressure control portion 398, as discussed above, to increase vehicle speed ratio from stall to the transition speed ratio (points a to t, FIG. 8; point A to line T, FIG. 9; points 355 to 356, FIGS. 10, 11; points 377 to 380, FIGS. 11, 12). The transition speed ratio is at higher vehicle speeds with increasing throttle. At the transition speed ratio power pressure control portion 398 closes starting servo valve 241, so there is no by-pass from first power pressure passage 153 to second power pressure passage 154, and displacement control portion 399 operates in a displacement control phase (DCP) to increase speed ratio from the transition speed ratio, through the stationary reaction speed ratio, to the 1st upshift speed ratio (points t to c to d, FIG. 8; 356-366-357, FIGS. 10, 11). In FIG. 9 this speed ratio change occurs as the operating point moves on any constant throttle line from line (T) through a 100% power-transmitted mechanical line to the 1st-2-nd-1st shift line. During this speed ratio change by hydromechanical unit 23 in the displacement control phase (DCP), percent hydraulic path power, or power transmitted by the hydraulic units, changes from a low value, e.g., 36%, through zero, to a low value, e.g., 28.6% (points t-c-d, FIG. 8), to provide a very low average hydraulic path power. The displacement control phase has a reaction phase and an action phase (RP and AP, FIG. 8). In the reaction phase of hydromechanical unit 23, input torque of carrier 27 is delivered to ring gear 29 and intermediate shaft 32, the mechanical path, and to sun gear 28 and by hydrostatic portion 39 to intermediate shaft 32, the hydraulic path. In hydrostatic portion 39, sun gear reaction torque drives reaction hydrostatic converter 131 in the reaction direction (arrow R) which functions as a pump to supply pressure at stall and drive reaction pressure flow and thus power flow, in the direction (arrow DR, FIG. 5), in first power passage 153 to drive output hydrostatic converter 132 as a motor driving intermediate shaft in the direction (arrow I). As described above, in the power pressure control phase (PCP, FIG. 8), with output hydrostatic converter 132 at maximum reaction phase displacement position (MR), power pressure control portion 398 functions to increase speed ratio from stall to the transition speed ratio (point t, FIG. 8). Then the displacement control portion 399 functions to reduce output hydrostatic converter 132 displacement to zero (OD), to decrease and stop power passage fluid flow to increase hydrostatic portion speed ratio and increase hydromechanical speed ratio to the stationary reaction speed ratio (point c, FIG. 8). Then in the action phase (AP), intermediate shaft 32 drives output hydrostatic converter 132 in the direction (arrow I) as a pump to supply power pressure flow and power in the drive action direction (arrow DA) to drive reaction hydrostatic converter 131 in the action direction (arrow A) to, as action phase displacement increases to a maximum (MA), increase speed ratio to maximum action phase speed ratio (point d, FIG. 8), which is the first step-up speed ratio (point 357, FIGS. 10, 11), at the 1-2 shift point.

At the 1—2—1 shift line (FIG. 9) or 1-2 shift line (FIGS. 10, 11), the 2ND gear cycle begins with the shift portion in which shift controls 395 step-upshift mechanical unit 24 from 1st gear ratio to 2nd gear ratio by the gear ratio step and, at the same time, displacement control portion 399 of hydromechanical control part 397 step-downshifts hydrostatic portion 39 and thus hydromechanical unit 23 to reduce the speed ratio by an equal hydromechanical ratio step from the 1st step-up speed ratio to the 2nd step-down speed ratio (points d-c-b, FIG. 8; points 357-371-358, FIGS. 10, 11). This shift occurs at an operating point, the intersection of the 1—2—1 shift line and any throttle line (FIG. 9) indicating the 1-2 shift occurs without speed ratio change, since the upshift gear ratio step is equal to the downshift hydromechanical ratio step. Thus there is no change of overall ratio at the 1-2 shift (as shown in FIGS. 10 and 11, by the straight overall speed ratio curve O) at the 1-2 shift line to provide progressive continuously variable overall ratio change. At the 1-2 shift point, both the product of the 1st gear speed ratio and the 1st step-up speed ratio and the product of the 2nd gear speed ratio and the 2nd step-down speed ratio equal the overall speed ratio, so the 1-2 shift does not change overall speed ratio.

Then with continued vehicle acceleration or increasing vehicle speed at moderate throttle, 2ND gear cycle operation continues in the drive portion with automatic shift controls 395 holding mechanical unit 24 in 2nd gear drive (e.g., 2nd gear line of mechanical unit speed ratio curve Δ, FIGS. 10 and 11), and displacement control portion 399 of hydromechanical control part 397 progressively increases hydromechanical unit 23 speed ratio from the 2nd step-down speed ratio (point 358), through the stationary reaction speed ratio (point 367), to the 2nd step-up speed ratio (point 359); points b-c-f, FIG. 8; points 358-367-359; hydromechanical speed ratio curve X, FIG. 11) and on any throttle line, from 1—2—1 shift line through 2nd 100% mechanical power line, to the 2—3—2 shift line (FIG. 9), to progressively increase overall speed ratio (curve O) from the 1-2 shift point to the 2-3 shift point.

Then with continued vehicle speed increase at any throttle, the 3RD gear cycle operation—which is like the 2ND gear cycle—begins, with the shift portion in which automatic shift controls 395 step-upshift mechanical unit 24 from 2nd gear to 3rd gear having 3rd gear speed ratio at the 2-3 shift point (3rd gear, speed ratio mechanical unit curve Δ, FIGS. 10, 11), and the hydrostatic ratio control system step-downshifts hydromechanical unit 23 from the 2nd step-up speed ratio (point 359) through the stationary reaction speed ratio (point 372) to the 3rd step-down speed ratio (point 361; points f-c-e, FIG. 8; points 359-372-361 on hydromechanical unit speed ratio curve X, FIG. 11), and at the point of intersection of 2—3—2 shift line and any throttle line (FIG. 9). As in the 1-2 in the 2-3 shift, the mechanical unit 2-3 ratio step and the hydromechanical unit ratio step are equal, so there is no change of overall ratio at the 2-3 shift point (as shown by the straight overall speed ratio curve O, FIGS. 10, 11).

The 3RD gear cycle then continues in the drive portion with mechanical unit 24 continuing in 3rd gear and hydromechanical unit 23 progressively increasing its speed ratio from the 3rd step-down speed ratio, through the stationary reaction speed ratio, to the 3rd step-up speed ratio (e.g., points e-c-h, FIG. 8; points 361-368-362, curve X, FIGS. 10, 11), and on any throttle line from the 2—3—2 shift line, through the 3rd 100% mechanical power line, to the 3—4—3 shift line (FIG. 9), for continuous progressive overall speed ratio increase (overall speed ratio curve O), from the 2-3 shift point to the 3-4 shift point.

The highest or 4TH gear cycle begins with a similar shift portion in which automatic shift controls 395 provide a 3-4 step-upshift in mechanical unit 24 to 4th gear (4th gear mechanical unit speed ratio curve Δ), and hydrostatic displacement control portion 399 provides an equal step-downshift from the 3rd step-up speed ratio, through the stationary reaction speed ratio, to the 4th step-down speed ratio (e.g., points h-c-g, FIG. 8; points 362-373-363, FIGS. 10 and 11), and at the point of intersection of any throttle line and 3—4—3 shift line (FIG. 9). The 3-4 shift is thus like the above-described ratio shifts, without ratio change or a step at the shift point. When automatic shift controls 395 shift to 4th ratio at 4th ratio upshift speed, pressure is supplied to 4th ratio apply line 346, which is connected to apply 4th ratio device 330 for 4th gear and also is connected through shuttle valve 318 and inhibitor line 321 to chamber 322 of overdrive inhibitor device 307, to move inhibitor piston 308 against spring 313 to position stop member 312 in inhibiting position, limiting movement of servo piston 287 at the zero displacement position (OD), and preventing movement into the action phase (AP) range; and similarly limiting displacement control of hydrostatic converter 132 at zero displacement position (OD), providing stationary reaction hydromechanical speed ratio.

In the 4TH gear cycle drive portion, automatic shift controls 395 hold mechanical unit 24 in 4th gear, and hydromechanical control part 397 increases hydromechanical speed ratio from the 4th step-down ratio to hydromechanical stationary reaction speed ratio (e.g., points g-c, FIG. 8; points 363-364 on curve X, FIGS. 10, 11), and on any throttle line from 3—4—3 shift line to the 4th 100% torque transmitting mechanical line, which is also the maximum speed ratio line and minimum engine speed line for engine speeds above idle.

The following RATIO TABLE is illustrative of and shows values for gear or torque ratios, speed ratios, and ratio steps of the 4-speed gear mechanical unit 24, and coordinated hydromechanical ratio step of the shift portion of each gear cycle showing equal mechanical and hydromechanical ratio steps at each gear step-shift point, and also showing the maximum and minimum percents of power transmitted hydraulically in the drive portion and the shift portion of each gear cycle.

RATIO TABLE

| GEAR CYCLE | Ratios and Steps | 4-Speed Gear Unit | | Hydromechanical Unit | | | |
|---|---|---|---|---|---|---|---|
| | | RATIO | | RATIO STEPS | | Percent Hydraulic Power | |
| | | Gear or Torque | Speed | Gear | Ratio | Hydro-mech'l. | |
| | | | | | | Max. | Min. |
| 1ST | 1st Drive | 2.87 | .35 | | | 100% | 0% |
| 2ND | 1-2 step-shift | | | $\frac{.62}{.35} =$ | 1.79 | $= \frac{1.75}{.97}$ | 28.6 | 0 |
| | 2nd Drive | 1.60 | .62 | | | 28.6 | 0 |

RATIO TABLE-continued

| GEAR CYCLE | Ratios and Steps | 4-Speed Gear Unit | | | | Hydromechanical Unit | | |
|---|---|---|---|---|---|---|---|---|
| | | RATIO | | RATIO STEPS | | | Percent Hydraulic Power | |
| | | Gear or Torque | Speed | Gear | Ratio | Hydro-mech'l. | Max. | Min. |
| 3RD | 2-3 step-shift | | | $\frac{1.0}{.62} =$ | 1.6 | $= \frac{1.674}{1.046}$ | 23.1 | 0 |
| | 3rd Drive | 1.0 | 1.0 | | | | 23.1 | 0 |
| 4TH | 3-4 step-shift step-shift | | | $\frac{1.47}{1.0} =$ | 1.47 | $= \frac{1.619}{1.100}$ | 19.1 | 0 |
| | 4th Drive | .68 | 1.47 | | | | 19.1 | 0 |

The modified throttle pressure control valve 191 provides minimum modified throttle pressure, e.g., 0 psi, from idle (0%) up to a high-to-maximum torque at idle speed throttle position (e.g., 60%), and modified throttle pressure in line 201 and input or engine speed pressure in line 164 control the ratio control pressure valve 261 to regulate ratio control pressure in line 262 to control ratio control servo 286 to control hydromechanical speed ratio to limit minimum engine speed to the minimum value (e.g., line A-F, FIG. 9). From this throttle position to full throttle (e.g., 60% to 100%), the increasing modified throttle pressure in line 262 acts with input governor 19 pressure in line 164 to control ratio control pressure valve 261 to control pressure in line 262 and ratio control servo 286 to provide, with increasing throttle, increasing minimum engine speed (e.g., line F-E, FIG. 9). In FIG. 9 the program is shown to rated maximum speed, so lines CD and FE are not shown to the point of intersection which occurs at higher speed.

FIG. 9 and a comparison of FIG. 10 100%-throttle, and FIG. 11 lower road-load throttle show that automatic shift controls 395 provide upshifts in mechanical unit 24 at higher output and vehicle speeds with increasing throttle, and that the ratio change gear cycles in hydromechanical unit 23 provided by hydromechanical control part 397 are responsive to, and coordinated with, mechanical unit 24 step-ratio change to similarly shift at higher vehicle speeds with higher throttle position. The magnitude of hydromechanical unit speed ratio, the magnitude of mechanical unit speed ratio, and their coordinated relation to each other, remain constant as throttle varies, and as they occur at different vehicle speeds as throttle varies, to the overall rate of speed ratio change is constant up to maximum speed ratio; and the rate of increase of overall speed ratio relative to vehicle speed decreases with increasing throttle position (e.g., overall speed ratio curve O, FIGS. 10 and 11), up to the same maximum speed ratio.

The hydromechanical unit 23, mechanical unit 24, and overall transmission 13, have torque and speed ratios having a reciprocal relation except that at and near stall in the pressure control phase (PCP), torque ratio and maximum torque are limited.

FIGS. 10 and 11 show the speed ratio of mechanical unit 24 (curve Δ), the speed ratio of hydromechanical unit 23 (curve X), and their product overall speed ratio (curve O). FIGS. 12 and 13 show the torque ratio of mechanical unit 24 (curve Δ), the product of mechanical unit torque ratio and the constant mechanical path torque ratio, e.g., 0.74, of hydromechanical gearing portion 25, combined mechanical path torque ratio (curve X), and the overall torque ratio (curve O), to describe how the hydraulic torque path torque ratio and torque increases and decreases the mechanical torque path step torque ratio to provide stepless overall torque ratio change.

In the 4-speed mechanical unit 24, the torque ratios, 1st to 4th, decrease in steps (curves Δ, FIGS. 12, 13), and are the reciprocal of the speed ratios (curves Δ, FIGS. 11, 12), as shown in the above RATIO TABLE. In hydromechanical unit 23 (FIG. 1), gearing portion 25, with input carrier 27, output ring 29, and reaction sun gear 28, has an overdrive torque ratio (e.g., 0.74), and divides input torque into a mechanical path transmitting a major portion of input torque (e.g., 74%), and a hydraulic path transmitting a minor portion of input torque (e.g., 26%), providing a high ratio of mechanical path torque to hydraulic path torque, e.g., 2.8. The gearing portion 25 multiplies torque in the mechanical path by the constant torque ratio of the gearing and mechanical path, e.g., 0.74. The combined mechanical torque path from input shaft 12 through the mechanical torque path of gearing portion 25 of hydromechanical unit 23, and the mechanical torque path of mechanical unit 24 to output shaft 12 has a stepped combined mechanical torque ratio (curve X, FIGS. 12, 13), equal to the product of the constant torque ratio of gearing portion 25 and the stepped torque ratios (curve X) of mechanical unit 24. The hydromechanical control part 397, when functioning as described above with reference to speed ratio change, controls the torque ratio and the direction of power flow in hydrostatic portion 39, and thus in the hydraulic torque path of hydromechanical unit 23. This hydraulic torque path has a torque ratio curve with a modified reciprocal relation to the speed ratio (curve X, FIGS. 10, 11). In the reaction phase (RP), torque ratios are positive as hydraulic path and mechanical path power flow in the same directions. At and near stall speed ratio, the hydraulic path torque ratio has a maximum limited torque ratio and then, as speed ratio increases to the transition speed ratio, torque ratio decreases to the transition torque ratio in the power pressure control phase (PCP) controlled by power pressure control portion 398. Then in the displacement control phase (DCP), as displacement controls change speed ratio from the transition speed ratio to the stationary reaction speed ratio, the hydraulic path torque ratio decreases from the transition torque ratio to zero to complete the reaction phase (RP). In the action phase (AP), the hydraulic path torque ratios are negative, as hydraulic path power flows in a direction opposite to that of mechanical path power. Then in the action phase (AP) as speed ratio increases from the stationary reaction speed ratio (point 366) to the 1st step-up speed ratio (point 357), negative hydraulic path torque ratio increases to the negative 1st step-up torque ratio. During a step speed ratio change decreasing speed ratio from the 1st step-up speed ratio (point 357) through stationary reaction speed ratio (point 371) to the 2nd step-down speed ratio (point 358), the negative 1st step-up hydraulic path torque ratio is increased through zero torque ratio to a positive 2nd step-down hydraulic path torque ratio, providing reduced torque multiplication during a shift. In higher speed ratios and at higher shift points, hydraulic path torque ratio varies in a similar manner. Efficiency also reduces torque ratio below the reciprocal of speed ratio, as explained below.

The product of hydraulic torque path torque ratio and mechanical unit torque ratio provides the combined hydraulic path torque ratio, which varies like the hydraulic path torque ratio, but the positive step-up torque ratios decrease and the negative step-down torque ratios increase toward zero speed ratio in each step as mechanical unit torque ratio decreases.

The combined hydraulic path torque ratio provides, in combination with the combined mechanical unit torque ratio (curve X, FIGS. 12 and 13), the difference between the combined mechanical torque ratio (curve X) and the overall torque ratio (curve O). This difference, representing the combined hydraulic torque path torque ratio portion of the overall torque ratio, is shown by the cross-hatched areas between the overall torque ratio (curve O) and the combined mechanical path torque ratio (curve X). In the reaction phase (RP) of hydromechanical unit 23 operation in each gear ratio of mechanical unit 24, the combined hydraulic path torque ratio has progressively decreasing positive values relative to increasing vehicle speed from the vehicle speed at which each gear ratio is initially engaged for drive [D], decreasing to zero (at points 381, 382, 383, 384, respectively) in the 1st to 4th gear ratios at the end of the reaction phase (RP), at the stationary reaction torque and speed ratio in which zero torque and power are transmitted by the hydraulic torque path.

Then in the action phase (AP), the combined hydraulic torque path has a combined hydraulic torque ratio having progressively increasing negative values relative to increasing vehicle speed, from the vehicle speed at the stationary reaction points (e.g., points 381, etc.), to the next higher shift point. These negative values subtract from the combined mechanical path torque ratio (curve X) to provide an overall torque ratio value at each step-up shift point equal to, or matching, the overall torque ratio at each step-down shift point in the next higher ratio, so the overall torque ratio, like the overall speed ratio, is progressively continuously variable.

In 1st ratio, the initial portion of the combined hydraulic torque ratio and the overall torque ratio (curve O, FIGS. 12 and 13) is constant between points 376 and 377, since power pressure control portion 398 limits hydrostatic power passage pressure, hydraulic torque path torque, and torque ratio. In the highest ratio, e.g., 4th ratio, there is only a reaction phase (RP), reducing torque ratio to the stationary reaction torque ratio for zero hydraulic torque and power drive in essentially all of 4th ratio drive. The combined hydraulic path torque ratio decreases progressively in each gear ratio and increases in steps at each shift point with increasing gear ratio.

The overall torque ratio (curve O, FIGS. 12, 13) for transmission 13 may also be described as the product of the torque ratios of hydromechanical unit 23 and mechanical unit 24. As indicated in the above RATIO TABLE, the torque ratio for each gear drive of mechanical unit 24 is the reciprocal of the speed ratio. The torque ratio of hydromechanical unit 23, in the displacement control phase (DCP), is based on planetary gearing portion 25 speed ratio relation.

$$N_R = 1.36N_C 31\ 36N_S$$

and the hydrostatic portion 39 speed ratio relation:

$$N_S \times D_R = D_O N_R,$$

where,
$N_R$ = speed of output ring gear 29;
$N_C$ = speed of input carrier 27;
$N_S$ = speed of reaction sun gear 28;
$D_R$ = displacement of reaction hydrostatic converter 131;
and
$D_O$ = displacement of output hydrostatic converter 132.

Since input torque is divided in the gearing portion 25, operating in the shift cycle displacement control phase (DCP) into the mechanical path having high efficiency (e.g., 98%) and transmitting a major portion to full power (e.g., 71.4% to 100%), and the hydraulic path having low efficiency (e.g., 80%) in the action phase (AP) and lower efficiency (e.g., 70%) in the reaction phase (RP) and transmitting a minor portion of full power (e.g., 28.6% to 0%), the efficiency reduces output power (e.g., 91% of input power). Thus torque and torque ratio are reduced, as compared to the reciprocal of speed ratio, by the efficiency factor and percent torque transmitted by each power and torque path.

The shift points of mechanical unit 24 which are controlled by automatic shift controls 395 are provided at speeds where the hydromechanical efficiency is the same in the lower ratio before the shift and the higher ratio after the shift, so the output power is the same before and after a shift. Since power and speed ratio are the same before and after a shift, optimum shift quality is provided.

While hydrostatic portion 39 has been described as providing the stationary reaction speed and torque ratios at zero displacement of variable displacement hydrostatic converter 35 or 132 in accordance with theoretical practice, since the efficiency of hydrostatic transmissions is less than 100% (e.g., 70%-80%), the displacement control will be displaced slightly on the action side of zero displacement to hold reaction sun gear 28 stationary to provide the stationary reaction member speed and torque ratios and zero torques and power in the hydraulic path. Also, since efficiency is greater in the reaction phase (RP) than in the action phase (AP), the displacement control positions will be slightly displaced in the same direction. Further, while transmission 13 has been described from the viewpoint of providing the same overall speed and torque ratios before or at the initiation of a shift, and after or on the completion of a step-shift in mechanical unit 24 by controlling step-speed and torque ratio change in hydromechanical unit 23, hydromechanical unit 23 provides equal power before and after the shift.

As pointed out above, torque and power are divided in the dual-path hydromechanical unit 23 into a mechanical power path in gearing portion 25 and a hydraulic power path in hydrostatic portion 39, and then combined and transmitted by the mechanical path of mechanical unit 24. Thus, transmission 13 has overall a mechanical power path and a hydraulic power path. The percentage of power split is determined in hydromechanical unit 23. For maximum transmission efficiency (curve E, FIGS. 12 and 13), maximum power transfer is in the mechanical path. The combination of mechanical and hydraulic path torque and power provides a large continuously variable speed ratio range from stall, zero speed ratio, to a high maximum speed ratio, which is controlled for optimum high engine efficiency.

As shown in FIGS. 10 and 11, the percent power transmitted by the mechanical path (curve X) is 0% at stall (point 355), and increases quickly to 100% in the 1ST gear cycle (point 366), and then in each shift cycle, cycles both during the shift portion and the drive portion, values between 100% and high values (e.g., ranging from 71.5% to 80.9%), providing a high average, e.g., 83%, and then at maximum speed ratio (point 364) is 100%. Thus during normal road-load operation (FIG. 11), in the power pressure control phase (PCP) during a short initial portion of vehicle acceleration, up to a low speed (e.g., 8 mph), the percent mechanical path power increases quickly from 0% to a high value, e.g., 64%, and continues at a high average value, e.g., 83%, during a moderate portion of vehicle acceleration, up to a moderate speed (e.g., 35 mph), and is 100% mechanical power above this moderate speed. The mechanical power increases from 0% to 75% at 5 mph, and then averages 83% at 35 mph and 100% at higher speed (curve X, FIG. 11). Thus a high percent of mechanical power is used in the low-speed vehicle acceleration range, and all mechanical power during the major portion of road-load driving for high overall efficiency. During 100% throttle acceleration, the mechanical power increases from 0% at stall, and increases to 64% at 24 mph, and thereafter averages about 85%.

In FIGS. 10 and 11 there are also shown simplified percent hydraulic power curves which, because the change of power at the shift point is omitted and the curve is entirely on one side of the zero hydraulic power ordinate, provide a simplified view of the percent power change with vehicle speed. The FIG. 11 percent power transmitted hydraulically (curve shows the percent hydraulic power is 100% at stall, decreases to a low average (e.g., 14%) between 6 mph and 35 mph, and is zero at higher speeds -35 mph to 140 mph.

The conventional automatic shift controls 395 downshift mechanical unit 24 at a downshift speed lower than the upshift speed at each shift point since the automatic shift valves have mainline pressure hysteresis and throttle pressure hysteresis directly proportional to throttle position-as shown in the above Borman patent, or inversely proportional to throttle positon-as shown in U.S. Pat. No. 3,691,872 Schaefer and Fox dated Sept. 19, 1972, and U.S. Pat. No. 3,587,355 Schaefer dated June 28, 1971. The hydromechanical unit control part 397 controls hydromechanical unit 23 to step-shift and progressively shift hydromechanical unit 23 from higher ratios to lower ratios in an operating sequence opposite to the above-described upshift sequence with reference to the operating curves in FIGS. 10 to 13, with the shift points and curves displaced to lower vehicle speeds by hysteresis. The automatic shift valve hysteresis will position each downshift point (i.e., 2–1), at a slightly lower vehicle speed than the corresponding upshift point (i.e., 1–2), but otherwise the ratio and percent power curves of FIGS. 10 to 13 will vary in a similar manner and relationship to each other. Since this transmission has overall continuously variable ratio change, the shift hysteresis in the automatic control 395 is preferably substantially less than the shift hysteresis in a conventional step-ratio automatic transmission, as shown in the above Borman patent. The efficiency curve relation to the shift points will change slightly, so downshifts will not be made at equal efficiency values of the ratios involved, but this has little effect as normal downshifts are made at low or idle throttle and low and decreasing power. The vehicle is generally coasting during a downshift, with the vehicle driving the transmission output to coast-drive the engine. The relation of engine speed and vehicle speed shown in FIG. 9 will be the same for upshifts and downshifts.

Throttle increase during normal driving operation will provide a progressively continuously variable downshift in a manner similar to the step-downshift of automatic gear-change transmissions, as shown in the above Borman patent. If the transmission 13 is being operated as shown in FIG. 11 at near-level road-load operation throttle position at 100 mph, and thus mechanical unit 24 is in 4th gear (e.g., 1.47), and hydromechanical unit 23 is in the fixed reaction speed ratio (e.g., 1.36) to provide an overall speed ratio (e.g., 2.0), and throttle is advanced quickly to 100% as shown in FIG. 10, the controls will progressively continuously variably downshift the transmission 13 at 100 mph by a shift in mechanical unit 24 to 3rd gear and stepchanging and progressively changing the hydromechanical speed ratio to provide a lower overall speed ratio (e.g., 1.2) for acceleration performance.

Figure 7:
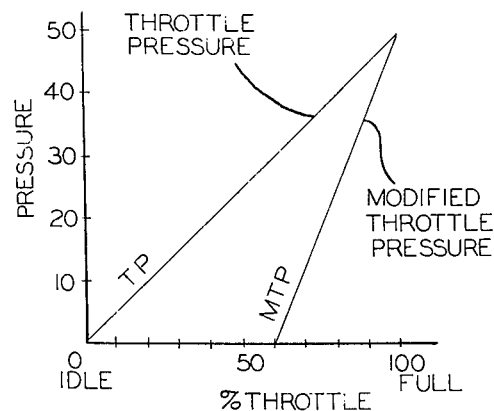
FIG. 7 shows throttle pressure and modified throttle pressure curves relative to precent throttle.

The throttle increase acts on throttle valve 177 to increase throttle modulator pressure (curve TP, FIG. 7), which pressure also acts on modified throttle pressure valve 191 to increase modified throttle pressure (curve MTP, FIG. 7). Modified throttle pressure acts on ratio control valve 261 to increase ratio control pressure in line 262 which acts on ratio control servo 286 to progressively change displacement to reduce hydromechanical speed ratio. In this example, with operation in 4th gear ratio, hydromechanical unit 23 is in zero displacement position (OD), and displacement is reduced in the reaction phase (RP) to reduce hydromechanical unit 23 speed ratio to the 4th step-down speed ratio for downshift at the 4–3 shift point, which is at a lower vehicle speed than the 4th step-down speed ratio for upshift. Then throttle pressure, acting on the shift valves of the automatic control system, provides a 4–3 downshift in mechanical unit 24 and causes, in response to engine governor pressure in line 164, changed by the gear ratio shift, and modified modulated pressure in line 201 acting on ratio control valve 261 to provide ratio control pressure in line 262 to act on ratio control servo 286 to step-increase hydromechanical unit speed ratio to a 3rd step-up speed ratio for downshift similar to the 3–4 upshift but at the slightly lower vehicle speed than the 3-4 upshift. Then ratio control servo 286 continues to progressively reduce hydromechanical speed ratio if vehicle speed has not changed on a curve similar to upshift sequence speed ratio (curve X) in 3rd gear but displaced to a lower vehicle speed, and thus compensates providing equal speed ratio during the downshift sequence as during the upshift sequence.

INTERMEDIATE RANGE

When the manual valve 331 is positioned in Intermediate (Int.) range position, mainline 158 is connected to drive and intermediate range lines 334 and 335, and the neutral signal line 337 and low and reverse range lines 336 and 338 are exhausted. So mechanical unit control part 396 and its automatic shift controls 395 provide automatic shifting of mechanical unit 24 between 1st and 2nd gear ratios with the 1st-2nd shift at higher vehicle speed than in Drive (D) range, and inhibit a shift to 3rd gear, as indicated by the above SHIFT TABLE.

In Intermediate range 2nd gear, automatic shift controls 395 supply 2nd two-way apply line 344 to apply 2nd two-way drive device 328, which is applied because neutral signal line 337 is now exhausted. Also, since neutral signal line 337 is exhausted, cut-off valve 319 is in open position connecting 2nd two-way apply line 344 through cut-off valve 319, second feed line 320, first shuttle valve 316, first feed line 317, second shuttle valve 318, and inhibitor line 321 to inhibitor chamber 322 to actuate inhibitor device 307 to limit movement of ratio servo 286 beyond zero displacement position (OD) into the action phase (AP).

In Intermediate range 1st gear, 4th apply line 346 and low range line 336 remain exhausted as in 2nd gear, and 2nd two-way apply line 344 is exhausted; so inhibitor line 321 is exhausted, and inhibitor device 307 is inoperative. The hydromechanical unit control part 397 is supplied by, and functions in response to 1st-2nd-1st shifts in mechanical unit 24 by mechanical unit control part 396 in the same manner as in Drive (D) range, except that in 2nd gear, hydromechanical speed ratio only increases to the stationary reaction speed ratio.

LOW RANGE

When the manual valve 331 is positioned in Low (L) range position, mainline 158 is connected to drive 334, intermediate 335, and low 336 range lines, and neutral signal line 337 and reverse range line 338 are exhausted. So mechanical unit control part 396 and its automatic shift controls 395 normally provide 1st gear, and only provide an upshift to 2nd gear on engine overspeed, as shown in the above SHIFT TABLE.

In Low range, 1st two-way apply line 342 engages 1st two-way device 327, and low range line 336 is connected by first shuttle valve 316, first feed line 317, second shuttle valve 318, and inhibitor line 321 to actuate inhibitor device 307 to limit hydromechanical speed ratio increase from zero to the stationary reaction speed ratio. The hydromechanical control part 397 is supplied by, and functions in response to 1st-2nd-1st shifts in mechanical unit 24 by mechanical unit control part 396 similar to Drive range operation except that in both 1st and 2nd gear, hydromechanical speed ratio is only permitted to increase up to the stationary reaction speed ratio. Since low range shifts only occur at abnormally high engine overspeeds, the half-step shift is acceptable and provides a hysteresis effect.

REVERSE RANGE

When the manual valve 331 is positioned in Reverse (Rev) range position, mainline 158 is connected to reverse range line 338 and neutral signal line 337 and the other range lines (334, 335, and 336) are exhausted, so mechanical unit control part 396 establishes Reverse drive in mechanical unit 24, as shown in the above SHIFT TABLE, and supplies hydromechanical control part 397 for operation of hydromechanical unit 23 in the same manner as in Drive range 1st gear for a continuously variable Reverse drive.

COAST OPERATION

In coast operation, when the vehicle drives the engine, the overall operation and ratio change is similar to the above-described engine drive operation for upshift and downshift. During coast operation the power flow is reversed, as compared to drive operation. The operation of mechanical unit 24 and its control part 396 is otherwise the same, except the operator will normally place the throttle in idle position. In hydromechanical unit 23 and its control part 397, the operation of gearing portion 25 and hydrostatic portion 39 is also the same, except for the reversal of power flow. In hydrostatic portion 39 during coast operation with reversed power flow, the second power passage 154 becomes the high-pressure passage and the first power passage 153 which had high pressure in drive operation becomes the low-pressure passage. The direction of fluid flow circulation in the reaction (RP) and action (AP) phases in the power passages remains the same for coast operation reaction phase (arrow CR) and action phase (arrow CA).

MODIFICATIONS

While the controls of FIG. 5 have been described with specific reference to the FIG. 1 drive arrangement, they will function in the same manner to control the drive arrangements of FIGS. 2 and 3, providing the type ratio changes having a ratio range coverage and ratios of these gearsets, as explained above.

In the illustrative examples described above, values expressed as a ratio and/or percent such as ratios have been rounded off and thus are approximate.

It will be appreciated that other modifications of the invention may be made.

I claim:

1. In a transmission: an input element; an output element; continuously variable hydromechanical transmission means having planetary gearing means with an input member driven by said input element, an output member driving said output element and a reaction member for providing a mechanical torque path, and hydrostatic transmission means having ratio control means, including variable displacement means, providing a hydraulic torque path connected in parallel to said mechanical torque path between said reaction member and said output element and control means connected to said ratio control means for varying the hydrostatic transmission torque ratio, for providing a hydromechanical speed ratio range from zero speed ratio with all power transmitted in said hydraulic torque path and zero power in said mechanical torque path increasing to a transition speed ratio with a high portion of power transmitted in said mechanical torque path and a low portion of power transmitted in said hydraulic torque path and then to a mid-speed ratio with zero power in said hydraulic torque path and all power transmitted in said mechanical torque path and then limited to the highest used speed ratio with a high portion of power transmitted in said mechanical torque path and a low portion of power transmitted in said hydraulic torque path.

2. In a transmission: an input element; an output element; torque demand means providing a torque demand signal; continuously variable hydromechanical transmission means having gearing means with an input member driven by said input element; an output member driving said output element and a reaction member providing a mechanical torque path; hydrostatic transmission means providing a hydraulic torque path connected in parallel to said mechanical torque path between said reaction member and said output element controlled for providing a hydromechanical speed ratio range from zero speed ratio with all power transmitted in said hydraulic torque path and zero power in said mechanical torque path increasing to a transition speed ratio with a high portion of power transmitted in said mechanical torque path and a low portion of power transmitted in said hydraulic torque path and then to a mid-reaction stall speed ratio with zero power in said hydraulic torque path and all power transmitted in said mechanical torque path and then limited to the highest used speed ratio with a high portion of power transmitted in said mechanical torque path and a low portion of power transmitted in said hydraulic torque path; said hydrostatic transmission means having a reaction hydrostatic converter drive connected to said reaction member, an output hydrostatic converter drive connected to said output element, a first power fluid passage and a second power fluid passage connecting said hydrostatic converters and displacement control means to vary the displacement of said output hydrostatic converter relative to the displacement of said reaction hydrostatic converter to provide a continuously decreasing output to reaction hydrostatic converter displacement ratio, decreasing in a reaction phase from a positive maximum ratio to zero ratio and then decreasing in an action phase by increasing negatively to a negative maximum ratio, operative in said reaction phase to reduce the reaction direction of speed of said reaction member to zero for transmitting torque from said reaction hydrostatic converter to said output hydrostatic converter and increasing hydromechanical speed ratio from a minimum speed ratio to said mid-reaction stall speed ratio at zero reaction member speed and then operative in said action phase from zero reaction member speed to increase the opposite action direction reaction member speed to a high speed for transmitting torque from said output hydrostatic converter to said reaction hydrostatic converter and further increasing hydromechanical speed ratio from said mid-reaction stall speed ratio to a high step-up speed ratio; and control means to control said hydrostatic transmission means to vary the speed ratio of said hydromechanical transmission means including power pressure control means operatively connected to said power fluid passages, said input element, output element and torque demand means to control hydromechanical speed ratio from zero to said transition speed ratio by controlling increasing power fluid pressure differential in response to increasing input element speed, output element speed and torque demand and normally being ineffective to control speed ratio above said transition speed ratio and including displacement controlling means operatively connected to said input element, torque demand means and displacement control means to provide positive maximum displacement ratio in response to input element speed while said power pressure control means controls hydromechanical speed ratio between zero and said transition speed ratio and then to continuously decrease displacement ratio from said positive maximum through zero to said negative maximum in response to increasing input element speed and increasing torque demand to increase hydromechanical speed ratio from said transition speed ratio to said mid-reaction stall speed ratio and then only to said highest used speed ratio.

3. In a transmission: an input element; an output element; hydromechanical transmission means having gearing means with an input member drive connected to said input element; an output member drive connected to said output element and a reaction member providing a mechanical torque path from said input element to said output element; hydrostatic transmission means having a reaction hydrostatic converter drive connected to said reaction member, an output hydrostatic converter drive connected to said output element, a first power fluid passage and a second power fluid passage connecting said hydrostatic converters and displacement control means to vary the displacement of said output hydrostatic converter relative to the displacement of said reaction hydrostatic converter to provide a continuously decreasing output to reaction hydrostatic converter displacement ratio, decreasing in a reaction phase from a positive maximum ratio to zero ratio and then decreasing in an action phase by increasing negatively to a negative maximum ratio, operative in said reaction phase to reduce the reaction direction speed of said reaction member to zero for transmitting torque from said reaction hydrostatic converter to said output hydrostatic converter and increasing hydromechanical speed ratio from a minimum speed ratio to the reaction stall speed ratio at zero reaction member speed and then operative in said action phase from zero reaction member speed to increase the opposite action direction reaction member speed to high speed for transmitting torque from said output hydrostatic converter to said reaction hydrostatic converter and further increasing hydromechanical speed ratio from said reaction stall speed ratio to a high speed ratio; and hydromechanical control means operatively connected to said displacement control means and said input element operative in response to increasing input element speed to control said displacement control means to continuously control said displacement ratio to control hydromechanical speed ratio from said minimum speed ratio through said reaction stall speed ratio to a high speed ratio in response to input element speed to provide a constant input element speed.

4. In a transmission: an input element; an output element; torque demand means adapted for an engine for driving said input element providing a torque demand signal which is substantially constant from idle to starting torque demand and varies with torque demand from starting a full torque demand; hydromechanical transmission means having gearing means with an input member drive connected to said input element; an output member drive connected to said output element and a reaction member providing a mechanical torque path from said input element to said output element; hydrostatic transmission means having a reaction hydrostatic converter drive connected to said reaction member, an output hydrostatic converter drive connected to said output element, a first power fluid passage and a second power fluid passage connecting said hydrostatic converters, and displacement control means to vary the displacement of said output hydrostatic converter relative to the displacement of said reaction hydrostatic converter to provide a continuously decreasing output to reaction hydrostatic converter displacement ratio, decreasing in a reaction phase from a positive maximum ratio to zero ratio and then decreasing in an action phase by increasing negatively to a negative maximum ratio, operative in said reaction phase to reduce the reaction direction speed of said reaction member to zero for transmitting torque from said reaction hydrostatic converter to said output hydrostatic converter and increasing hydromechanical speed ratio from a minimum speed ratio to the reaction stall speed ratio at zero reaction member speed and then operative in said action phase from zero reaction member speed to increase the opposite action direction reaction member speed to a high speed for transmitting torque from said output hydrostatic converter to said reaction hydrostatic converter and further increasing hydromechanical speed ratio from said reaction stall speed ratio to a high speed ratio; and hydromechanical control means operatively connected to said displacement control means, torque demand means and said input element operative in response to increasing input element speed to control said displacement control means to continuously control said displacement ratio to control hydromechanical speed ratio from said minimum speed ratio through said reaction stall speed ratio to a high speed ratio in response to torque demand and input element speed to provide input element idle speed from idle to starting torque demand and to increase input element speed with increasing torque demand from starting to full torque demand.

5. In a transmission* an input element; an intermediate element; an output element; continuously variable transmission means connecting said input element and said intermediate element providing a speed ratio range from zero to a maximum; step ratio gear transmission means providing a first and a second successively higher speed ratio gear drive with a speed ratio gear step between the successive gear drives connecting said intermediate element to said output element; and control means operatively connected to said output element, said input element, said continuously variable transmission means and said step ratio gear transmission means operative in response to increasing output element speed through a shift point speed to control said step ratio gear transmission means to provide said first gear drive as output element speed increases up to said shift point speed, said speed ratio step on a shift from first to second gear drive at said shift point speed and said second gear drive as output element speed increases above said shift point speed and to control said continuously variable transmission means in response to input element speed to provide continuously variable progressively increasing speed ratio with increasing input element speed in said first gear drive, a ratio step equal and opposite to said gear step at said shift point speed and continuously variable progressively increasing speed ratio with increasing input element speed in said second gear drive for overall continuously variable progressively increasing speed ratio.

6. In a transmission: an input element; an intermediate element; an output element; continuously variable hydromechanical transmission means having gearing means with an input member drive connected to said input element, an output member drive connected to said intermediate element and a reaction member for providing a mechanical torque path; hydrostatic transmission means providing a variable ratio hydraulic torque path connecting said reaction member and intermediate element providing a hydromechanical speed ratio change from zero to a maximum; step ratio gear transmission means providing a first and a second successively higher speed ratio gear drive with a speed ratio gear step between the successive gear drives connecting said intermediate element to said output element, and control means operatively connected to said output element, said input element, said hydromechanical transmission means and said gear transmission means operative in response to increasing output element speed through a shift point speed to control said gear transmission means to provide said first gear drive as output element speed increases up to said shift point speed, said speed ratio gear step on a shift from first to second gear drive at said shift point speed and said second gear drive as output element speed increases above said shift point speed and to control said hydrostatic transmission means to vary the speed ratio of said hydromechanical transmission means in response to input element speed to provide continuously variable progressively increasing speed ratio with increasing input element speed in said first gear drive, a ratio step substantially equal and opposite to said gear step at said shift point speed and continuously variably progressively increasing speed ratio with increasing input element speed in said second gear drive for overall continuously variable progressively increasing speed ratio.

7. In a transmission: an input element; an intermediate element; an output element; continuously variable hydromechanical transmission means having gearing means with an input member drive connected to said input element, an output member drive connected to said intermediate element, and a reaction member for providing a mechanical torque path and hydrostatic transmission means providing a hydraulic torque path connected in parallel between said reaction member and intermediate element providing a speed ratio range from zero speed ratio with all power transmitted in said hydraulic torque path and zero power in said mechanical torque path increasing to a transition speed ratio with a high portion of power transmitted in said mechanical torque path and a low portion of power transmitted in said hydraulic torque path and then to a mid-speed ratio with zero power in said hydraulic torque path and all power transmitted in said mechanical torque path and then to the limited highest used speed ratio with a high portion of power transmitted in said mechanical torque path and a low portion of power transmitted in said hydraulic torque path; step ratio gear transmission means providing a first and a second successively higher speed ratio gear drive with a speed ratio gear step between the successive gear drives connecting said intermediate element to said output element, and control means operatively connected to said output element, said input element, said continuously variable hydromechanical transmission means and said step ratio gear transmission means operative in response to increasing output element speed through a shift point speed to control said gear transmission means to provide said first gear drive as output element speed increases up to said shift point speed, said speed ratio step on a shift from first to second gear drive at said shift point speed and said second gear drive as output element speed increases above said shift point speed and to control said hydrostatic transmission means to vary the speed ratio of said hydromechanical transmission means to provide in said first gear drive continuously variable progressively increasing speed ratio with increasing input element speed, at said shift point speed a ratio step equal and opposite to said gear step and having substantially equal limited portions below and above said mid-speed ratio with a high portion of power transmitted in said mechanical torque path and in said second gear drive continuously variable progressively increasing speed ratio with increasing output element speed and having substantially equal portions below and above said mid-speed ratio.

8. In a transmission: an input element having input governor means providing an input speed signal; an intermediate element; an output element having output governor means providing an output speed signal; torque demand means providing a torque demand signal proportional to the torque provided by an engine to said input element; continuously variable transmission means having planetary transmission means and hydrostatic transmission means; said planetary transmission means having a first central gear member, a second central gear member and a carrier member having pinions meshing with said first and second central gear members; said hydrostatic transmission means having a first hydrostatic unit, a second hydrostatic unit hydraulically connected and having variable displacement control means; one of said members being an input member drive connected to said input element, a second of said members being an output member drive connected to said intermediate element and said first hydrostatic unit, and a third of said members being a reaction member drive connected to said second hydrostatic unit; said continuously variable transmission means operative in response to change of displacement by said variable displacement control means providing varying speed ratio; multistep ratio gear transmission means drive connecting said intermediate element and said output element in a first speed ratio drive, through a first ratio step to a second speed ratio drive and through a second ratio step to a third speed ratio drive and having control means operatively connected to said output governor means and said torque demand means operative in response to said output speed signal and said torque demand signal to provide upshifts and downshifts at successively higher shift points to higher speed ratios at progressively higher speeds which increase with torque demand; and control means operatively connected to said input governor means, said torque demand means and said hydrostatic transmission means including said variable displacement control means operative to control said hydrostatic transmission means including said variable displacement control means in response to said input speed signal and said torque demand signal to progressively continuously vary the speed ratio of said continuously variable transmission means in each speed ratio of said multistep ratio gear transmission means and operative in response to an upshift or a downshift at each shift point of said multistep ratio gear transmission means to provide a step ratio change of speed ratio of said continuously variable transmission means equal and opposite to each ratio step of said multistep ratio gear transmission means for continuously variably increasing the overall speed ratio from minimum to maximum.

9. In a transmission: a input element; an intermediate element; an output element; hydromechanical transmission means having gearing means with an input member drive connected to said input element, an output member drive connected to said intermediate element and a reaction member providing a mechanical torque path from said input element to said intermediate element; and hydrostatic transmission means having a reaction hydrostatic converter drive connected to said reaction member, an output hydrostatic converter drive connected to said intermediate element a first power fluid passage and a second power fluid passage connecting said hydrostatic converters, and displacement control means to vary the displacement of said output hydrostatic converter relative to the displacement of said reaction hydrostatic converter to provide a continuously decreasing output to reaction hydrostatic converter displacement ratio decreasing in a reaction phase from a positive maximum ratio to zero ratio and then decreasing in an action phase by increasing negatively to a negative maximum ratio, operative in said reaction phase to reduce the reaction direction speed of said reaction member to zero for transmitting torque from said reaction hydrostatic converter to said output hydrostatic converter and increasing hydromechanical speed ratio from a minimum speed ratio to the reaction stall speed ratio at zero reaction member speed and then operative in said action phase from zero reaction member speed to increase the opposite action direction reaction member speed to a high speed for transmitting torque from said output hydrostatic converter to said reaction hydrostatic converter and further increasing hydromechanical speed ratio from said reaction stall speed ratio to a higher step-up speed ratio; gear means of the step ratio type connecting said intermediate element to said output element and providing a first gear ratio and a second gear ratio having a ratio step between said gear ratios; gear shift control means operatively connected to said gear means and said output element operative in response to output element speed increasing through a one two shift speed to shift said gear means from first ratio through said gear ratio step to second ratio; and hydromechanical control means operatively connected to said hydrostatic transmission means including said displacement control means and said input element operative in response to increasing input element speed when said gear means is in said first ratio to control said displacement control means to continuously decrease said displacement ratio to increase hydromechanical speed ratio from said transition speed ratio through said reaction stall speed ratio to a high first gear step-up speed ratio, in response to decreasing input element speed when said gear means is step ratio shifting to step increase said displacement ratio to step decrease hydromechanical speed ratio from said high first gear step-up speed ratio through substantially a half step to said reaction stall speed ratio and through substantially another half step to a lower step-down speed ratio and in response to increasing input element speed when said gear means is in said second ratio to continuously decrease said displacement ratio to continuously increase said hydromechanical speed ratio from said lower step-down ratio through substantially a half step to said reaction stall speed ratio and through substantially a half step to a high second step-up speed ratio; the product of said first step-up speed ratio and said first gear ratio and the product of said step-down speed ratio and said second gear ratio being substantially equal to provide the same overall speed ratio before and after a shift for continuous overall ratio change; said hydromechanical transmission means having equal efficiency when operating at said first step-up speed ratio in said first gear ratio and said step-down speed ratio in said second gear ratio to provide equal power before and after a shift.

10. In a transmission: an input element; an intermediate element; an output element; torque demand signal means adapted for an engine for driving said input element providing a first torque demand signal varying with torque demand from idle to full torque demand and a second torque demand signal which is substantially constant from idle to a starting torque demand and varies with torque demand from starting to full torque demand; hydromechanical transmission means having gearing means with an input member drive connected to said input element, an output member drive connected to said intermediate element and a reaction member providing a mechanical torque path from said input element to said intermediate element; and hydrostatic transmission means having a reaction hydrostatic converter drive connected to said reaction member, an output hydrostatic converter drive connected to said intermediate element, a first power fluid passage and a second power fluid passage connecting said hydrostatic converters, and displacement control means to vary the displacement of said output hydrostatic converter relative to the displacement of said reaction hydrostatic converter to provide a continuously decreasing output to reaction hydrostatic converter displacement ratio decreasing in a reaction phase from a positive maximum ratio to zero ratio and then decreasing in an action phase by increasing negatively to a negative maximum ratio, operative in said reaction phase to reduce the reaction direction speed of said reaction member to zero for transmitting torque from said reaction hydrostatic converter to said output hydrostatic converter and increasing hydromechanical speed ratio from a minimum speed ratio to the reaction stall speed ratio at zero reaction member speed and then operative in said action phase from zero reaction member speed to increase the opposite action direction reaction member speed to a high speed for transmitting torque from said output hydrostatic converter to said reaction hydrostatic converter and further increasing hydromechanical speed ratio from said reaction stall speed to a high step-up speed ratio; gear means of the step ratio type connecting said intermediate element to said output element and providing a first gear ratio and a second gear ratio having a ratio step between said gear ratios; gear shift control means operatively connected to said gear means, said torque demand means and said output element operative in response to output element speed increasing through a one two shift speed to shift said gear means from first ratio through said gear ratio step to second ratio and said one two shift speed increasing with increasing of said first torque demand signal; and hydromechanical control means operatively connected to said displacement control means, said torque demand means and said input element operative in response to increasing of said second torque demand signal and input element speed when said gear means is in said first ratio to control said displacement control means to continuously decrease said displacement ratio to increase hydromechanical speed ratio from said minimum speed ratio through said reaction stall speed ratio to a high first gear step-up speed ratio, in response to decreasing input element speed when said gear means is step ratio shifting to step increase said displacement ratio to step decrease hydromechanical speed ratio from said high first gear step-up speed ratio through substantially a half step to said reaction stall speed ratio and through substantially another half step to a lower step-down speed ratio and, in response to increasing input element speed when said gear means is in said second ratio, to continuously decrease said displacement ratio to continuously increase said hydromechanical speed ratio from said lower step-down speed ratio through substantially a half step to said reaction stall speed ratio and through substantially a half step to a high second step-up speed ratio and to regulate input element speed at idle speed from idle torque demand to starting torque demand and to increase input element speed with torque demand from starting to full torque demand; the product of said first step-up speed ratio and said first gear ratio and the product of said step-down speed ratio and said second gear ratio being substantially equal to provide the same overall speed ratio before and after a shift for continuous overall ratio change; said hydromechanical transmission means having equal efficiency when operating at said first step-up speed ratio in said first gear ratio and said step-down speed ratio in said second gear ratio to provide equal power before and after a shift.

11. In a transmission: an input element; an intermediate element; an output element; torque demand signal means adapted for an engine for driving said input element providing a first torque demand signal varying with torque demand from idle to full torque demand and a second torque demand signal which is substantially constant from idle to a starting torque demand and varies with torque demand from starting to full torque demand; hydromechanical transmission means having gearing means with an input member drive connected to said input element, an output member drive connected to said intermediate element and a reaction member providing a mechanical torque path from said input element to said intermediate element; and hydrostatic transmission means having a reaction hydrostatic converter drive connected to said reaction member, an output hydrostatic converter drive connected to said intermediate element, a first power fluid passage and a second power fluid passage connecting said hydrostatic converters; power pressure control means connected to said power fluid passages to control differential power fluid pressure in a power pressure control phase from substantially zero to a maximum value to provide zero to a transition hydromechanical speed ratio and to limit torque; and displacement control means to vary the displacement of said output hydrostatic converter relative to the displacement of said reaction hydrostatic converter to provide an output to reaction hydrostatic converter displacement ratio having a constant positive maximum ratio during said power pressure control phase and in a displacement phase decreasing in a reaction phase from said positive maximum ratio to zero ratio and then decreasing in an action phase by increasing negatively to a negative maximum ratio operative in said reaction phase to reduce the reaction direction speed of said reaction member to zero for transmitting torque from said reaction hydrostatic converter to said output hydrostatic converter and increasing hydromechanical speed ratio from said transition speed ratio to the reaction stall speed ratio at zero reaction member speed and then operative in said action phase from zero reaction member speed to increase the opposite action direction reaction member speed to a high speed and transmitting torque from said output hydrostatic converter to said reaction hydrostatic converter and further increasing hydromechanical speed ratio from said reaction stall speed ratio to a high step-up speed ratio; gear means of the step ratio type connecting said intermediate element to said output element and providing a first gear ratio and a second gear ratio having a ratio step between said gear ratios; gear shift control means operatively connected to said gear means and said output element operative in response to output element speed increasing through a one two shift speed to shift said gear means from first ratio through said gear ratio step to second ratio; and hydromechanical control means operatively connected to said power pressure control means, said displacement control means, and said input element, said output element and said torque demand means operative in said power pressure control phase in response to input element speed, output element speed and said first torque demand signal to provide increasing differential power pressure and hydromechanical transmission means torque capacity up to a limit value with increasing speed ratio from zero to said transition speed ratio and said constant maximum displacement ratio and in said displacement control phase in response to increasing input element speed and said second torque demand signal when said gear means is in said first ratio to control said displacement control means to continuously decrease said displacement ratio to increase hydromechanical speed ratio from said transition speed ratio through said reaction stall speed ratio to a high first gear step-up speed ratio, in response to decreasing input element speed when said gear means is step ratio shifting to step increase said displacement ratio to step decrease hydromechanical speed ratio from said high first gear step-up speed ratio through substantially a half step to said reaction stall speed ratio and through substantially another half step to a lower step-down speed ratio and in response to increasing input element speed when said gear means is in said second ratio to continuously decrease said displacement ratio to continuously increase said hydromechanical speed ratio from said lower step-down speed ratio through substantially a half step to said reaction stall speed ratio and through substantially a half step to a high second step-up speed ratio; the product of said first step-up speed ratio and said first gear ratio and the product of said step-down speed ratio and said second gear ratio being substantially equal to provide the same overall speed ratio before and after a shift for continuous overall ratio change; said hydromechanical transmission means having equal efficiency when operating at said first step-up speed ratio in said first gear ratio and said step-down speed ratio in said second gear ratio to provide equal power before and after a shift.

12. The invention defined in claim 5, and said continuously variable transmission means being a hydromechanical transmission having gearing with an input member drive connected to said input element, an output member drive connected to said intermediate element and a reaction member and hydrostatic transmission means connecting said reaction member and intermediate element and said control means connected to said hydrostatic transmission means to control the ratio of said hydrostatic transmission means to provide said ratio control of said continuously variable transmission means.

13. The invention defined in claim 6, and said hydromechanical transmission means having substantially the same efficiency in the speed ratio effective before and after said ratio step of said hydromechanical transmission which is substantially equal and opposite to said gear step in speed ratio for continuous overall speed ratio change.

14. In a transmission: an input element; an output element; continuously variable hydromechanical transmission means having gearing means with an input member driven by said input element, an output member driving said output element and a reaction member for providing a mechanical torque path and having hydrostatic transmission means providing a hydraulic torque path with a reaction hydrostatic pump-motor drive connected to said reaction member, an output hydrostatic pump-motor drive connected to said output element, first and second power fluid passages connecting said pump-motors, and variable displacement means to vary the ratio of the displacement of said output hydrostatic pump-motor relative to the displacement of said reaction hydrostatic pump-motor; and control means to control said hydrostatic transmission means to vary the speed ratio of said hydromechanical transmission means connected to said input element and including power pressure control means operatively connected to said first and second power fluid passages and displacement control means operatively connected to said variable displacement means to control the power fluid pressure differential in said first and second power fluid passages and providing maximum positive displacement ratio of said variable displacement means in response to increasing input element speed for providing hydromechanical speed ratio from zero to a transition speed ratio and then to discontinue control of said power fluid pressure differential and to continuously decrease said ratio of displacement from said maximum positive displacement ratio through zero displacement ratio which stalls said reaction member and then only to a limited maximum negative displacement ratio having substantially the same numerical value as said maximum positive displacement ratio in response to increasing input element speed for providing continuously increasing hydromechanical speed ratio from said transition speed ratio to the mid-reaction stall speed ratio and then to a limited higher speed ratio and torque in said hydraulic torque path from said low value through near zero and to a similar low value and in said mechanical torque path from said high value through substantially 100% and only to a similar high value.

15. In a transmission: an input element; an intermediate element; an output element; continuously variable hydromechanical transmission means having gearing means with an input member driven by said input element, an output member driving said intermediate element and a reaction member for providing a mechanical torque path and having hydrostatic transmission means providing a hydraulic torque path with a reaction hydrostatic pump-motor drive connected to said reaction member, an output hydrostatic pump-motor drive connected to said intermediate element, and variable displacement means to vary the ratio of the displacement of said output hydrostatic pump-motor relative to the displacement of said reaction hydrostatic pump-motor; and ratio control means including displacement control means to control the speed of said reaction member, the speed ratio, the torque in said hydraulic torque path, and the torque in said mechanical torque path of said hydromechanical transmission means from free running positive reaction member speed, zero speed ratio, substantially all hydraulic torque and no mechanical torque through a low positive reaction member speed, a low transition speed ratio, low hydraulic torque and high mechanical torque; zero reaction member speed, higher reaction member stall speed ratio, substantially no hydraulic torque and all mechanical torque and to a limited low negative reaction member speed, a limited higher speed ratio, low hydraulic torque and high mechanical torque; step ratio gear transmission means having a plurality of successively higher speed ratio gear drives including a lowest speed ratio gear drive, and a speed ratio step between each speed ratio gear drive and the next higher speed ratio gear drive being not greater than the speed ratio step between said low transition speed ratio and said limited higher speed ratio, and gear shift control means to selectively establish said speed ratio gear drives.

16. The invention defined in claim 15, and the speed ratio step between said stall speed ratio and said low transition speed ratio and between said stall speed ratio and said limited higher speed ratio being substantially equal.

17. The invention defined in claim 15, and when said step ratio gear transmission means is operating in the highest speed ratio gear drive, said ratio control means limits the speed ratio of said hydromechanical transmission means substantially to said stall speed ratio.

18. The invention defined in claim 15, and correlating control means operatively connected to said gear shift control means and said ratio control means for operation when said step ratio gear transmission means is in said lowest speed ratio gear drive to provide progressively increasing hydromechanical speed ratio from said zero speed ratio to said higher speed ratio gear drive, on a shift from a lower to the next higher speed ratio gear drive to equally reduce hydromechanical speed ratio, and in higher speed ratio gear drive to progressively increase hydromechanical speed ratio both within the hydromechanical ratio range between said transition speed ratio and said limited higher speed ratio to provide progressively overall increasing speed ratio.

19. The invention defined in claim 18, and said ratio control means including input governor means providing an input speed signal proportional to the speed of said input element and operative to increase the hydromechanical speed ratio with increasing speed to said input element, and said gear shift control means including output governor means providing an output speed signal proportional to the speed of said output element and operative higher speed ratio gear drives with increasing speed of said output element.

* * * * *

UNITED STATES PATENT AND TRADEMARK OFFICE
CERTIFICATE OF CORRECTION

PATENT NO. : 4,122,732

DATED : October 31, 1978

INVENTOR(S) : Howard E. Chana

It is certified that error appears in the above-identified patent and that said Letters Patent are hereby corrected as shown below:

After Column 52 in the Original Patent Grant only, insert the attached Columns 53 thru 56, respectively.

---

Column 1, line 62, "means" should read -- mean --.

Column 4, line 13, "transition" should read -- transmission --.

Column 9, line 32, "transmission" should read -- transition --.
and "a to i t" should read -- a to t --.

Column 10, line 6, "power" (2nd occurrence) should read --portion--

UNITED STATES PATENT AND TRADEMARK OFFICE
CERTIFICATE OF CORRECTION

PATENT NO. : 4,122,732
DATED : October 31, 1978
INVENTOR(S) : Howard E. Chana

It is certified that error appears in the above-identified patent and that said Letters Patent are hereby corrected as shown below:

Column 16, line 1, "of" (2nd occur) should read -- in --.

Column 22, line 30, "valve" should read -- value --.

Column 30, line 13, "an" should read -- in --.

Column 31, line 1, "part" should read -- Park --.

Column 35, line 45, "14" (2nd occur) should read -- 15 --.

Column 36, line 1, after "overall" insert -- zero --.

Column 38, line 33, "operation" should read -- operating --.

Column 40, line 3, "on" should read -- in --.

Column 41, line 12, "charge" should read -- change --.

Column 41, line 24, "valve" should read -- value --

UNITED STATES PATENT AND TRADEMARK OFFICE
CERTIFICATE OF CORRECTION

PATENT NO. : 4,122,732
DATED : October 31, 1978
INVENTOR(S) : Howard E. Chana

It is certified that error appears in the above-identified patent and that said Letters Patent are hereby corrected as shown below:

Column 48, line 3, "$N_R = 1.36N_C 31\ 36N_S$" should read

-- $N_R = 1.36N_C - .36N_S$ --.

Column 48, line 49, "torques" should read -- torque --

Column 49, line 36, after "curves" insert -- □ --.

Column 49, line 41, "(curve" should read -- (curve □ ) --.

Column 54, line 45, "a" should read -- to --.

Column 55, line 22, "*" should read -- : --.

Column 58, line 48, before "ratio" insert -- speed --.

UNITED STATES PATENT AND TRADEMARK OFFICE
CERTIFICATE OF CORRECTION

PATENT NO. : 4,122,732

DATED : October 31, 1978

INVENTOR(S) : Howard E. Chana

It is certified that error appears in the above-identified patent and that said Letters Patent are hereby corrected as shown below:

Column 64, line 13, "to" should read -- of --.

Signed and Sealed this

Nineteenth Day of June 1979

[SEAL]

Attest:

RUTH C. MASON
Attesting Officer

DONALD W. BANNER
Commissioner of Patents and Trademarks ontrolled for providing a hydromechanical speed ratio range from zero speed ratio with all power transmitted in said hydraulic torque path and zero power in said mechanical torque path increasing to a transition speed ratio with a high portion of power transmitted in said mechanical torque path and a low portion of power transmitted in said hydraulic torque path and then to a mid-reaction stall speed ratio with zero power in said hydraulic torque path and all power transmitted in said mechanical torque path and then limited to the highest used speed ratio with a high portion of power transmitted in said mechanical torque path and a low portion of ed in said mechanical torque path; said power transmitted in said hydraulic torque path; said hydrostatic transmission means having a reaction hydrostatic converter drive connected to said reaction member, an output hydrostatic converter drive connected to said output element, a first power fluid passage and a second power fluid passage connecting said hydrostatic converters and displacement control means to vary the displacement of said output hydrostatic converter relative to the displacement of said reaction hydrostatic converter to provide a continuously decreasing output to reaction hydrostatic converter displacement ratio, decreasing in a reaction phase from a positive maximum ratio to zero ratio and then decreasing in an action phase by increasing negatively to a negative maximum ratio, operative in said reaction phase to reduce the reaction direction of speed of said reaction member to zero for transmitting torque from said reaction hydrostatic converter to said output hydrostatic converter and increasing hydromechanical speed ratio from a minimum speed ratio to said mid-reaction stall speed ratio at zero reaction member speed and then operative in said action phase from zero reaction member speed to increase the opposite action direction reaction member speed to a high speed for transmitting torque from said output hydrostatic converter to said reaction hydrostatic converter and further increasing hydromechanical speed ratio from said mid-reaction stall speed ratio to a high step-up speed ratio; and control means to control said hydrostatic transmission means to vary the speed ratio of said hydromechanical transmission means including power pressure control means operatively connected to said power fluid passages, said input element, output element and torque demand means to control hydromechanical speed ratio from zero to said transition speed ratio by controlling increasing power fluid pressure differential in response to increasing input element speed, output element speed and torque demand and normally being ineffective to control speed ratio above said transition speed ratio and including displacement controlling means operatively connected to said input element, torque demand means and displacement control means to provide positive maximum displacement ratio in response to input element speed while said power pressure control means controls hydromechanical speed ratio between zero and said transition speed ratio and then to continuously decrease displacement ratio from said positive maximum through zero to said negative maximum in response to increasing input element speed and increasing torque demand to increase hydromechanical speed ratio from said transition speed ratio to said mid-reaction stall speed ratio and then only to said highest used speed ratio.

3. In a transmission: an input element; an output element; hydromechanical transmission means having gearing means with an input member drive connected to said input element; an output member drive connected to said output element and a reaction member providing a mechanical torque path from said input element to said output element; hydrostatic transmission means having a reaction hydrostatic converter drive connected to said reaction member, an output hydrostatic converter drive connected to said output element, a first power fluid passage and a second power fluid passage connecting said hydrostatic converters and displacement control means to vary the displacement of said output hydrostatic converter relative to the displacement of said reaction hydrostatic converter to provide a continuously decreasing output to reaction hydrostatic converter displacement ratio, decreasing in a reaction phase from a positive maximum ratio to zero ratio and then decreasing in an action phase by increasing negatively to a negative maximum ratio, operative in said reaction phase to reduce the reaction direction in said reaction phase to reduce the reaction direction speed of said reaction member to zero for transmitting torque from said reaction hydrostatic converter to said output hydrostatic converter and increasing hydromechanical speed ratio from a minimum speed ratio to the reaction stall speed ratio at zero reaction member speed and then operative in said action phase from zero reaction member speed to increase the opposite action direction reaction member speed to high speed for transmitting torque from said output hydrostatic converter to said reaction hydrostatic converter and further increasing hydromechanical speed ratio from said reaction stall speed ratio to a high speed ratio; and hydromechanical control means operatively connected to said displacement control means and said input element operative in response to increasing input element speed to control said displacement control means to continuously control said displacement ratio to control hydromechanical speed ratio from said minimum speed ratio through said reaction stall speed ratio to a high speed ratio in response to input element speed to provide a constant input element speed.

4. In a transmission: an input element; an output element; torque demand means adapted for an engine for driving said input element providing a torque demand signal which is substantially constant from idle to starting torque demand and varies with torque demand from starting a full torque demand; hydromechanical transmission means having gearing means with an input member drive connected to said input element; an output member drive connected to said output element and a reaction member providing a mechanical torque path from said input element to said output element; hydrostatic transmission means having a reaction hydrostatic converter drive connected to said reaction member, an output hydrostatic converter drive connected to said output element, a first power fluid passage and a second power fluid passage connecting said hydrostatic converters, and displacement control means to vary the displacement of said output hydrostatic converter relative to the displacement of said reaction hydrostatic converter to provide a continuously decreasing output to reaction hydrostatic converter displacement ratio, decreasing in a reaction phase from a positive maximum ratio to zero ratio and then decreasing in an action phase by increasing negatively to a negative maximum ratio, operative in said reaction phase to reduce the reaction direction speed of said reaction member to zero for transmitting torque from said reaction hydrostatic converter to said output hydrostatic converter and increasing hydromechanical speed ratio from a minimum speed ratio to the reaction stall speed ratio at zero reaction member speed and then operative in said action phase from zero reaction member speed to increase the opposite action direction reaction member speed to a high speed for transmitting torque from said output hydrostatic converter to said reaction hydrostatic converter and further increasing hydromechanical speed ratio from said reaction stall speed ratio to a high speed ratio; and hydromechanical control means operatively connected to said displacement control means, torque demand means and said input element operative in response to increasing input element speed to control said displacement control means to continuously control said displacement ratio to control hydromechanical speed ratio from said minimum speed ratio through said reaction stall speed ratio to a high speed ratio in response to torque demand and input element speed to provide input element idle speed from idle to starting torque demand and to increase input element speed with increasing torque demand from starting to full torque demand.

5. In a transmission* an input element; an intermediate element; an output element; continuously variable transmission means connecting said input element and said intermediate element providing a speed ratio range from zero to a maximum; step ratio gear transmission means providing a first and a second successively higher speed ratio gear drive with a speed ratio gear step between the successive gear drives connecting said intermediate element to said output element; and control means operatively connected to said output element, said input element, said continuously variable transmission means and said step ratio gear transmission means operative in response to increasing output element speed through a shift point speed to control said step ratio gear transmission means to provide said first gear drive as output element speed increases up to said shift point speed, said speed ratio step on a shift from first to second gear drive at said shift point speed and said second gear drive as output element speed increases above said shift point speed and to control said continuously variable transmission means in response to input element speed to provide continuously variable progressively increasing speed ratio with increasing input element speed in said first gear drive, a ratio step equal and opposite to said gear step at said shift point speed and continuously variable progressively increasing speed ratio with increasing input element speed in said second gear drive for overall continuously variable progressively increasing speed ratio.

6. In a transmission: an input element; an intermediate element; an output element; continuously variable hydromechanical transmission means having gearing means with an input member drive connected to said input element, an output member drive connected to said intermediate element and a reaction member for providing a mechanical torque path; hydrostatic transmission means providing a variable ratio hydraulic torque path connecting said reaction member and intermediate element providing a hydromechanical speed ratio change from zero to a maximum; step ratio gear transmission means providing a first and a second successively higher speed ratio gear drive with a speed ratio gear step between the successive gear drives connecting said intermediate element to said output element, and control means operatively connected to said output element, said input element, said hydromechanical transmission means and said gear transmission means operative in response to increasing output element speed through a shift point speed to control said gear transmission means to provide said first gear drive as output element speed increases up to said shift point speed, said speed ratio gear step on a shift from first to second gear drive at said shift point speed and said second gear drive as output element speed increases above said shift point speed and to control said hydrostatic transmission means to vary the speed ratio of said hydromechanical transmission means in response to input element speed to provide continuously variable progressively increasing speed ratio with increasing input element speed in said first gear drive, a ratio step substantially equal and opposite to said gear step at said shift point speed and continuously variably progressively increasing speed ratio with increasing input element speed in said second gear drive for overall continuously variable progressively increasing speed ratio.

7. In a transmission: an input element; an intermediate element; an output element; continuously variable hydromechanical transmission means having gearing means with an input member drive connected to said input element, an output member drive connected to said intermediate element, and a reaction member for providing a mechanical torque path and hydrostatic transmission means providing a hydraulic torque path connected in parallel between said reaction member and intermediate element providing a speed ratio range from zero speed ratio with all power transmitted in said hydraulic torque path and zero power in said mechanical torque path increasing to a transition speed ratio with a high portion of power transmitted in said mechanical torque path and a low portion of power transmitted in said hydraulic torque path and then to a mid-speed ratio with zero power in said hydraulic torque path and all power transmitted in said mechanical torque path and then to the limited highest used speed ratio with a high portion of power transmitted in said mechanical torque path and a low portion of power transmitted in said hydraulic torque path; step ratio gear transmission means providing a first and a second successively higher speed ratio gear drive with a speed ratio gear step between the successive gear drives connecting said intermediate element to said output element, and control means operatively connected to said output element, said input element, said continuously variable hydromechanical transmission means and said step ratio gear transmission means operative in response to increasing output element speed through a shift point speed to control said gear transmission means to provide said first gear drive as output element speed increases up to said shift point speed, said speed ratio step on a shift from first to second gear drive at said shift point speed and said second gear drive as output element speed increases above said shift point speed and to control said hydrostatic transmission means to vary the speed ratio of said hydromechanical transmission means to provide in said first gear drive continuously variable progressively increasing speed ratio with increasing input element speed, at said shift point speed a ratio step equal and opposite to said gear step and having substantially equal limited portions below and above said mid-speed ratio with a high portion of power transmitted in said mechanical torque path and in said second gear drive continuously variable progressively increasing speed ratio with increasing output element speed and having substantially equal portions below and above said mid-speed ratio.